United States Patent
Yamazaki et al.

(10) Patent No.: US 6,937,378 B2
(45) Date of Patent: Aug. 30, 2005

(54) OPTICALLY CONTROLLED DEVICE, METHOD OF CONTROLLING THE OPTICALLY CONTROLLED DEVICE, SPATIAL LIGHT MODULATOR, AND PROJECTOR

(75) Inventors: Tetsuro Yamazaki, Suwa (JP); Masatoshi Yonekubo, Hara-mura (JP); Takashi Takeda, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/918,469

(22) Filed: Aug. 16, 2004

(65) Prior Publication Data

US 2005/0083565 A1 Apr. 21, 2005

(30) Foreign Application Priority Data

| Aug. 18, 2003 | (JP) | 2003-207765 |
| Aug. 18, 2003 | (JP) | 2003-207766 |
| Sep. 4, 2003 | (JP) | 2003-312753 |

(51) Int. Cl.[7] ............. G02F 1/03; G02B 26/00; G02B 5/08
(52) U.S. Cl. ............. 359/244; 359/242; 359/290; 359/291; 359/846
(58) Field of Search ............. 359/242, 244, 359/240, 241, 238, 247, 290, 291, 263, 846

(56) References Cited

U.S. PATENT DOCUMENTS

| 5,073,010 A | 12/1991 | Johnson et al. | 349/28 |
| 5,178,445 A | 1/1993 | Moddel et al. | 349/25 |
| 5,691,836 A | 11/1997 | Clark | 359/247 |
| 5,867,202 A | 2/1999 | Knipe et al. | 347/239 |
| 6,198,565 B1 | 3/2001 | Iseki et al. | 359/224 |

FOREIGN PATENT DOCUMENTS

| JP | A 2002-127100 | 5/2002 |
| JP | A 2004-040929 | 2/2004 |

OTHER PUBLICATIONS

Ohashi et al., "Theoretical Anaylsis of Optically Addressed Spatial Light Modulator with Electromagnetic Driven Micromirror for Optical Information Processing," T. IEEE Japan, vol. 119–E, No. 8/9, pp. 424–429, 1999.

Zook et al., "Optically Excited Self–Resonant Strain Trasnducers," The 8th International Conference on Solid–State Sensors and Actuators and Eurosensors IX, Stockholm, Sweden, pp. 600–603, Jun. 25–29, 1995.

Primary Examiner—Timothy Thompson
(74) Attorney, Agent, or Firm—Oliff & Berridge, PLC

(57) ABSTRACT

An optically controlled device includes a transparent electrode, a conductivity variable portion, a driving electrode, a movable unit, and a support portion. A method of controlling the optically controlled device includes inputting a control light into the transparent electrode, applying a voltage modulated according to an input signal between the transparent electrode and the movable unit, and moving the movable unit to a predetermined position by generating a force corresponding to the voltage between the driving electrode and the movable unit base on a charge of electrical conductivity of the conductivity variable portion.

26 Claims, 25 Drawing Sheets

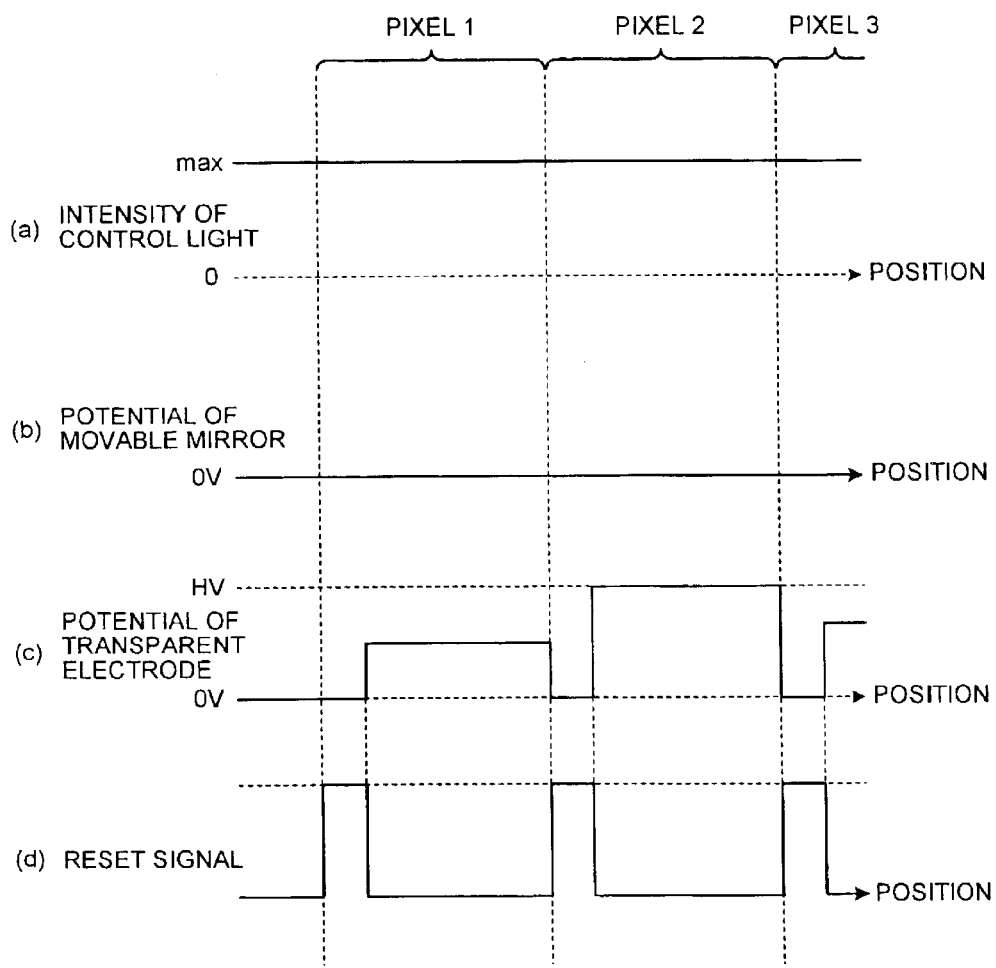
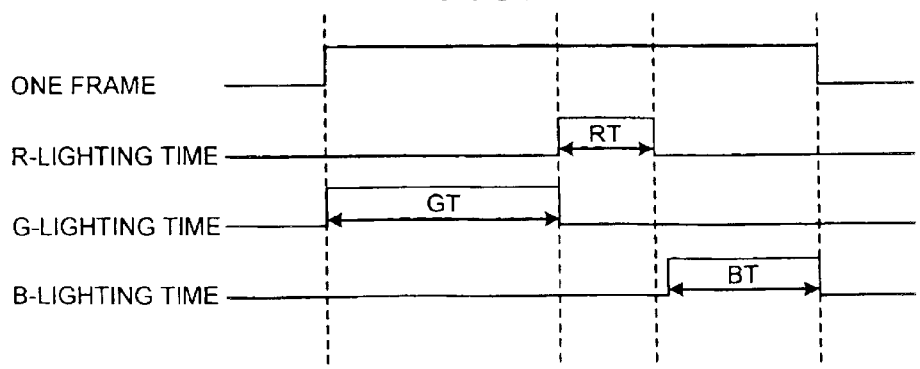

FIG.12A
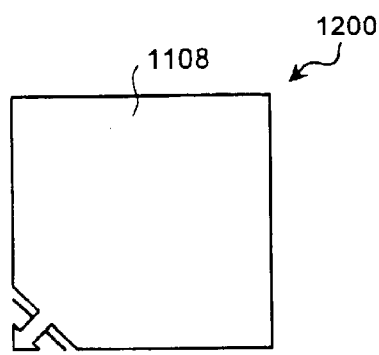
FIG.12C
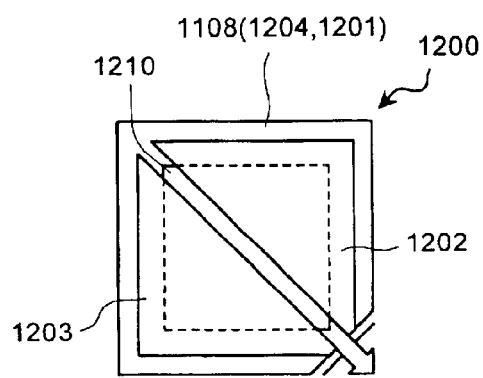
FIG.12B
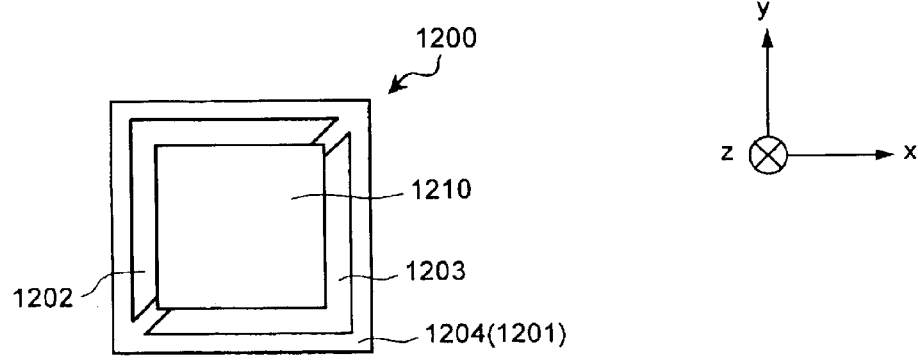
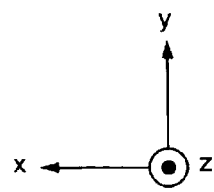

FIG.18A
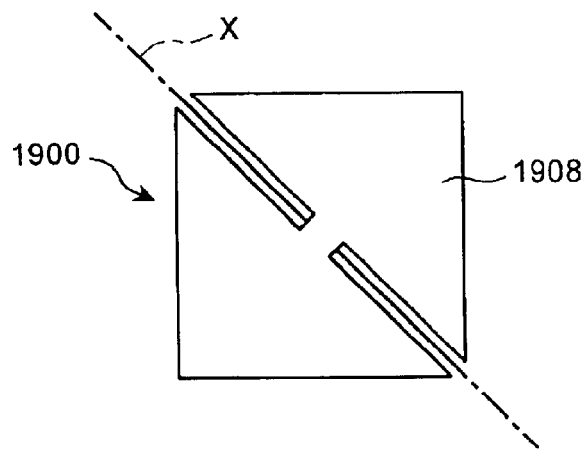
FIG.18B
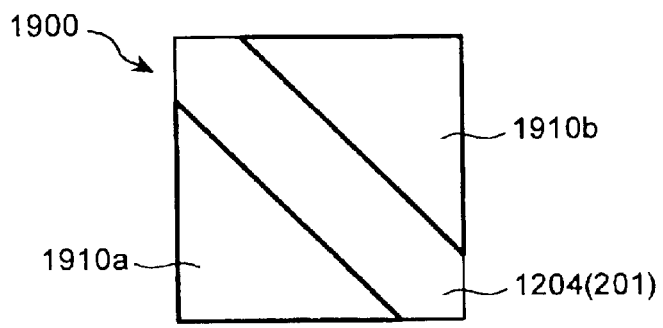
FIG.18C
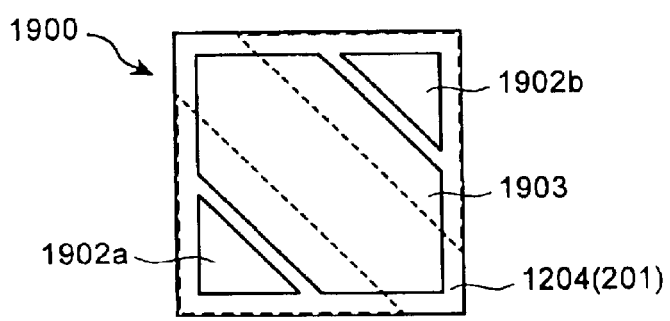
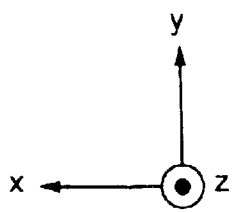

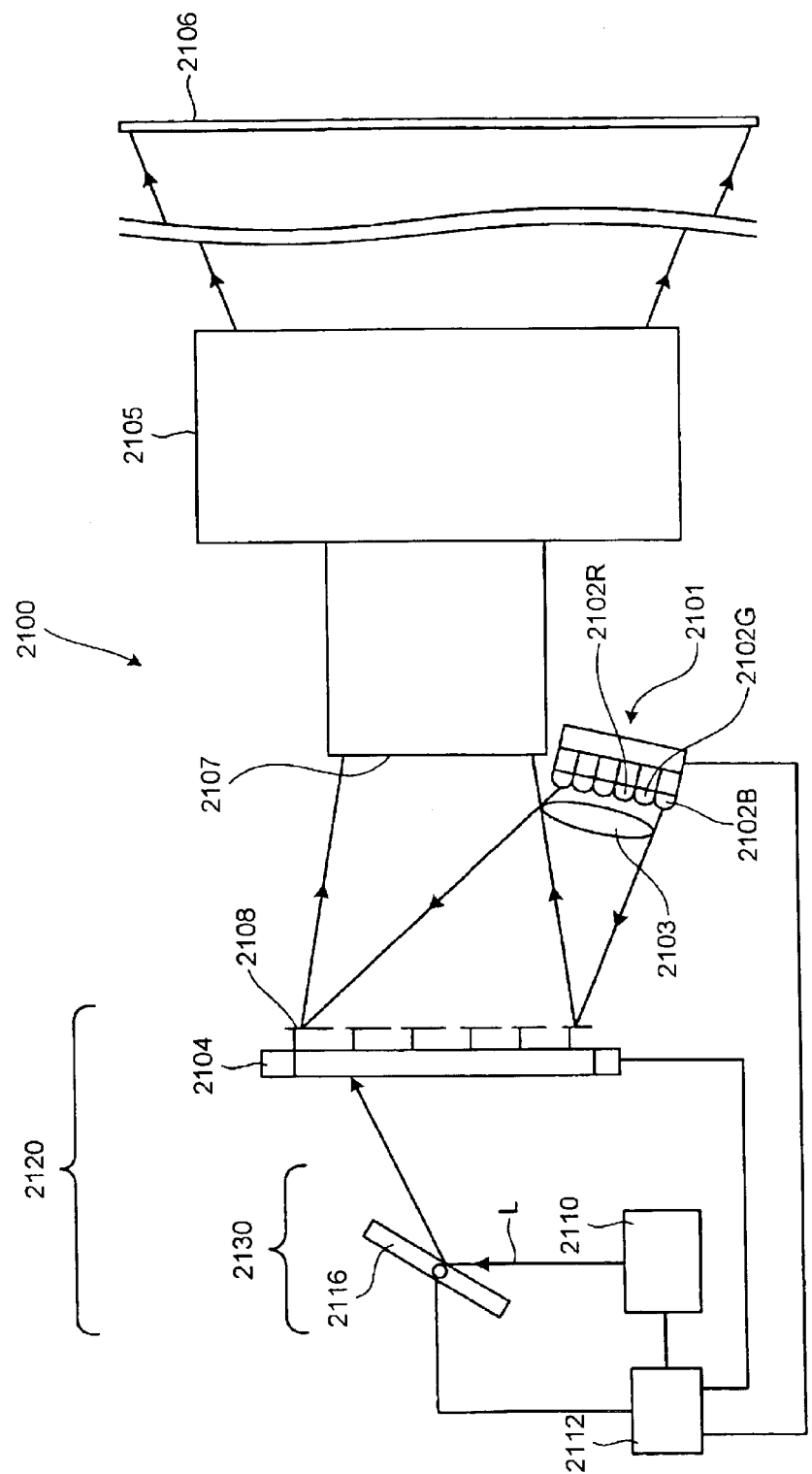

OPTICALLY CONTROLLED DEVICE, METHOD OF CONTROLLING THE OPTICALLY CONTROLLED DEVICE, SPATIAL LIGHT MODULATOR, AND PROJECTOR

CROSS-REFERENCE TO RELATED APPLICATIONS

This application is based upon and claims the benefit of priority from the prior Japanese Patent Applications No. 2003-207765 filed on Aug. 18, 2003, No. 2003-207766 filed on Aug. 18, 2003 and No. 2003-312753 filed on Sep. 4, 2003; the entire contents of which are incorporated herein by reference.

BACKGROUND OF THE INVENTION

1) Field of the Invention

The present invention relates to an optically controlled device, a method of controlling the optically controlled device, a spatial light modulator using the optically controlled device, and a projector using the spatial light modulator.

2) Description of the Related Art

Tilt mirror devices are used for spatial light modulators of projectors. The tilt mirror device includes a plurality of movable mirrors formed on an integrated circuit board based on micro electromechanical systems (MEMS). The movable mirror moves its reflecting surface according to an image signal, and reflects an illumination light. The tilt mirror device reflects the illumination light according to the image signal by controlling the movable mirrors, and modulates the illumination light. The technology for this tilt mirror device is disclosed, for example, in U.S. Pat. No. 5,867,202.

However, a conventional tilt mirror device includes an interconnect in order to drive the movable mirrors, and therefore, electrical access to the movable mirrors is required. Furthermore, the conventional tilt mirror device includes movable mirrors formed on an integrated circuit board using complementary metal oxide semiconductors (CMOS) or the like. Therefore, the conventional tilt mirror device has a complicated structure, and moreover, the integrated circuit and the MEMS structure have to be integrally formed, which causes reduction in yield. Thus, manufacturing costs increase.

An optically controlled device can be used for the tilt mirror device. The optically controlled device is driven by incident light. If the optically controlled device is used, the tilt mirror device can be controlled by scanning a light beam (hereinafter, "a control light") according to an image signal onto each of the optically controlled devices (light addressing). By using the optically controlled device for the tilt mirror device, there is no need to provide the interconnect or the like for electrical access to the movable mirrors. Therefore, there is also no need to integrally form the integrated circuit and the MEMS structure, which allows improvement in yield.

Moreover, the movable mirror can be easily upsized, and therefore, it is also easy to realize high resolution. Since the integrated circuit is not needed, cost of the tilt mirror device can be reduced and the tilt mirror device can be driven without any restriction by a withstand voltage of the integrated circuit. Furthermore, since the integrated circuit is not required and a glass material can be used for the substrate, the tilt mirror device can be upsized at low cost.

However, the optically controlled device possibly used for the tilt mirror device has one side of tens of micrometers. Because the optically controlled device is such a micro device, it is necessary to illuminate a control light onto the optically controlled devices with high precision in order to control the tilt mirror device according to image signals. It is also necessary to set a spot diameter of the control light to about 10 micrometers in order to make the control light incident on an electrode of the optically controlled device.

On the other hand, in order to display an image, it is necessary to scan the control light at high speed. Scanning the control light at high speed makes it difficult to cause the control light to be precisely incident on the optically controlled devices. Furthermore, even if the control light can be scanned with high precision, a scanning speed of the control light becomes slower, which makes it difficult to display a high quality image. Therefore, precise control for the optically controlled device is difficult. As explained above, although there are some advantages such that the cost can be reduced by using the optically controlled device for the tilt mirror device, it is difficult to precisely control the optically controlled device.

The optically controlled device controls electrostatic force generated caused by a potential difference between an electrode for driving (hereinafter, "a driving electrode") and a movable mirror that is a movable unit, and drives the movable mirror. If there is a slight amount of the potential difference between the driving electrode and the movable unit, the electrostatic force generated is also a slight amount. The slight amount of the electrostatic force generated between the two cannot sometimes drive the movable mirror. If there is a slight variable range of the potential difference between the two, only by making a slight amount of control light incident on the movable mirror, the potential difference between the two largely changes within the variable range.

Therefore, it becomes difficult to move the movable mirror to a precise position by changing the amount of control light. As explained above, the optically controlled device has some troubles because it becomes difficult to perform precise control over the movable mirror according to image signals if the potential difference between the two is a slight amount.

SUMMARY OF THE INVENTION

It is an object of the present invention to solve at least the above problems in the conventional technology.

A method according to one aspect of the present invention controls an optically controlled device that includes a transparent electrode that is optically transparent, a conductivity variable portion that is provided on the transparent electrode, where electrical conductivity changes according to an amount of control light passing through the transparent electrode, a driving electrode provided on the conductivity variable portion, a movable unit that is movable to a predetermined position, and a support portion that movably supports the movable unit. The method includes inputting the control light of a constant intensity into the transparent electrode; applying a voltage modulated according to an input signal between the transparent electrode and the movable unit; and moving the movable unit to the predetermined position by generating a force corresponding to the voltage between the driving electrode and the movable unit based on a change of electrical conductivity of the conductivity variable portion caused by the inputting of the control light into the transparent electrode.

A method according to another aspect of the present invention controls an optically controlled device that includes a transparent electrode that is optically transparent, a conductivity variable portion that is provided on the transparent electrode, where electrical conductivity changes according to an amount of control light passing through the transparent electrode, a driving electrode provided on the conductivity variable portion, a movable unit that is movable to a predetermined position, and a support portion that movably supports the movable unit. The method includes inputting the control light of an intensity modulated according to an input signal into the transparent electrode; applying a constant voltage between the transparent electrode and the movable unit; moving the movable unit to the predetermined position by generating a force corresponding to the intensity of the control light between the driving electrode and the movable unit based on a change of electrical conductivity of the conductivity variable portion according to the intensity of the control light caused by the inputting of the control light into the transparent electrode; and resetting the driving electrode and the movable unit to substantially same potential during a time when the control light is being input into the transparent electrode.

An optically controlled device according to still another aspect of the present invention includes a control-light optical system that supplies a control light; a transparent electrode that is optically transparent; a conductivity variable portion that is provided on the transparent electrode, where electrical conductivity changes according to an amount of control light passing through the transparent electrode; a driving electrode provided on the conductivity variable portion; a movable unit that is movable to a predetermined position; a support portion that movably supports the movable unit; and a power supply that supplies either of a voltage modulated according to an input signal and a constant voltage to the transparent electrode; The optically controlled device is controlled by a method including inputting the control light of a constant intensity into the transparent electrode; applying a voltage modulated according to an input signal between the transparent electrode and the movable unit; and moving the movable unit to the predetermined position by generating a force corresponding to the voltage between the driving electrode and the movable unit based on a change of electrical conductivity of the conductivity variable portion caused by the inputting of the control light into the transparent electrode.

An optically controlled device according to still another aspect of the present invention includes a control-light optical system that supplies a control light; a transparent electrode that is optically transparent; a conductivity variable portion that is provided on the transparent electrode, where electrical conductivity changes according to an amount of control light passing through the transparent electrode; a driving electrode provided on the conductivity variable portion; a movable unit that is movable to a predetermined position; a support portion that movably supports the movable unit; and a power supply that supplies either of a voltage modulated according to an input signal and a constant voltage to the transparent electrode. The optically controlled device is controlled by a method including inputting the control light of an intensity modulated according to an input signal into the transparent electrode; applying a constant voltage between the transparent electrode and the movable unit; moving the movable unit to the predetermined position by generating a force to the intensity of the control light between the driving electrode and the corresponding movable unit based on a change of electrical conductivity of the conductivity variable portion according to the intensity of the control light caused by the inputting of the control light into the transparent electrode; and resetting the driving electrode and the movable unit to substantially same potential during a time when the control light is being input into the transparent electrode.

A spatial light modulator according to still another aspect of the present invention includes a plurality of optically-controlled movable mirror devices having a movable mirror that is movable to a predetermined position. Each of the optically-controlled movable mirror devices includes a control-light optical system that supplies a control light; a transparent electrode that is optically transparent; a conductivity variable portion that is provided on the transparent electrode, where electrical conductivity changes according to an amount of control light passing through the transparent electrode; a driving electrode provided on the conductivity variable portion; a movable unit that is movable to the predetermined position; a support portion that movably supports the movable unit; and a power supply that supplies either of a voltage modulated according to an input signal and a constant voltage to the transparent electrode. The optically-controlled movable mirror device is controlled by a method including inputting the control light of a constant intensity into the transparent electrode; applying a voltage modulated according to an input signal between the transparent electrode and the movable unit; and moving the movable unit to the predetermined position by generating a force corresponding to the voltage between the driving electrode and the movable unit based on a change of electrical conductivity of the conductivity variable portion caused by the inputting of the control light into the transparent electrode. The movable portion is the movable mirror.

A spatial light modulator according to still another aspect of the present invention includes a plurality of optically-controlled movable mirror devices having a movable mirror that is movable to a predetermined position. Each of the optically-controlled movable mirror devices includes a control-light optical system that supplies a control light; a transparent electrode that is optically transparent; a conductivity variable portion that is provided on the transparent electrode, where electrical conductivity changes according to an amount of control light passing through the transparent electrode; a driving electrode provided on the conductivity variable portion; a movable unit that is movable to the predetermined position; a support portion that movably supports the movable unit; and a power supply that supplies either of a voltage modulated according to an input signal and a constant voltage to the transparent electrode. The optically-controlled movable mirror device is controlled by a method including inputting the control light of an intensity modulated according to an input signal into the transparent electrode; applying a constant voltage between the transparent electrode and the movable unit; moving the movable unit to the predetermined position by generating a force corresponding to the intensity of the control light between the driving electrode and the movable unit based on a change of electrical conductivity of the conductivity variable portion according to the intensity of the control light caused by the inputting of the control light into the transparent electrode; resetting the driving electrode and the movable unit to substantially same potential during a time when the control light is being input into the transparent electrode. The movable portion is the movable mirror.

A projector according to still another aspect of the present invention includes an illumination light source that supplies an illumination light; a spatial light modulator that modulates the illumination light according to an image signal to output a modulated light; and a projection lens that projects the modulated light. The spatial light modulator includes a plurality of optically-controlled movable mirror devices having a movable mirror that is movable to a predetermined position. Each of the optically-controlled movable mirror devices includes a control-light optical system that supplies a control light; a transparent electrode that is optically transparent; a conductivity variable portion that is provided on the transparent electrode, where electrical conductivity changes according to an amount of control light passing through the transparent electrode; a driving electrode provided on the conductivity variable portion; a movable unit that is movable to the predetermined position; a support portion that movably supports the movable unit; and a power supply that supplies either of a voltage modulated according to an input signal and a constant voltage to the transparent electrode. The optically-controlled movable mirror device is controlled by a method including inputting the control light of a constant intensity into the transparent electrode; applying a voltage modulated according to an input signal between the transparent electrode and the movable unit; and moving the movable unit to the predetermined position by generating a force corresponding to the voltage between the driving electrode and the movable unit based on a change of electrical conductivity of the conductivity variable portion caused by the inputting of the control light into the transparent electrode. The movable portion is the movable mirror.

A projector according to still another aspect of the present invention includes an illumination light source that supplies an illumination light; a spatial light modulator that modulates the illumination light according to an image signal to output a modulated light; and a projection lens that projects the modulated light. The spatial light modulator includes a plurality of optically-controlled movable mirror devices having a movable mirror that is movable to a predetermined position. Each of the optically-controlled movable mirror devices includes a control-light optical system that supplies a control light; a transparent electrode that is optically transparent; a conductivity variable portion that is provided on the transparent electrode, where electrical conductivity changes according to an amount of control light passing through the transparent electrode; a driving electrode provided on the conductivity variable portion; a movable unit that is movable to the predetermined position; a support portion that movably supports the movable unit; and a power supply that supplies either of a voltage modulated according to an input signal and a constant voltage to the transparent electrode. The optically-controlled movable mirror device is controlled by a method including inputting the control light of an intensity modulated according to an input signal into the transparent electrode; applying a constant voltage between the transparent electrode and the movable unit; moving the movable unit to the predetermined position by generating a force corresponding to the intensity of the control light between the driving electrode and the movable unit based on a change of electrical conductivity of the conductivity variable portion according to the intensity of the control light caused by the inputting of the control light into the transparent electrode; and resetting the driving electrode and the movable unit to substantially same potential during a time when the control light is being input into the transparent electrode. The movable portion is the movable mirror.

An optically controlled device according to still another aspect of the present invention includes a control-light optical system that supplies a control light; a transparent electrode that is optically transparent; a conductivity variable portion that is provided on the transparent electrode, where electrical conductivity changes according to an amount of control light passing through the transparent electrode; a driving electrode provided on the conductivity variable portion; a movable unit that is movable to the predetermined position; a support portion that movably supports the movable unit; a power supply that supplies either of a voltage modulated according to an input signal and a constant voltage between the transparent electrode and the movable unit; and a light-shielding unit that is provided between the transparent electrode and the control-light optical system, the light-shielding unit including an aperture. The aperture is arranged such that the control light from the control-light optical system passes through the aperture to be input into the transparent electrode. The control light passing through the aperture is input only into the transparent electrode to generate a predetermined force between the driving electrode and the movable unit, and the movable unit is moved by the predetermined force.

A spatial light modulator according to still another aspect of the present invention includes a plurality of optically-controlled movable mirror devices having a movable mirror that is movable to a predetermined position. Each of the optically-controlled movable mirror devices includes a control-light optical system that supplies a control light; a transparent electrode that is optically transparent; a conductivity variable portion that is provided on the transparent electrode, where electrical conductivity changes according to an amount of control light passing through the transparent electrode; a driving electrode provided on the conductivity variable portion; a movable unit that is movable to the predetermined position; a support portion that movably supports the movable unit; a power supply that supplies either of a voltage modulated according to an input signal and a constant voltage between the transparent electrode and the movable unit; and a light-shielding unit that is provided between the transparent electrode and the control-light optical system, the light-shielding unit including an aperture. The aperture is arranged such that the control light from the control-light optical system passes through the aperture to be input into the transparent electrode. The control light passing through the aperture is input only into the transparent electrode to generate a predetermined force between the driving electrode and the movable unit, and the movable unit is moved by the predetermined force.

A projector according to still another aspect of the present invention includes an illumination light source that supplies an illumination light; a spatial light modulator that modulates the illumination light according to an image signal to output a modulated light; and a projection lens that projects the modulated light. The spatial light modulator includes a plurality of optically-controlled movable mirror devices having a movable mirror that is movable to a predetermined position. Each of the optically-controlled movable mirror devices includes a control-light optical system that supplies a control light; a transparent electrode that is optically transparent; a conductivity variable portion that is provided on the transparent electrode, where electrical conductivity changes according to an amount of control light passing through the transparent electrode; a driving electrode provided on the conductivity variable portion; a movable unit that is movable to the predetermined position; a support portion that movably supports the movable unit; a power supply that supplies either of a voltage modulated according to an input signal and a constant voltage between the transparent electrode and the movable unit; and a light-shielding unit that is provided between the transparent electrode and the control-light optical system, the light-shielding unit including an aperture. The aperture is arranged such that the control light from the control-light optical system passes through the aperture to be input into the transparent electrode. The control light passing through the aperture is input only into the transparent electrode to generate a predetermined force between the driving electrode and the movable unit, and the movable unit is moved by the predetermined force.

An optically controlled device according to still another aspect of the present invention includes a control-light optical system that supplies a control light; a transparent electrode that is optically transparent; a conductivity variable portion that is provided on the transparent electrode, where electrical conductivity changes according to an amount of control light passing through the transparent electrode; a driving electrode provided on the conductivity variable portion; a movable unit that is movable to the predetermined position; a support portion that movably supports the movable unit; a power supply that supplies either of a voltage modulated according to an input signal and a constant voltage between the transparent electrode and the movable unit; and a resistor portion that is provided between the driving electrode and the movable unit, the resistor portion having a predetermined resistance. The predetermined resistance is any value in a range between a minimum resistance and a maximum resistance of the conductivity variable portion. The control light is input into the transparent electrode to generate a predetermined force between the driving electrode and the movable unit, the predetermined force corresponding to the resistance of the conductivity variable portion, and the movable unit is moved by the predetermined force.

A spatial light modulator according to still another aspect of the present invention includes a plurality of optically-controlled movable mirror devices having a movable mirror that is movable to a predetermined position. Each of the optically-controlled movable mirror devices includes a control-light optical system that supplies a control light; a transparent electrode that is optically transparent; a conductivity variable portion that is provided on the transparent electrode, where electrical conductivity changes according to an amount of control light passing through the transparent electrode; a driving electrode provided on the conductivity variable portion; a movable unit that is movable to the predetermined position; a support portion that movably supports the movable unit; a power supply that supplies either of a voltage modulated according to an input signal and a constant voltage to the transparent electrode; and a resistor portion that is provided between the driving electrode and the movable unit, the resistor portion having a predetermined resistance. The predetermined resistance is any value in a range between a minimum resistance and a maximum resistance of the conductivity variable portion. The control light is input into the transparent electrode to generate a predetermined force between the driving electrode and the movable unit, the predetermined force corresponding to the resistance of the conductivity variable portion, and the movable unit is moved by the predetermined force.

A projector according to still another aspect of the present invention includes an illumination light source that supplies an illumination light; a spatial light modulator that modulates the illumination light according to an image signal to output a modulated light; and a projection lens that projects the modulated light. The spatial light modulator includes a plurality of optically-controlled movable mirror devices having a movable mirror that is movable to a predetermined position. Each of the optically-controlled movable mirror devices includes a control-light optical system that supplies a control light; a transparent electrode that is optically transparent; a conductivity variable portion that is provided on the transparent electrode, where electrical conductivity changes according to an amount of control light passing through the transparent electrode; a driving electrode provided on the conductivity variable portion; a movable unit that is movable to the predetermined position; a support portion that movably supports the movable unit; a power supply that supplies either of a voltage modulated according to an input signal and a constant voltage to the transparent electrode; and a resistor portion that is provided between the driving electrode and the movable unit, the resistor portion having a predetermined resistance. The predetermined resistance is any value in a range between a minimum resistance and a maximum resistance of the conductivity variable portion. The control light is input into the transparent electrode to generate a predetermined force between the driving electrode and the movable unit, the predetermined force corresponding to the resistance of the conductivity variable portion, and the movable unit is moved by the predetermined force.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 3 is a diagram for explaining a method of controlling an optically controlled device according to the first embodiment;

FIG. 4 is a diagram of an example of a lighting time and a lighting timing of LEDs for each color light;

FIG. 12A to FIG. 12C are diagrams each for explaining a position of a transparent electrode and a position of a driving electrode;

FIG. 18A to FIG. 18C are diagrams each for explaining a position of a transparent electrode and a position of a driving electrode according to the seventh embodiment;

FIG. 19 is a schematic diagram of a projector according to an eighth embodiment of the present invention;

DETAILED DESCRIPTION

Exemplary embodiments of an optically controlled device, a method of controlling the optically controlled device, a spatial light modulator, and a projector according to the present invention are explained in detail below with reference to the accompanying drawings.

Figure 1:
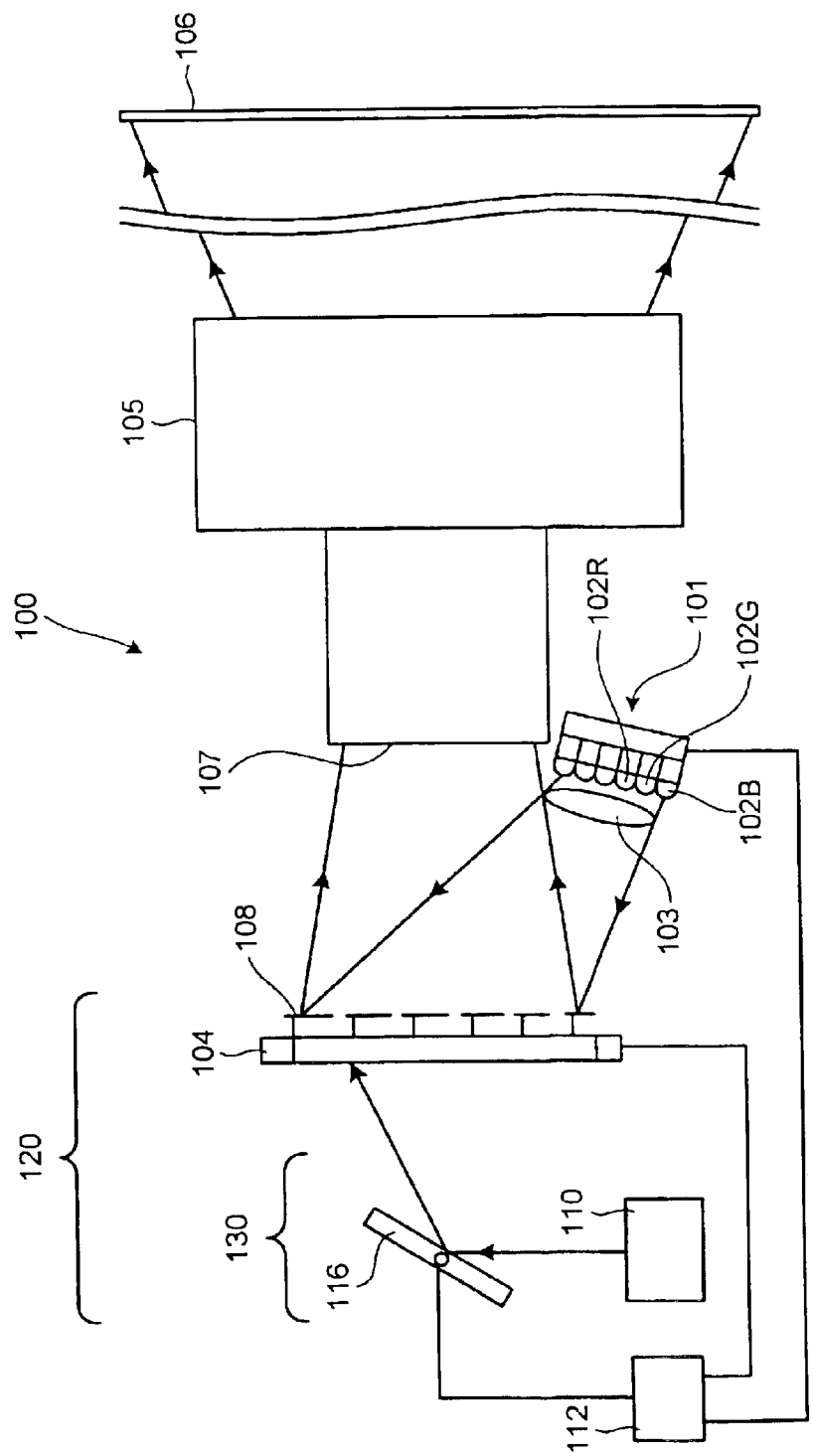
FIG. 1 is a schematic diagram of a projector.
Figure 2:
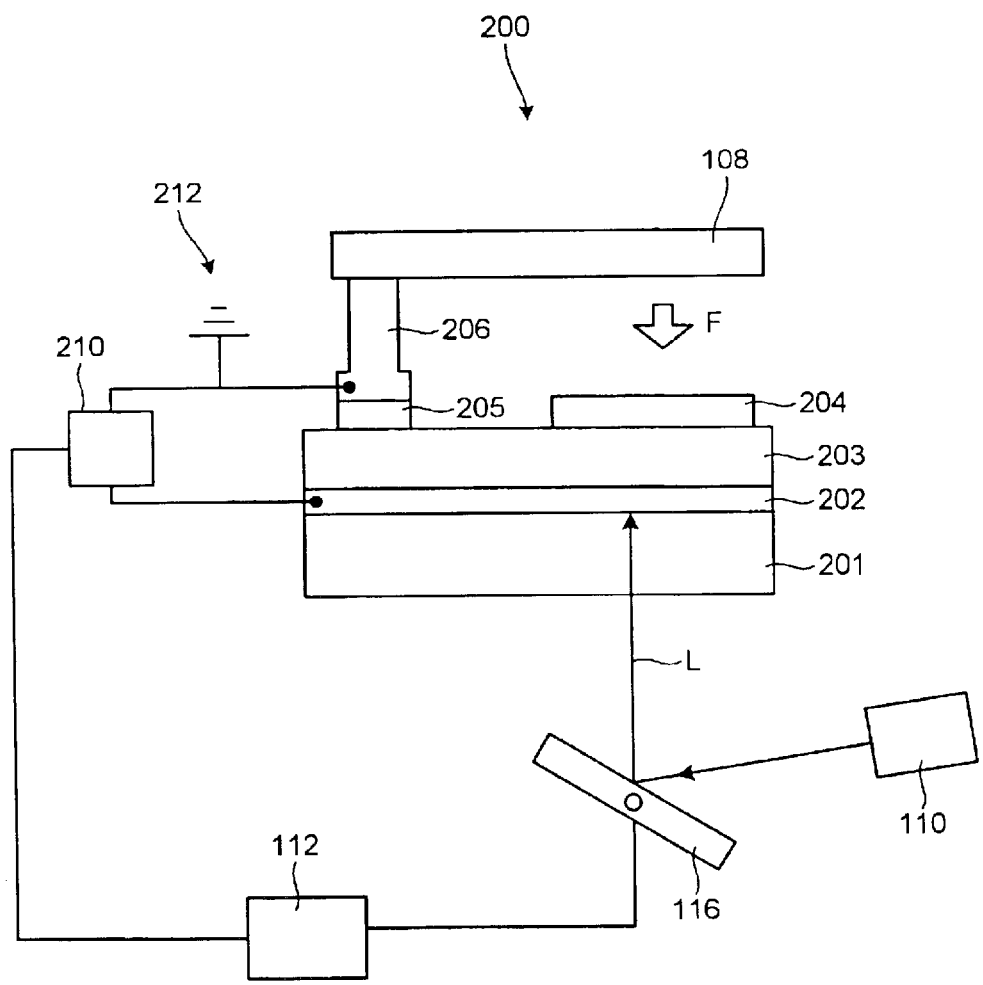
FIG. 2 is a schematic diagram of an optically controlled movable mirror device according to a first embodiment of the present invention.

A schematic configuration of a projector 100 is explained below with reference to FIG. 1, and a method of controlling an optically controlled device according to a first embodiment of the present invention is explained next with reference to FIG. 2 and FIG. 3. The projector 100 includes a light source 101 for illumination light (hereinafter, "an illumination light source 101") with a plurality of light emitting diodes (LEDs) that are solid-state light emitting elements. The illumination light source 101 includes a red (R)-light LED 102R that supplies an R light as a first color light, a blue (B)-light LED 102B that supplies a B light as a second color light, and a green (G)-light LED 102G that supplies a G light as a third color light. The illumination light supplied from the illumination light source 101 passes through a field lens 103 and is incident on a modulator 104 of a spatial light modulator 120.

The field lens 103 has a function of telecentrically illuminating the modulator 104, i.e., a function of making the illumination light as parallel as possible to a main beam and incident on the modulator 104. The projector 100 forms an image with light from the illumination light source 101 on a position of an entrance pupil 107 of a projection lens 105. Therefore, the modulator 104 is Koehler-illuminated with the illumination light supplied from the illumination light source 101. The spatial light modulator 120 includes the modulator 104 and an optical system 130 for control light (hereinafter, "a control-light optical system 130"). The modulator 104 includes a plurality of movable mirrors 108 on the surface thereof that faces the projection lens 105. The movable mirrors 108 are movable according to image signals. The movable mirrors 108 are arranged in the plane of the modulator 104 in the shape of the lattice in which they are substantially perpendicular to each other. The modulator 104 modulates the illumination light from the illumination light source 101 according to an image signal from a controller 112. The controller 112 controls the illumination light source 101 and the spatial light modulator 120 according to the image signal. The projection lens 105 projects the light modulated in the modulator 104 to a screen 106.

The control-light optical system 130 includes a galvano mirror 116 and a light source 110 for control light (hereinafter, "a control light source 110"). The control-light optical system 130 is provided on the opposite side to the projection lens 105 with respect to the modulator 104. The control light source 110 of the control-light optical system 130 supplies a beam light, for example, a laser beam with constant intensity. A semiconductor laser device and a surface-emitting laser device can be used for the control light source 110.

The galvano mirror 116 rotates along predetermined two axes that are substantially perpendicular to each other, and scans light from the control light source 110 in two directions. The galvano mirror 116 rotates according to an image signal from the controller 112. In the above manner, the galvano mirror 116 scans a control light as a beam from the control light source 110 onto the modulator 104.

The configuration of an optically controlled movable mirror device 200 (hereinafter, "a movable mirror device 200") is explained below with reference to FIG. 2. The movable mirror device 200 of FIG. 2 drives one of the movable mirrors 108. The movable mirror device 200 can be produced based on the MEMS technology. A transparent electrode 202 that is optically transparent is provided on a glass substrate 201 that is a plate provided in parallel with the transparent electrode 202 and optically transparent. The transparent electrode 202 is formed with an indium tin oxide (ITO) film. A conductivity variable portion 203 is formed on the transparent electrode 202.

The conductivity variable portion 203 changes an electrical conductivity according to an amount of control light L having passed through the transparent electrode 202. The conductivity variable portion 203 can be made of amorphous silicon (a-Si) or a photosensitive organic film. The a-Si is preferably hydrogenated, and is formed using a method of chemical vapor deposition (CVD).

When the control light L is not illuminated at all, the a-Si functions as an insulating member having the electrical conductivity of almost zero (i.e., a resistance is virtually infinite). On the other hand, when the control light L is illuminated to the a-Si, the electrical conductivity thereof increases according to the amount of the control light L (that is, the resistance decreases). An area where the electrical conductivity changes, in the conductivity variable portion 203, corresponds to an area where the control light L is illuminated in the transparent electrode 202.

An insulating layer 205 is formed between the conductivity variable portion 203 and a support 206 using the spattering technique. The $SiO_2$ can be used for the insulating layer 205. When the transparent electrode 202 and the support 206 are electrically connected, a potential difference is not generated between a driving electrode 204 and the movable mirror 108, which causes the movable mirror 108 not to be driven. Therefore, the insulating layer 205 is provided to prevent electrical connection between the transparent electrode 202 and the support 206.

The support 206 is provided on the insulating layer 205 and movably supports the movable mirror 108. The support 206 is made of a conductive flexible material or a conductive elastic material (such as a metal spring). The driving electrode 204 is formed on the conductivity variable portion 203 in a position different from the position where the insulating layer 205 is provided. The driving electrode 204 and the movable mirror 108 are provided so as to mutually face each other. Both of the movable mirror 108 and the driving electrode 204 can be made of a conductive substance such as aluminum (Al).

A variable power supply 210 applies a voltage between the transparent electrode 202 and the support 206. The voltage to be applied is modulated according to an image signal from the controller 112. A ground (GND) electrode 212 is provided on the side of the support 206 with respect to the variable power supply 210. By grounding it with the GND electrode 212, a reference potential of the variable power supply 210 on the side of the movable mirror 108 is made to almost zero. If a voltage to be applied to the transparent electrode 202 from the variable power supply 210 is higher than the reference potential of the movable mirror 108, electrostatic force F is generated between the movable mirror 108 and the driving electrode 204 by the voltage modulated according to an image signal.

The method of controlling an optically controlled device according to the first embodiment is explained below with reference to FIG. 2 and FIG. 3. At first, at a control light supplying step, the control light L with constant intensity is made incident on the transparent electrode 202 through the glass substrate 201. The control light L made incident on the transparent electrode 202 passes through the transparent electrode 202, and reaches the conductivity variable portion 203. At this time, an electrical conductivity of a portion where the control light L is illuminated, of the conductivity variable portion 203, increases according to the amount of the control light L. With the increase in the electrical conductivity, one of electrodes of the variable power supply 210 is electrically connected to the driving electrode 204 through the transparent electrode 202 and the conductivity variable portion 203.

At a modulated voltage supplying step, a voltage modulated according to an image signal from the controller 112 is applied between the transparent electrode 202 and the movable mirror 108. As a result, the driving electrode 204 is applied with the voltage modulated according to the image signal. More specifically, the area where the conductivity changes in the conductivity variable portion 203 tends to spread over its periphery from a light illuminated position in proportion to the intensity and the illumination time of light.

The modulator 104 scans the control light L at high speed, and sequentially controls adjacent movable mirrors 108. Therefore, it is assumed herein that the conductivity changes only in the vicinity of the area to which the control light L is illuminated. However, the insulating layer 205 is provided to reliably prevent electrical connection between the transparent electrode 202 and the support 206 even if the control light L is incident on a position other than the position corresponding to the driving electrode 204. Thus, it is possible to reliably prevent the movable mirror 108 from being uncontrollable.

As explained above, the variable power supply 210 on the side of the movable mirror 108 is grounded by the GND electrode 212, and therefore, the potential of the movable mirror 108 is always zero that is the reference potential and is constant. The voltage to be applied to the transparent electrode 202 from the variable power supply 210 is set to be higher than the reference potential of the movable mirror 108. When the control light L is made incident on the transparent electrode 202, the voltage is applied to the driving electrode 204 from the variable power supply 210. With this application, the movable mirror 108 has a reference potential lower than that of the driving electrode 204. Because the intensity of the control light L is constant, the conductivity of the conductivity variable portion 203 becomes also constant.

The voltage to be applied to the driving electrode 204 changes only through modulation of the voltage by the variable power supply 210. Therefore, electrostatic force F according to the voltage modulated is generated between the driving electrode 204 and the movable mirror 108. The electrostatic force F is attracting force in a direction in which the movable mirror 108 is attracted to the driving electrode 204. Here, the support 206 is the flexible member. Therefore, the force is exerted in the direction opposite to the electrostatic force F acting on the movable mirror 108 as if the movable mirror 108 is kept in a state where no external force is applied thereto.

At a moving step, the movable mirror 108 moves to a predetermined position according to an image signal by the electrostatic force F and the force by the action of the support 206. The controller 112 controls the movable mirror device 200 by synchronizing the drive of the galvano mirror 116 and the modulation of the voltage by the variable power supply 210. The control light L for the respective R light, the G light, and the B light scans each of the movable mirror devices 200, and optical addressing is thereby performed in one frame of an image.

By using the movable mirror device 200 for the spatial light modulator 120 of the projector 100, the tilt mirror device can be controlled by the optical addressing. When the optical addressing is possible, the interconnect for electrical access to the movable mirrors, which is used in the conventional tilt mirror device, is not needed. Furthermore, because the need for the integrated circuit corresponding to each of the movable mirrors is eliminated by using the optical addressing, the need for integral formation of the integrated circuit and the MEMS structure is also eliminated. As a result, by using the method according to the present invention, it is possible to use the movable mirror device 200 with a simple configuration and at low cost. Moreover, by using the movable mirror device 200, it is possible to obtain the spatial light modulator 120 with a simple configuration and at low cost and the projector 100 using the same.

FIG. 3 is a diagram of examples of controlling the movable mirror device 200 using pixel 1, pixel 2, and pixel 3. The x-axis of each chart as shown in FIG. 3 represents a position where the control light L scans by the galvano mirror 116. As shown in (a) of FIG. 3, the intensity of the control light L is constant for each pixel. As shown in (b) of FIG. 3, the potential of each of the movable mirror 108 is zero volt that is the reference potential and constant. The potential of the transparent electrode 202 represents a voltage according to an image signal applied from the variable power supply 210. As shown in (c) of FIG. 3, a voltage corresponding to an image signal for each pixel is applied to each of the transparent electrodes 202. As a resetting step, the variable power supply 210 applies a voltage of zero volt in synchronization with a reset signal as shown in (d) of FIG. 3, in addition to the voltage corresponding to the image signal.

The conductivity variable portion 203 functions as an insulator when the incidence of the control light L on the transparent electrode 202 is stopped. Therefore, the charge causing the electrostatic force F to be generated between the driving electrode 204 and the movable mirror 108 remains in the driving electrode 204. As a result, the movable mirror 108 can be maintained at the same position between the time when the control light L scans once and writing is performed on the movable mirror device 200 and the time when the control light L scans again and writing is performed on the same movable mirror device 200. This allows a high quality image corresponding precisely to image signals to be obtained.

However, the charge may sometimes remain and accumulate in the driving electrode 204 by continuously applying the voltage from the variable power supply 210 to the transparent electrode 202. If the charge remains and accumulates in the driving electrode 204, it is difficult to apply a voltage according to an image signal to the driving electrode 204. If it is impossible to apply the voltage according to the image signal to the driving electrode 204, it is difficult to generate electrostatic force F according to the voltage modulated. If it is impossible to generate the electrostatic force F according to the image signal, the voltage cannot precisely correspond to the image signal, which may cause the image quality to be degraded.

Before a voltage according to each image signal is applied to each of the pixels, a period is provided in the resetting step. During the period, the voltage becomes zero volt in synchronization with the reset signal as shown in (d) of FIG. 3. At this time, the driving electrode 204 and the movable mirror 108 are mutually at almost the same potential in a part of the time during which the control light L is incident on the transparent electrode 202.

Since the driving electrode 204 and the movable mirror 108 reach almost the same potential within the time when the control light L is incident on the transparent electrode 202, the charge remaining and accumulating in the driving electrode 204 can be discharged from the GND electrode 212. In the above manner, the variable power supply 210 applies the voltage corresponding to the image signal while synchronizing the reset signal and applying the voltage of zero volt. Therefore, it is possible to precisely control the movable mirror device 200 and obtain a high quality image.

As shown in (c) of FIG. 3, the timing at which the driving electrode 204 and the movable mirror 108 reach almost the same potential is set earlier than the timing at which the voltage modulated according to an image signal is applied for each pixel. As explained above, in order to obtain a high quality image, it is necessary to maintain the movable mirror 108 at the same position between the time when writing is once performed on the movable mirror device 200 and the time when the control light L is again incident and writing is performed. Therefore, if the resetting step is provided after the voltage modulated according to the image signal is applied, the positional state of the movable mirror 108 is released right after the writing is performed, and therefore, the movable mirror 108 cannot be maintained at the same position until the next writing.

On the other hand, if the resetting step is provided right before the voltage modulated is applied, the movable mirror 108 can be maintained at the same position for longer time until the control light L is again incident and another writing is performed. Moreover, the charge remaining and accumulating in the driving electrode 204 can be surely removed before the voltage according to the image signal is applied to the driving electrode 204. Thus, it is possible to control the movable mirror device 200 correspondingly precisely to the image signals and obtain a high quality image.

At the resetting step, the time during which the driving electrode 204 and the movable mirror 108 are at almost the same potential is set shorter than a response time during which the movable mirror 108 is movable by the action of the flexible support 206 under no electrostatic force F generated. The electrostatic force F is discharged caused by almost the same potential between the driving electrode 204 and the movable mirror 108. When the electrostatic force F is discharged, the movable mirror 108 is about to move by the action of the flexible support 206. The direction in which the movable mirror 108 is about to move by the action of the flexible support 206 is opposite to the direction in which the movable mirror 108 moves by the action of the electrostatic force F.

On the other hand, as explained above, in order to obtain a high quality image, it is necessary to move the movable mirror 108 correspondingly more precisely to the image signal. Therefore, if the movable mirror 108 moves only by the action of the support 206 and the positional state corresponding to the image signal is released at each resetting step, this may cause degradation of the image quality.

Therefore, the time during which the driving electrode 204 and the movable mirror 108 are at almost the same potential is set shorter than the response time during which the movable mirror 108 is movable by the action of the support 206. By setting so, the charge in the driving electrode 204 can be discharged without movement of the movable mirror 108. The movable mirror 108 can move correspondingly precisely to the image signal without unnecessary movement that is not caused by the image signal. Thus, it is possible to control the movable mirror device 200 correspondingly precisely to the image signal and obtain a high quality image.

Lighting times and their timing of the R-light LED 102R, the G-light LED 102G, and the B-light LED 102B are explained below with reference to FIG. 4. FIG. 4 depicts an example of each lighting time and lighting timing of the R-light LED 102R, the G-light LED 102G, and the B-light LED 102B. The LEDs 102R, 1 02G, and 102B for the color lights light up according to each image signal from the controller 112 (see FIG. 1). During each lighting time of the R light, the G light, and the B light within one frame period, the control light L scans each of the movable mirror devices 200. To obtain a projection image in white color as a whole by sequentially projecting the R light, the G light, and the B light, it is necessary that the amount of light flux of the G light is contained 60% to 80% of the whole amount of light flux. If the output amount of the LEDs 102R, 102G, and 102B for the color lights is the same as the number of LEDs, shortage of the light flux amount of the G light may result.

Therefore, as shown in FIG. 4, a lighting time GT of the G-light LED 102G is set to longer than both of a lighting time RT of the R-light LED 102R and a lighting time BT of the B-light LED 102B. According to the method of the present invention, the movable mirror 108 is movable to a predetermined position according to an image signal, which allows the amount of continuous changes corresponding to an analog signal to be displayed. Therefore, the lighting times RT, GT, and BT of the LEDs 102R, 102G, and 102B for the color lights may be set to almost the same as one another, and the amount of the G light larger than the other lights may be reflected from the movable mirror 108 toward the projection lens 105. In this manner, the amount of light flux of the G light may be increased.

Figure 5:
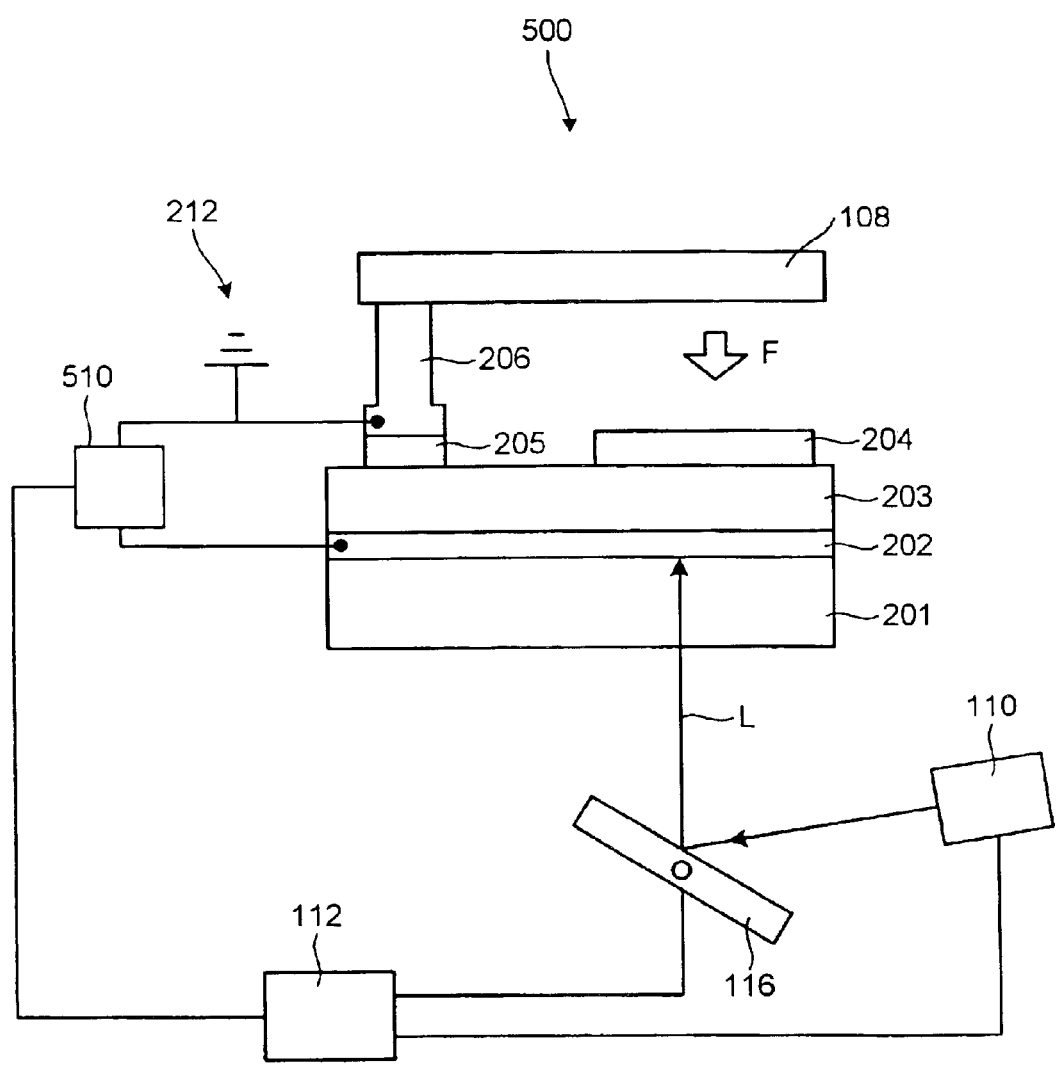
FIG. 5 is a schematic diagram of an optically controlled movable mirror device according to a second embodiment of the present invention.

FIG. 5 depicts the configuration of an optically controlled movable mirror device 500 (hereinafter, "a movable mirror device 500") used in a method of controlling an optically controlled device according to a second embodiment of the present invention. The same reference signs are assigned to the same portions as those of the movable mirror device 200 of the first embodiment, and explanation thereof is omitted. The method of the second embodiment is different from that of the first embodiment in points such that the intensity of the control light L is modulated according to an image signal and a constant voltage is applied to the transparent electrode 202.

At a control light supplying step, the control light L whose intensity is modulated according to an image signal is made incident on the transparent electrode 202. The control light source 110 supplies a beam light, for example, a laser beam from the controller 112 according to a n image signal. A semiconductor laser device and a surface-emitting laser device having a modulator can be used for the control light source 110.

At a voltage supplying step, a power supply 510 applies a constant voltage between the trans parent electrode 202 and the movable mirror 108. If the intensity of the control light L increases, the electrical conductivity of the conductivity variable portion 203 increases. On the other hand, the voltage applied to the transparent electrode 202 is constant, and therefore, electrostatic force F according to the intensity of the control light L is generated between the driving electrode 204 and the movable mirror 108. As a result, at the moving step, the movable mirror 108 moves to a predetermined position according to the image signal.

Figure 6:
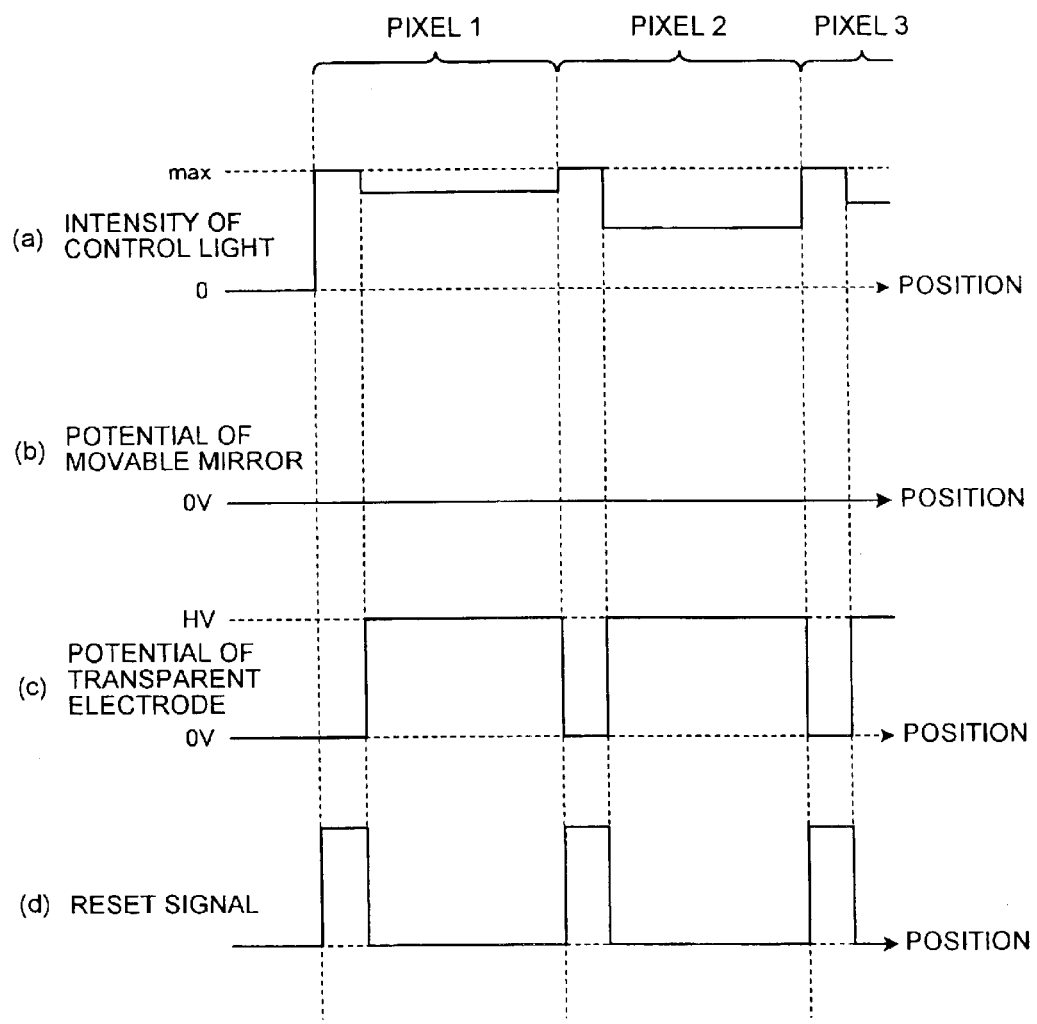
FIG. 6 is a diagram for explaining a method of controlling an optically controlled device according to the second embodiment.

FIG. 6 depicts an example of controlling the movable mirror device 500. In the same manner as the method of the first embodiment as shown in FIG. 3, the method of this embodiment includes the resetting step. As shown in (a) of FIG. 6 the intensity of the control light L is set to a maximum value max in synchronization with the reset signal as shown in (d) of FIG. 6. Other than the maximum value max set, the intensity of the control light L is modulated according to an image signal from the controller 112.

As shown in (c) of FIG. 6, the voltage applied to the transparent electrode 202 is set to zero volt in synchronization with the reset signal. The voltage applied to the transparent electrode 202 is always a constant value VH except for each period of the reset signal. At the resetting step, the intensity of the control light L is made to the maximum value max, and therefore, the conductivity of the conductivity variable portion 203 becomes a maximum. If the voltage to be applied to the transparent electrode 202 is set to zero volt assuming the intensity of the control light L is the maximum value max, the voltage of zero volt is applied to the driving electrode 204. The potential of the movable mirror 108 is always zero volt that is the reference potential and constant because it is grounded to the GND electrode 212. Therefore, the driving electrode 204 and the movable mirror 108 reach almost the same potential, and the charge remaining and accumulating in the driving electrode 204 can be discharged from the GND electrode 212.

Furthermore, in the same manner as the method of the first embodiment as shown in FIG. 3, the timing of the resetting step is set before the timing at which the control light L modulated according to an image signal is illuminated. The time during which the driving electrode 204 and the movable mirror 108 are at almost the same potential is shorter than the response time during which the movable mirror 108 is movable by the action of the flexible support 206.

Since the movable mirror 108 is driven by the optical addressing, the need for the interconnect for driving the movable mirrors 108 is eliminated, and the need for integral formation of the integrated circuit and the MEMS structure is also eliminated. Thus, it is possible to use the movable mirror device 500 with a simple configuration and at low cost. Furthermore, by providing the resetting step, the charge remaining in the driving electrode 204 can be discharged. Thus, it is possible to control the movable mirror device 500 correspondingly precisely to an image signal and obtain a high quality image.

Figure 7:
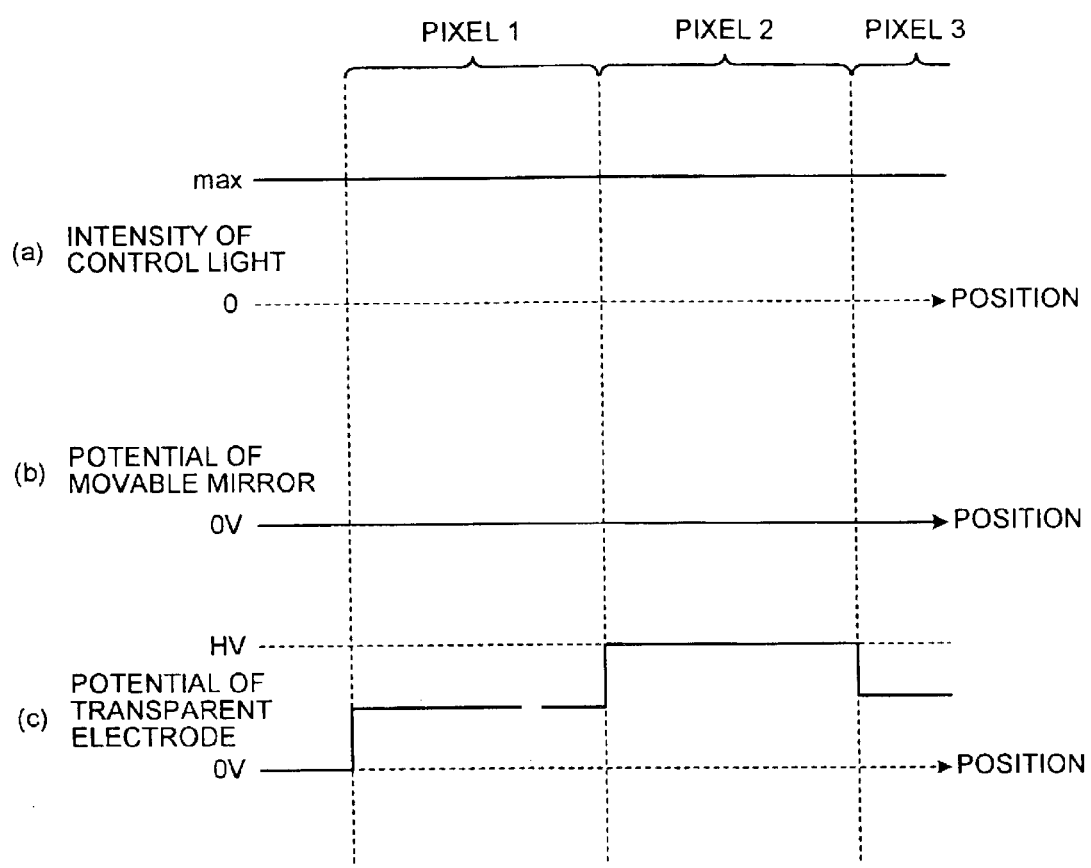
FIG. 7 is a diagram for explaining a method of controlling an optically controlled device according to a third embodiment of the present invention.

FIG. 7 depicts an example of controlling the movable mirror device 200 for explaining a method of controlling an optically controlled device according to a third embodiment of the present invention. The configuration of the movable mirror device 200 used in the third embodiment is the same as that of the movable mirror device 200 of the first embodiment (see FIG. 2), and therefore, the figure and the explanation thereof are omitted. The method of the third embodiment is different from that of the first embodiment in a point such that the resetting step is not included therein. As shown in (c) of FIG. 7, a voltage modulated according to an image signal is applied to the transparent electrode 202 concurrently when the control light L is incident on the pixel. The variable power supply 210 applies only the voltage modulated according to the image signal to the transparent electrode 202.

When the movable mirror device 200 whose driving speed is slow is used, or when the conductivity variable portion 203 whose resistance is low is used, the charge remaining in the driving electrode 204 passes through the conductivity variable portion 203 with time. The driving electrode 204 and the transparent electrode 202 eventually reach almost the same potential, and the charge in the driving electrode 204 is less accumulated. Therefore, the movable mirror device 200 can be controlled correspondingly to the image signal without active removal of the charge remaining in the driving electrode 204.

If the reset operation is actively performed after the writing is performed once, it is necessary to precisely synchronize the timing at which the driving electrode 204 and the movable mirror 108 reach almost the same potential and the timing at which the control light L starts illustrating the pixel. If a period during which the driving electrode 204 and the movable mirror 108 are at almost the same potential is not provided and only the voltage modulated according to the image signal is applied, a high quality image can be obtained even if a mechanism for precisely synchronizing a voltage supply and scanning of the control light L is not provided. Therefore, it is possible to control the movable mirror device 200 correspondingly precisely to an image signal without provision of the mechanism.

Figure 8:
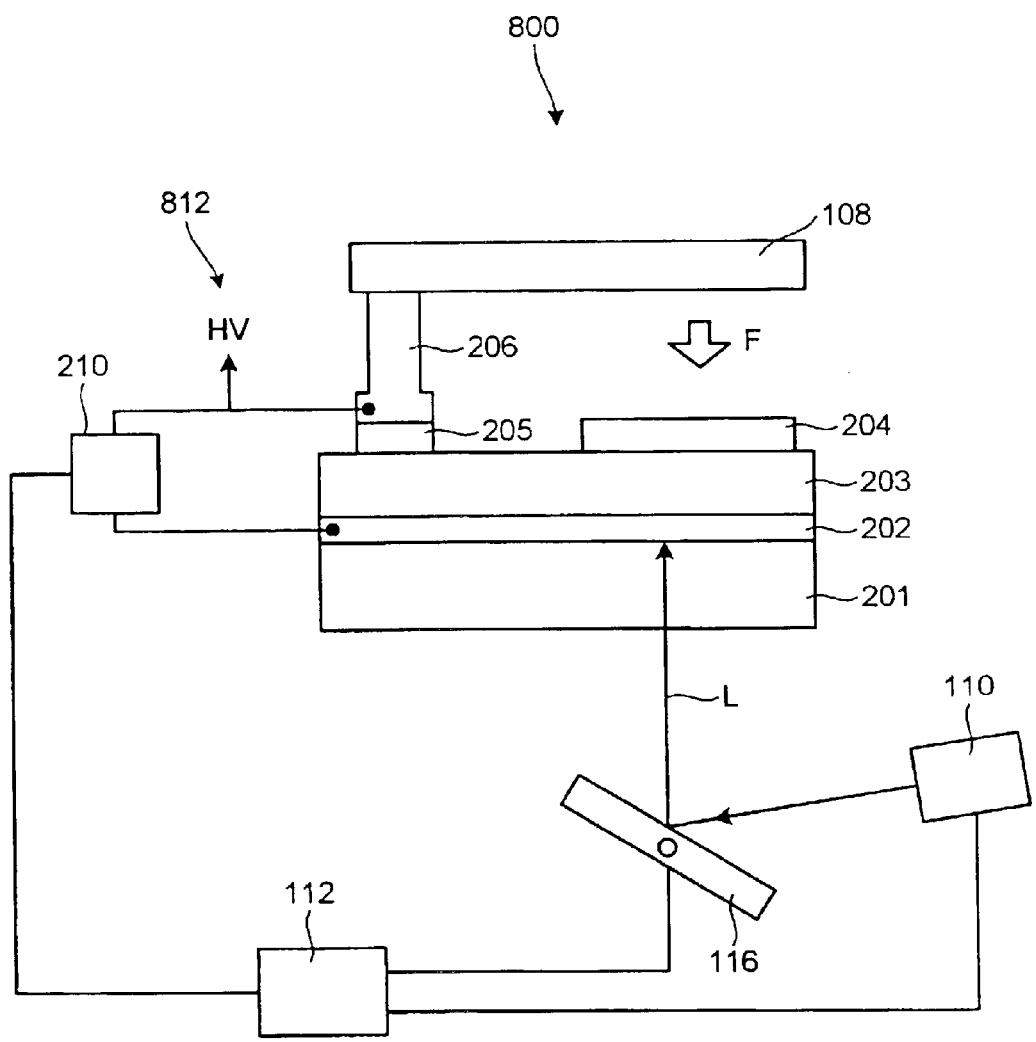
FIG. 8 is a schematic diagram of an optically controlled movable mirror device according to a fourth embodiment of the present invention.

FIG. 8 depicts the configuration of an optically controlled movable mirror device 800 (hereinafter, "a movable mirror device 800") used in a method of controlling an optically controlled device according to a fourth embodiment of the present invention. The same reference signs are assigned to portions the same as those of the movable mirror device 200 of the first embodiment, and explanation thereof is omitted. The method of the fourth embodiment is different from the method of the first embodiment in a point such that the movable mirror 108 has a reference potential higher than that of the driving electrode 204 by an electrode 812. If the reference potential of the movable mirror 108 is set to higher than that of the driving electrode 204, electrostatic force F is generated between the movable mirror 108 and the driving electrode 204 by a voltage modulated according to an image signal.

Figure 9:
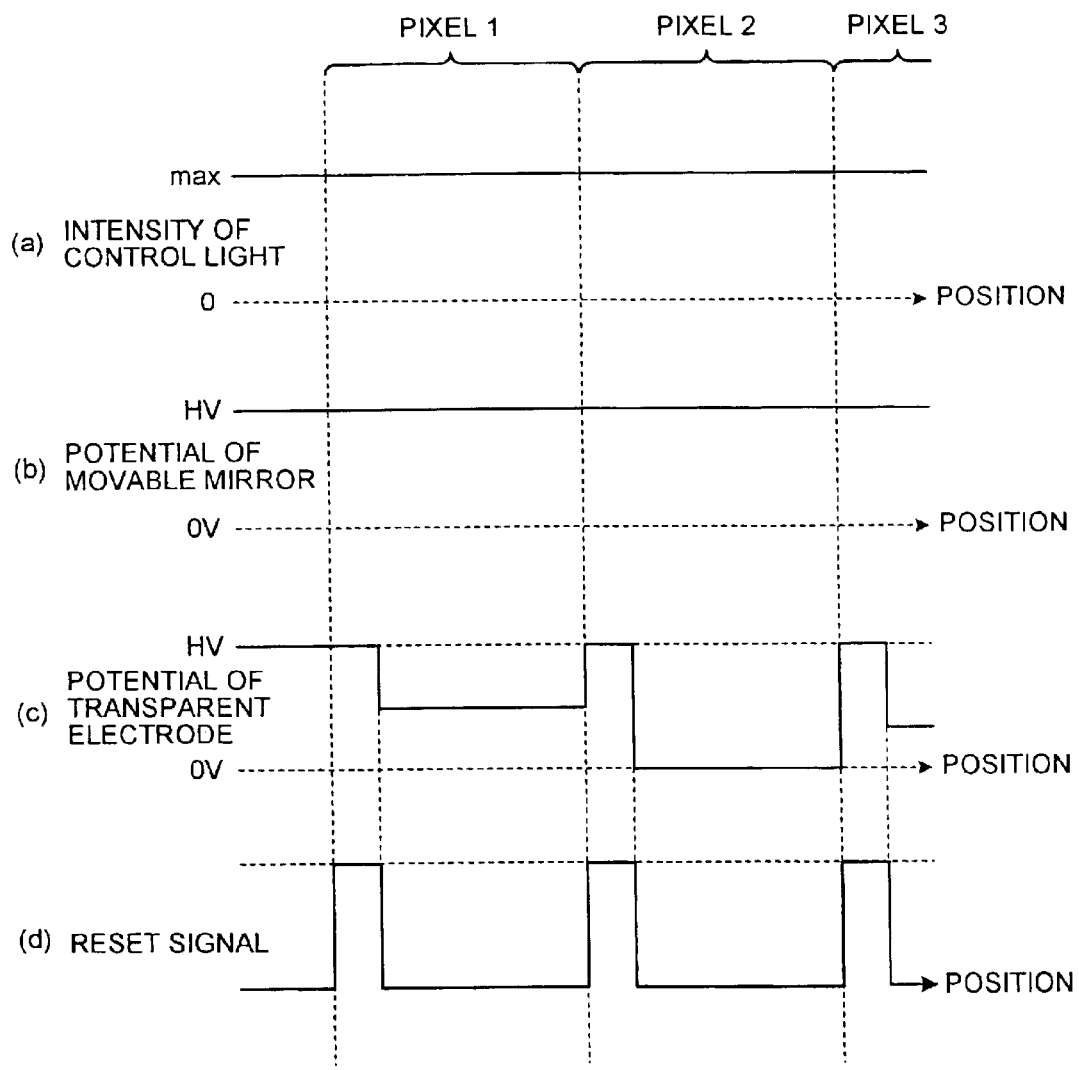
FIG. 9 is a diagram for explaining a method of controlling an optically controlled device according to the fourth embodiment.

FIG. 9 depicts an example of controlling the movable mirror device 800 for explaining the method according to the fourth embodiment. As shown in (a) of FIG. 9, the method of the fourth embodiment is the same as that the first embodiment as shown in FIG. 3 in a point such that the intensity of the control light L is constant. As shown in (b) of FIG. 9, the potential of the movable mirror 108 is maintained to HV (H>0). As shown in (c) of FIG. 9, the voltage to be applied to the transparent electrode 202 is lower than the reference potential of the movable mirror 108. By making the control light L incident on the transparent electrode 202, a voltage from the variable power supply 210 is applied to the driving electrode 204, which causes the movable mirror 108 to have the reference potential higher than that of the driving electrode 204. Therefore, electrostatic force F according to the voltage modulated is generated between the driving electrode 204 and the movable mirror 108.

The electrostatic force F is generated caused by a potential difference between the driving electrode 204 and the movable mirror 108. Therefore, in order to move the movable mirror 108 in the same manner as the method of the first embodiment, as shown in (c) of FIG. 9, a voltage needs to be applied to the transparent electrode 202. The voltage is a rectangular wave upside down with respect to that of the chart as shown in (c) of FIG. 9 based on the voltage HV as a reference.

In the same manner as the method of the first embodiment, the resetting step can be included in the method of the fourth embodiment. As shown in (c) of FIG. 9, the voltage of HV is applied in synchronization with the reset signal as shown in (d) of FIG. 9. Application of the voltage of HV to the transparent electrode 202 causes the driving electrode 204 and the movable mirror 108 to have almost the same potential, which allows the charge in the driving electrode 204 to be discharged.

Furthermore, in the same manner as the method of the first embodiment as shown in FIG. 3, the timing of the resetting step is set before the timing at which the control light L modulated according to an image signal is illuminated. The time during which the driving electrode 204 and the movable mirror 108 are at almost the same potential is shorter than the response time during which the movable mirror 108 is movable by the action of the flexible support 206.

Because the movable mirror 108 is driven by the optical addressing, the need for the interconnect for driving the movable mirrors 108 is eliminated, and the need for integral formation of the integrated circuit and the MEMS structure is also eliminated. Thus, it is possible to use the movable mirror device 800 with a simple configuration and at low cost. Furthermore, by providing the resetting step therein, the charge remaining in the driving electrode 204 can be discharged. Thus, it is possible to control the movable mirror device 800 correspondingly precisely to the image signal and obtain a high quality image.

Both a direct current (DC) power supply and an alternating current (AC) power supply may be used for the variable power supply 210. As explained with reference to the first and the fourth embodiments, if the DC power supply is used, by setting the reference voltage of the movable mirror 108 higher or lower than that of the driving electrode 204, the method according to the present invention can be executed. If the AC power supply is used, the potential difference between the movable mirror 108 and the driving electrode 204 becomes zero at the instant when the phase of the voltage changes. Therefore, the DC power supply produces a rectangular wave so that the phases are switched in such a short time (e.g., 100 nanoseconds) as being negligible as compared with the response time for movement of the movable mirror 108. Thus, the movable mirror 108 can move without being affected by a change in phase.

Furthermore, even if the polarity of the voltage changes caused by the change in phase, the potential difference between the movable mirror 108 and the driving electrode 204 does not change. Therefore, the movable mirror 108 is not affected by the change in the polarity of the voltage to be applied. As a result, by setting a difference between a reference potential of the movable mirror 108 and an absolute value of an amplitude of an AC voltage of the driving electrode 204, electrostatic force F can be generated between the movable mirror 108 and the driving electrode 204.

Since the AC current is always with transfer of charge, accumulation and attraction of charge is prevented to stable a voltage, and the voltage can be applied. Furthermore, by providing the resetting step of resetting the driving electrode 204 and the movable mirror 108 to almost the same potential, the charge remaining in the driving electrode 204 can be surely discharged, which allows the optically controlled movable mirror device to be precisely controlled.

Any of the following elements can be used for the illumination light source 101 of the projector 100. The elements include LED, a semiconductor laser, other solid-state light emitting elements such as an electroluminescent (EL) element, and a lamp other than the solid-state light emitting elements. In the method of controlling the optically controlled device according to the present invention, analog control is performed such that amounts of continuous changes are represented using voltages modulated according to image signals. However, the method according to the present invention may be used for digital control.

For example, the voltage applied to the transparent electrode 202 has only a binary value of on and off, and gradation may be expressed by driving subframes. Furthermore, not only when the optically controlled device is used in the projector 100, but also when the optically controlled device is used in an optical switch for optical communication, the method according to the present invention can be used.

Figure 10:
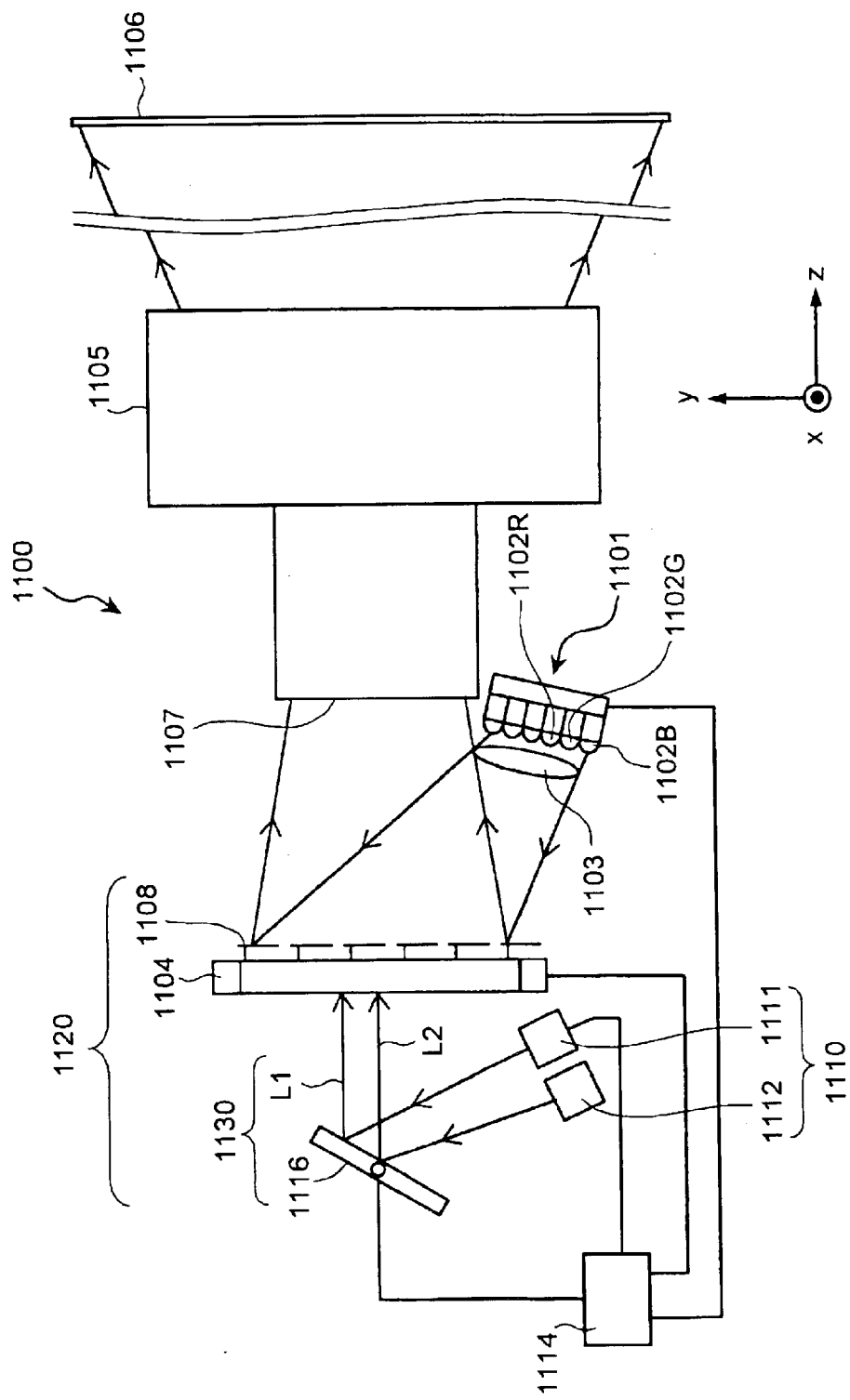
FIG. 10 is a schematic diagram of a projector according to a fifth embodiment of the present invention.

FIG. 10 depicts a schematic configuration of a projector 1100 according to a fifth embodiment of the present invention. The projector 1100 includes an illumination light source 1101 with a plurality of LEDs that are solid-state light emitting elements. The illumination light source 1101 includes a R-light LED 1102R that supplies an R light as the first color light, a B-light LED 1102B that supplies a B light as the second color light, and a G-light LED 1102G that supplies a G light as the third color light. The illumination light supplied from the illumination light source 1101 passes through a field lens 1103 and is incident on a modulator 1104 of a spatial light modulator 1120.

The field lens 1103 has a function of telecentrically illuminating the modulator 1104, i.e., a function of making the illumination light as parallel as possible to a main beam and incident on the modulator 1104. The projector 1100 forms an image with light,s from the illumination light source 1101 on a position of an entrance pupil 1107 of a projection lens 1105. Therefore, the modulator 1104 is Koehler-illuminated with the illumination light supplied from the illumination light source 1101.

The spatial light modulator 1120 includes the modulator 1104 and a control-light optical system 1130. The modulator 1104 includes a plurality of movable mirrors 1108 on the surface thereof that faces the projection lens 1105. The movable mirrors 1108 are movable according to image signals. The movable mirrors 1108 are arranged in the shape of the lattice in which they are substantially perpendicular to each other, in the plane of the modulator 1104. The modulator 1104 moves the movable mirror 1108 according to an image signal, and reflects the illumination light from the illumination light source 1101 toward the projection lens 1105 is or in a direction other than the projection lens 1105. The modulator 1104 represents gradation by changing an amount of light according to an image signal. The light is reflected by each of the movable mirror 1108 to be made incident on the entrance pupil 1107 of the projection lens 1105.

In the above mariner, the modulator 1104 modulates the illumination light from the illumination light source 1101 according to an image signal from a controller 1114. The controller 1114 controls the illumination light source 1101 and the spatial light modulator 1120 according to the image signal. The projection lens 1105 projects the light modulated in the modulator 1104 to a screen 1106.

The control-light optical system 1130 includes a galvano mirror 1116 and a control light source 1110. The control-light optical system 1130 is provided on the opposite side to the projection lens 1105 with respect to the modulator 1104. The control light source 1110 includes a first control light source 1111 and a second control light source 1112. The first control light source 1111 supplies a first control light L1 and the second control light source 1112 supplies a second control light L2. The first control light L1 and the second control light L2 are beam lights, for example, laser beams. A semiconductor laser device and a surface-emitting laser device can be used for the first and the second control light sources 1111 and 1112. By providing a modulator in the first control light source 1111, the intensity of the first control light L1 is modulated according to an image signal from the controller 1114 to supply the first control light L1 with the intensity modulated. The first control light L1 and the second control light L2 are reflected toward the modulator 1104 by the galvano mirror 1116 and are incident on the modulator 1104 at predetermined intervals.

The galvano mirror 1116 rotates along predetermined two axes that are substantially perpendicular to each other, and scans the first control light L1 and the second control light L2 in two directions. Rotation of the galvano mirror 1116 is controlled according to an image signal from the controller 1114. In the above manner, the control-light optical system 1130 scans the first control light L1 and the second control light L2 onto the modulator 1104. Although the galvano mirror 1116 is singly used to scan the first control light L1 and the second control light L2, different galvano mirrors 1116 may be used to scan the first control light L1 and the second control light L2, respectively. However, when the respective galvano mirrors are used to scan them, the driving of the galvano mirrors needs to be precisely synchronized with each other.

The configuration of an optically controlled movable mirror device 1200 (hereinafter, "a movable mirror device 1200") is explained below with reference to FIG. 11 and FIG. 12A to FIG. 12C. The movable mirror device 1200 is configured to drive one movable mirror 1108. The movable mirror device 1200 can be formed using the MEMS technology. A conductivity variable portion 1204 is provided on a glass substrate 1201 that is optically transparent and is a plate provided in parallel with the conductivity variable portion 1204. A first transparent electrode 1202 and a second transparent electrode 1203 that are optically transparent are provided on a plane where the glass substrate 1201 and the conductivity variable portion 1204 are jointed. The first transparent electrode 1202 and the second transparent electrode 1203 are formed with an ITO film.

The conductivity variable portion 1204 is caused to change the electrical conductivity by the first control light L1 having passed through the first transparent electrode 1202 and by the second control light L2 having passed through the second transparent electrode 1203. The conductivity variable portion 1204 can be made of a-Si or a photosensitive organic film. The a-Si is preferably hydrogenated, and is formed using the CVD method.

When the first control light L1 and the second control light L2 are not illuminated at all, the a-Si functions as an insulating member having the electrical conductivity of almost zero (i.e., a resistance is virtually infinite). On the other hand, when the first control light L1 and the second control light L2 are illuminated to the a-Si, the electrical conductivity increases according to the amount of the control lights (that is, the resistance decreases). An area where the electrical conductivity changes, in the conductivity variable portion 1204, corresponds to an area where the first control light L1 is illuminated in the first transparent electrode 1202 and to an area where the second control light L2 is illuminated in the second transparent electrode 1203.

An insulating layer 1205 is formed between the conductivity variable portion 1204 and a support 1206 using the spattering technique. The $SiO_2$ can be used for the insulating layer 1205. The support 1206 is provided on the insulating layer 1205 and movably supports the movable mirror 1108. The support 1206 is made of a flexible material or an elastic material (such as a metal spring). A driving electrode 1210 is formed on the conductivity variable portion 1204 in a position different from the position where the insulating layer 1205 is provided. The driving electrode 1210 and the movable mirror 1108 are provided so as to mutually face each other. Both of the movable mirror 1108 and the driving electrode 1210 can be made of a conductive substance such as aluminum (Al).

A power supply 1212 applies a predetermined voltage between the first transparent electrode 1202 and the movable mirror 1108. It is noted that the support 1206 may be made of a conductive flexible material or a conductive elastic material, and the power supply 1212 may be connected between the first transparent electrode 1202 and the support 1206. If the support 1206 is made of a conductive material, the support 1206 and the movable mirror 1108 are at almost the same potential. Therefore, application of a predetermined voltage to the support 1206 allows the predetermined voltage to be applied to the movable mirror 1108.

The second transparent electrode 1203 is electrically connected to a GND electrode 1214. By grounding it with the GND electrode 1214, a reference potential of the second transparent electrode 1203 is made to almost zero. The reference voltage of the second transparent electrode 1203 is almost zero, which causes the reference potential of the second transparent electrode 1203 to be different from that of the first transparent electrode 1202. A light-shielding portion 1220 is formed on the glass substrate 1201 on the side that faces the galvano mirror 1116.

The light-shielding portion 1220 can be formed as a film by subjecting the glass substrate 1201 to metal evaporation. The light-shielding portion 1220 may be formed by bonding a light-shielding member to the glass substrate 1201. The light-shielding portion 1220 has an aperture 1222 made at a position through which the first control light L1 and the second control light L2 pass. The position of the aperture 1222 is explained in detail later.

A positional relationship of the first and the second transparent electrodes 1202, 1203 and the driving electrode 1210 is explained. FIG. 12A depicts the configuration of the movable mirror device 1200 when viewed from the projection lens 1105 (see FIG. 10). If the movable mirror device 1200 is viewed from the side of the projection lens 1105, only the movable mirror 1108 can be recognized. FIG. 12B depicts the configuration of the movable mirror device 1200 without the movable mirror 1108 in the configuration of FIG. 12A when viewed from the projection lens 1105. FIG. 12C depicts the configuration thereof when viewed from the control-light optical system 1130 (see FIG. 10). The configuration as shown in FIG. 12C is the movable mirror device 1200 of FIG. 12A when viewed from the rear side thereof.

As shown in FIG. 12C, the first transparent electrode 1202 and the second transparent electrode 1203 are arranged so that they respectively occupy areas obtained by dividing a square of the glass substrate 1201 on an x-y plane with a diagonal line. As shown in FIG. 12B and FIG. 12C, the driving electrode 1210 is arranged so as to overlap both the first transparent electrode 1202 and the second transparent electrode 1203.

Referring back to FIG. 11, control for the movable mirror device 1200 by the first control light L1 and the second control light L2 is explained below. The first control light L1 passes through the aperture 1222 to be incident only on the first transparent electrode 1202. By causing the first control light L1 with intensity according to an image signal to be incident on the first transparent electrode 1202, electrical conductivity increases at a portion of the conductivity variable portion 1204 that is jointed to the first transparent electrode 1202. The electrical conductivity increases according to the amount of the first control light L1.

The increase in the conductivity of the conductivity variable portion 1204 allows one of the electrodes of the power supply 1212 to be electrically connected to the driving electrode 1210. The electrical connection is realized through the first transparent electrode 1202 and the conductivity variable portion 1204. The conductivity of the conductivity variable portion 1204 changes according to the amount of the first control light L1 having passed through the first transparent electrode 1202. Therefore, a voltage according to the amount of the first control light L1 is applied to the driving electrode 1210. As a result, the voltage according to an image signal is applied to the driving electrode 1210. Strictly speaking, the area where the conductivity changes in the conductivity variable portion 1204 tends to spread over its periphery from a light illuminated position in proportion to the intensity and the illumination time of light.

The modulator 1104 scans the first control light L1 and the second control light L2 at high speed, and sequentially controls adjacent movable mirrors 108. Therefore, it is assumed that the conductivity changes only in the vicinity of the area to which the first control light L1 is illuminated and in the vicinity of the area to which the second control light L2 is illuminated.

The other electrode of the power supply 1212 is electrically connected to the movable mirror 1108. By making the first control light L1 incident on the first transparent electrode 1202, a potential difference is generated between the movable mirror 1108 and the driving electrode 1210. The potential difference is generated based on the variation in the conductivity of the conductivity variable portion 1204. Generation of the potential difference between the two causes predetermined force according to the potential difference, such as electrostatic force (attracting force) F to be generated.

The electrostatic force F is attracting force in a direction in which the movable mirror 1108 is attracted to the driving electrode 1210. Here, the support 1206 is the flexible member or the elastic member. Therefore, the force repulsive to the electrostatic force F is generated in the support 1206 as if the support 1206 is applied with no external force. At this time, the force acting on the movable mirror 1108 by the support 1206 is exerted in the opposite direction to the electrostatic force F. The movable mirror 1108 moves to a predetermined position according to an image signal by the action of the electrostatic force F and the force generated in the support 1206. In this manner, the movable mirror 1108 can be driven according to the image signal.

Figure 11:
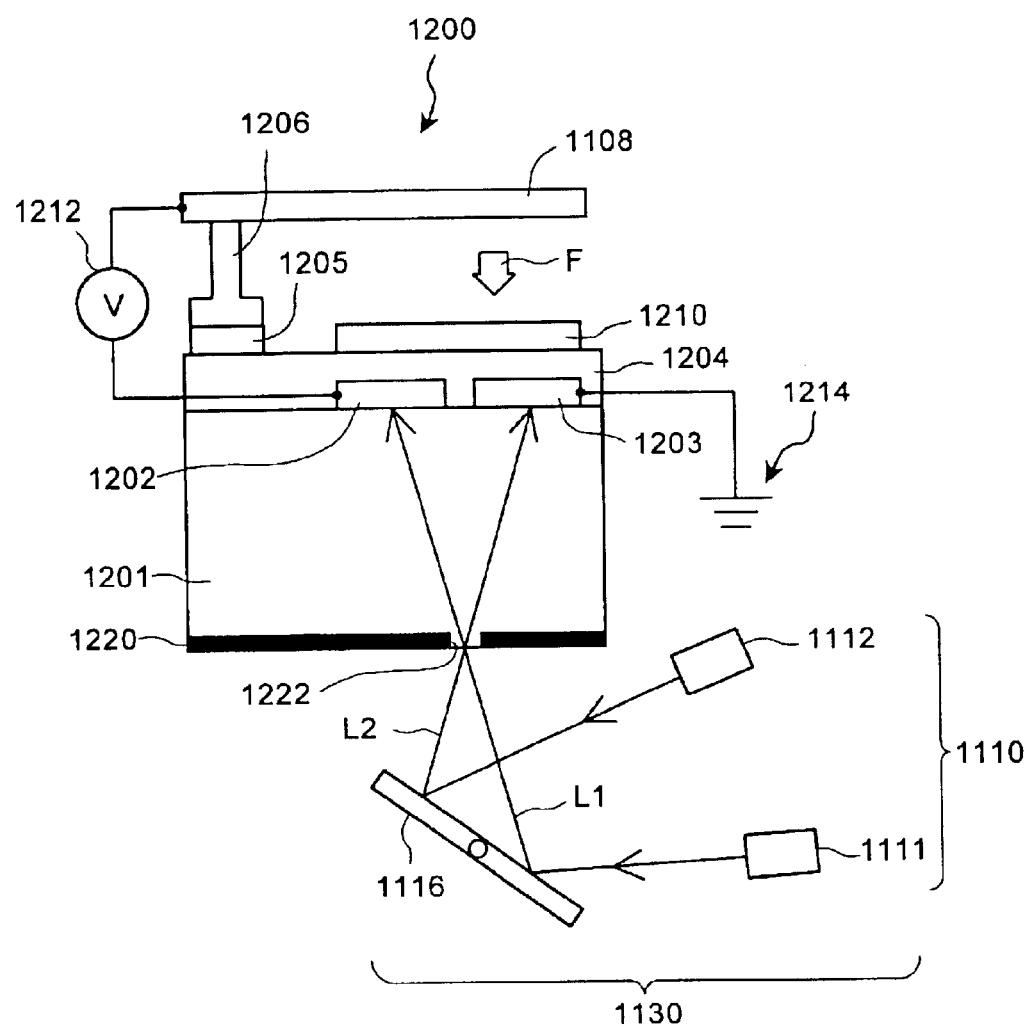
FIG. 11 is a schematic diagram of an optically controlled movable mirror device according to the fifth embodiment.

The movable mirror 1108 of FIG. 11 represents a state in which the electrostatic force F is not generated. When the electrostatic force F is not generated, the movable mirror 1108 is positioned in substantially parallel to the glass substrate 1201. By synchronizing the drive of the galvano mirror 1116 and the modulation of the first control light L1, the controller 1114 (see FIG. 10) controls the movable mirror devices 1200. The first control light L1 modulated according to an image signal, for the respective R light, the G light, and the B light, is scanned onto each of the movable mirror devices 1200, and optical addressing is thereby performed in one frame of an image.

The movable mirror 1108 and the driving electrode 1210 come in contact with each other to cause energization or electrical charges to occur between the driving electrode 2210 and the movable mirror 2108, which leads to a state in which the movable mirror 1108 may remain contacting the driving electrode 1210 and may be uncontrollable. Therefore, it is necessary to use any flexible member for the support 1206 so that the movable mirror 1108 and the driving electrode 1210 do not come in contact with each other when the electrostatic force F becomes the maximum. Alternatively, another member having almost the same potential as that of the movable mirror 1108 may be provided in a position in which the member can contact the movable mirror 1108 when the tilt of the movable mirror 1108 becomes the maximum by the electrostatic force F.

By bringing the movable mirror 1108 in contact with another material, it is possible to prevent the movable mirror 1108 and the driving electrode 1210 from being in contact with each other.

Furthermore, if the driving electrode 1210 and the movable mirror 1108 are electrically connected, no potential difference is generated between the driving electrode 1210 and the movable mirror 1108, which makes it impossible to drive the movable mirror 1108. The insulating layer 1205 is provided to reliably prevent electrical connection between the driving electrode 1210 and the movable mirror 1108.

By stopping the incidence of the first control light L1 on the first transparent electrode 1202, the conductivity variable portion 1204 functions as an insulator. Therefore, the charge that generates the electrostatic force F between the driving electrode 1210 and the movable mirror 1108 remains in the driving electrode 1210. By using this, the movable mirror 1108 can be maintained at the same position between the time when the movable mirror 1108 moves by the first control light L1 and the time when the first control light L1 is again incident on the first transparent electrode 1202 of the same movable mirror device 1200. This makes it possible to control the movable mirror 1108 correspondingly precisely to the image signal.

However, if the charge remains and accumulates in the driving electrode 1210 by repeating this operation, it may be difficult to apply a voltage according to an image signal to the driving electrode 1210. If the voltage cannot be applied to the driving electrode 1210, it is difficult to generate electrostatic force F according to the image signal. If the electrostatic force F cannot be generated, the movable mirror 1108 cannot precisely corresponds to the image signal, which may cause degradation of image quality.

The second transparent electrode 1203 is provided in order to remove the charge remaining in the driving electrode 1210. The second control light L2 passes through the aperture 1222 to be incident only on the second transparent electrode 1203. By causing the second control light L2 to be incident on the second transparent electrode 1203, electrical conductivity increases according to the amount of the second control light L2 at a portion of the conductivity variable portion 1204. The portion is jointed to the second transparent electrode 1203. When the conductivity of the conductivity variable portion 1204 increases, the driving electrode 1210 is electrically connected to the GND electrode 1214 that is connected to the second transparent electrode 1203.

When the driving electrode 1210 and the GND electrode 1214 are electrical connected, the charge remaining in the driving electrode 1210 moves to the GND electrode 1214 through the conductivity variable portion 1204 and the second transparent electrode 1203. The charge in the driving electrode 1210 can be discharged in the above manner. This causes the charge remaining in the driving electrode 1210 to surely be removed, and it is thereby possible to precisely apply the voltage according to the image signal to the driving electrode 1210.

The second transparent electrode 1203 is not necessarily electrically connected to the GND electrode 1214 to obtain the reference potential of almost zero. For example, by setting the second transparent electrode 1203 to higher potential than that of the first transparent electrode 1202, the second transparent electrode 1203 may have a reference potential different from that of the first transparent electrode 1202. The second transparent electrode 1203 can remove the charge remaining in the driving electrode 1210 regardless of a higher potential and a lower potential than that of the first transparent electrode 1202 by setting the reference potential to a potential different from that of the first transparent electrode 1202.

The intensity of the second control light L2 may be such that the second transparent electrode 1203 and the driving electrode 1210 can be electrically connected in order to discharge the charge remaining in the driving electrode 1210 to the GND electrode 1214. Therefore, the intensity of the second control light L2 does not need to be modulated according to an image signal. Furthermore, the position of the light-shielding portion 1220 is not limited to the top surface of the glass substrate 1201 if it is between the first and the second transparent electrodes 1202 and 1203 and the control-light optical system 1130. The position of the light-shielding portion 1220 can be changed as required if the first control light L1 and the second control light L2 can be made precisely incident on the first transparent electrode 1202 and the second transparent electrode 1203, respectively.

Figure 13:
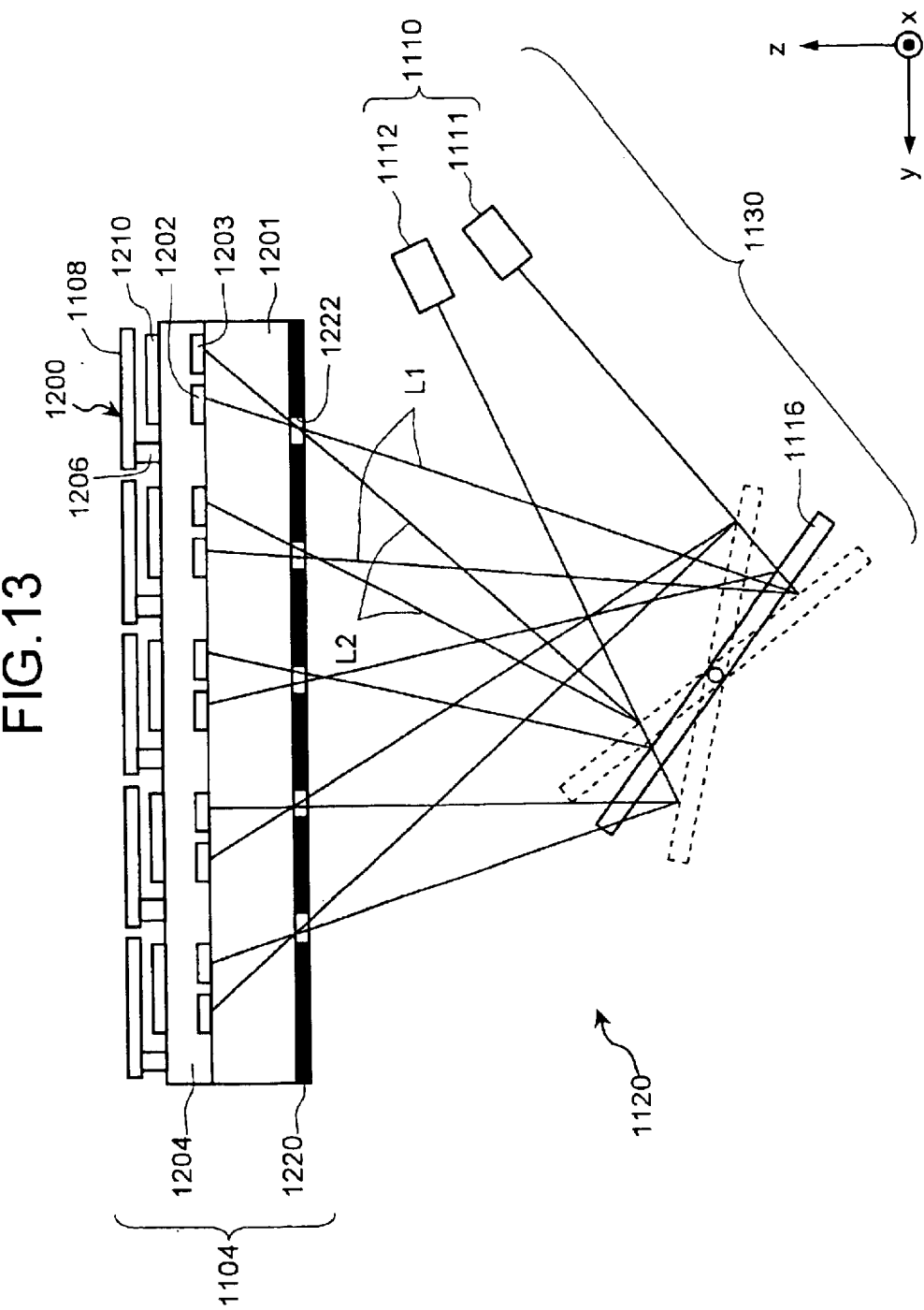
FIG. 13 is a diagram for explaining a relation between first and second control lights and an aperture.

A relation between the first and the second control lights L1 and L2 and the aperture 1222 is explained below with reference to FIG. 13 and FIG. 14. FIG. 13 depicts the configuration to cause the first control light L1 and the second control light L2 to be incident on each of the movable mirror devices 1200 of the spatial light modulator 1120. Here, five units of the movable mirror devices 1200 are used to be explained below. The movable mirror devices 1200 are arranged in the y direction in the spatial light modulator 1120.

The first control light L1 emitted from the first control light source 1111 passes through the aperture 1222 to be incident on the first transparent electrode 1202 of the movable mirror device 1200. The aperture 1222 is provided at a position such that the first control light L1 reflected by the galvano mirror 1116 can be made to pass through the aperture 1222 and made incident only on the first transparent electrode 1202. In other words, if the direction of travel of the first control light L1 is viewed through the aperture 1222, only the first transparent electrode 1202 is recognized. Therefore, when traveling in a direction other than the direction where the first transparent electrode 1202 is, the first control light L1 is blocked by the light-shielding portion 1220. Moreover, the first control light L1 is prevented from being erroneously incident, for example, on the second transparent electrode 1203 or on a transparent electrode related to any movable mirror 1108 different from the movable mirror 1108 that is to be driven.

The second control light L2 emitted from the second control light source 1112 passes through the aperture 1222 to be incident on the second transparent electrode 1203 of the movable mirror device 1200. The aperture 1222 is provided at a position such that the second control light L2 reflected by the galvano mirror 1116 can be made to pass through the aperture 1222 and made incident only on the second transparent electrode 1203. In other words, if the direction of travel of the second control light L2 is viewed through the aperture 1222, only the second transparent electrode 1203 is recognized. Therefore, when traveling in a direction other than the direction where the second transparent electrode 1203 is, the second control light L2 is blocked by the light-shielding portion 1220. Moreover, the second control light L2 is prevented from being erroneously incident, for example, on the first transparent electrode 1203. Furthermore, scanning can be carried out with the first control light L1 and the second control light L2 illuminated, which makes it possible to easily control the movable mirror device 1200.

Figure 14:
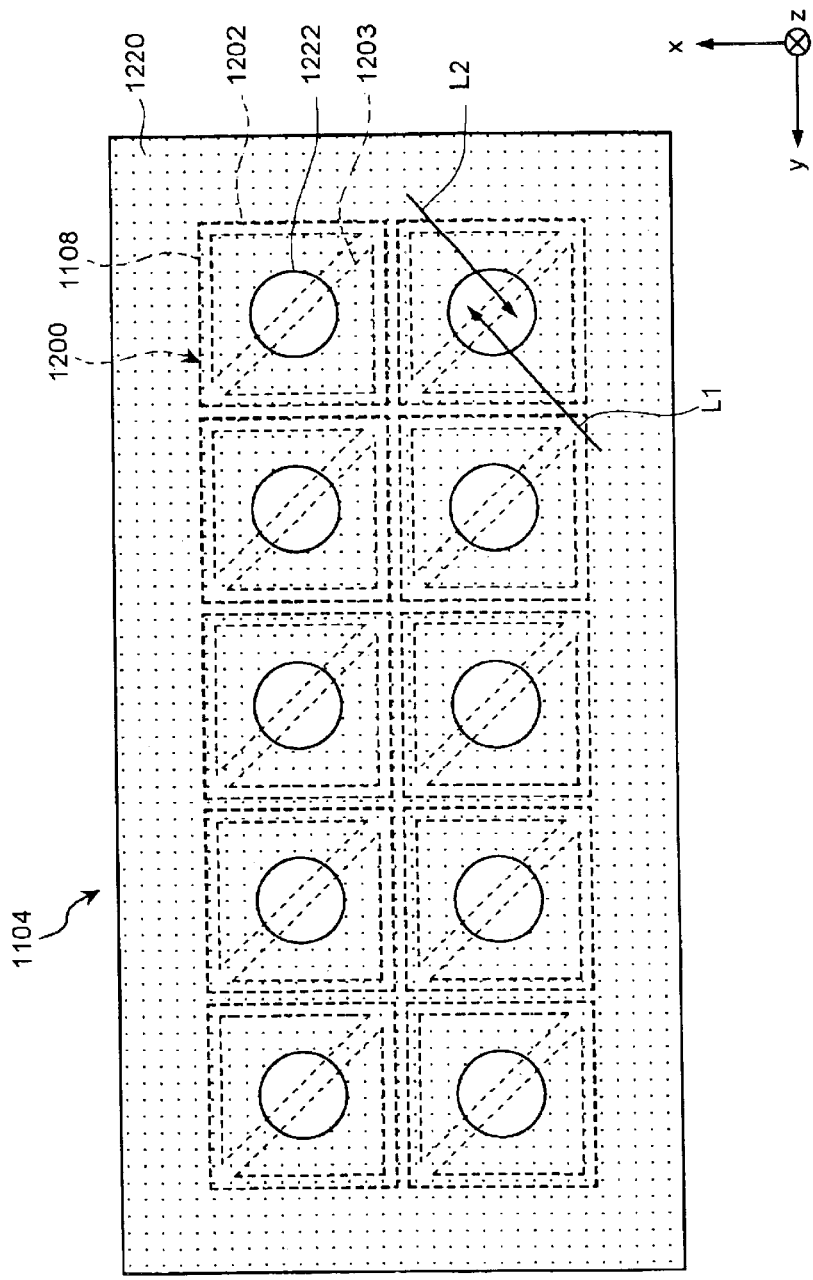
FIG. 14 is a schematic diagram of a light-shielding portion and apertures according to the fifth embodiment.

FIG. 14 depicts an arrangement of the modulator 1104 when viewed from the control-light optical system 1130.

Here, the arrangement is explained below. Two units of the movable mirror devices 1200 in the x direction and five units thereof in the y direction are arranged in the shape of the lattice. The apertures 1222 are provided in one-to-one correspondence with the movable mirror devices 1200. Therefore, the apertures 1222 are provided in one-to-one correspondence with the movable mirrors 1108. As shown in FIG. 14, the shape of the aperture 1222 on the x-y plane is substantially circular. The aperture 1222 is provided in the position which overlaps the first and the second transparent electrodes 1202 and 1203 to almost the same extent.

As shown in FIG. 14, if the first control light L1 is made to pass through the aperture 1222 in a slanting direction from the −x direction to the +y direction with respect to the z direction, the first control light L1 can be made incident only on the first transparent electrode 1202. If the second control light L2 is made to pass through the aperture 1222 in a slanting direction from the +x direction to the −y direction with respect to the z direction, the second control light L2 can be made incident only on the second transparent electrode 1203.

As explained above, the aperture 1222 should be provided at the position through which the first control light L1 can be incident on the first transparent electrode 1202 and the second control light L2 can be incident on the second transparent electrode 1203. Therefore, the position of the aperture 1222 is desirably changed as necessary depending on the travel directions of the first and second control lights L1 and L2. The position of the aperture 1222 is not limited to the position corresponding to substantially the central position of the movable mirror device 1200. As shown in FIG. 13, the aperture 1222 may be provided at a position different from substantially the central position of the movable mirror device 1200. Provision of the aperture 1222 corresponding to the movable mirror 1108 allows the first and the second control lights L1 and L2 to be precisely incident thereon, respectively, for each movable mirror 1108.

In order to cause the first and the second control lights L1 and L2 to be incident on the first and the second transparent electrodes 1202 and 1203, respectively, by using the conventional technology, high precision control is required. In the present invention, the control-light optical system 1130 allows the first control light L1 to be precisely incident on the first transparent electrode 1202 by causing the first control light L1 to be incident on the aperture 1222. If the first control light L1 travels toward a position different from the first transparent electrode 1202, the light-shielding portion 1220 prevents the first control light L1 from being incident on a position other than the first transparent electrode 1202. In the same manner as that of the first control light L1, the second control light L2 can be made precisely incident on the second transparent electrode 1203.

The control-light optical system 1130 may scan the first control light L1 according to an image signal with precision to such extent that the first control light L1 can be made precisely incident on the aperture 1222. The second control light L2 can be made precisely incident on the second transparent electrode 1203 without considering a lighting timing of LED. The level of precision is not required so high. That is, the control-light optical system 1130 is not required to cause the control lights L1 and L2 to be highly precisely incident on the positions of the transparent electrodes 1202 and 1203, but may cause the control lights L1 and L2 to be incident on the position of the aperture 1222.

As explained above, the level of precision in the positions, on which the first and the second control lights L1 and L2 from the control-light optical system 1130 are incident, is not required so high, thus, the movable mirror device 1200 is easily controlled. Moreover, accurate optical addressing can be performed even if a scanning speed of the first and second control lights L1 and L2 are not reduced. Therefore, even if the control-light optical system 1130 scans the first and the second control lights L1 and L2 at a speed required to display a high quality image, the first control light L1 can be precisely incident on the first transparent electrode 1202 and the second control light L2 can be precisely incident on the second transparent electrode 1203. Thus, it is possible to easily perform precise control without degradation of image quality.

Since the lighting time and the lighting timing of the LEDs for each color are the same as those in the first embodiment, explanation thereof is omitted.

Figure 15:
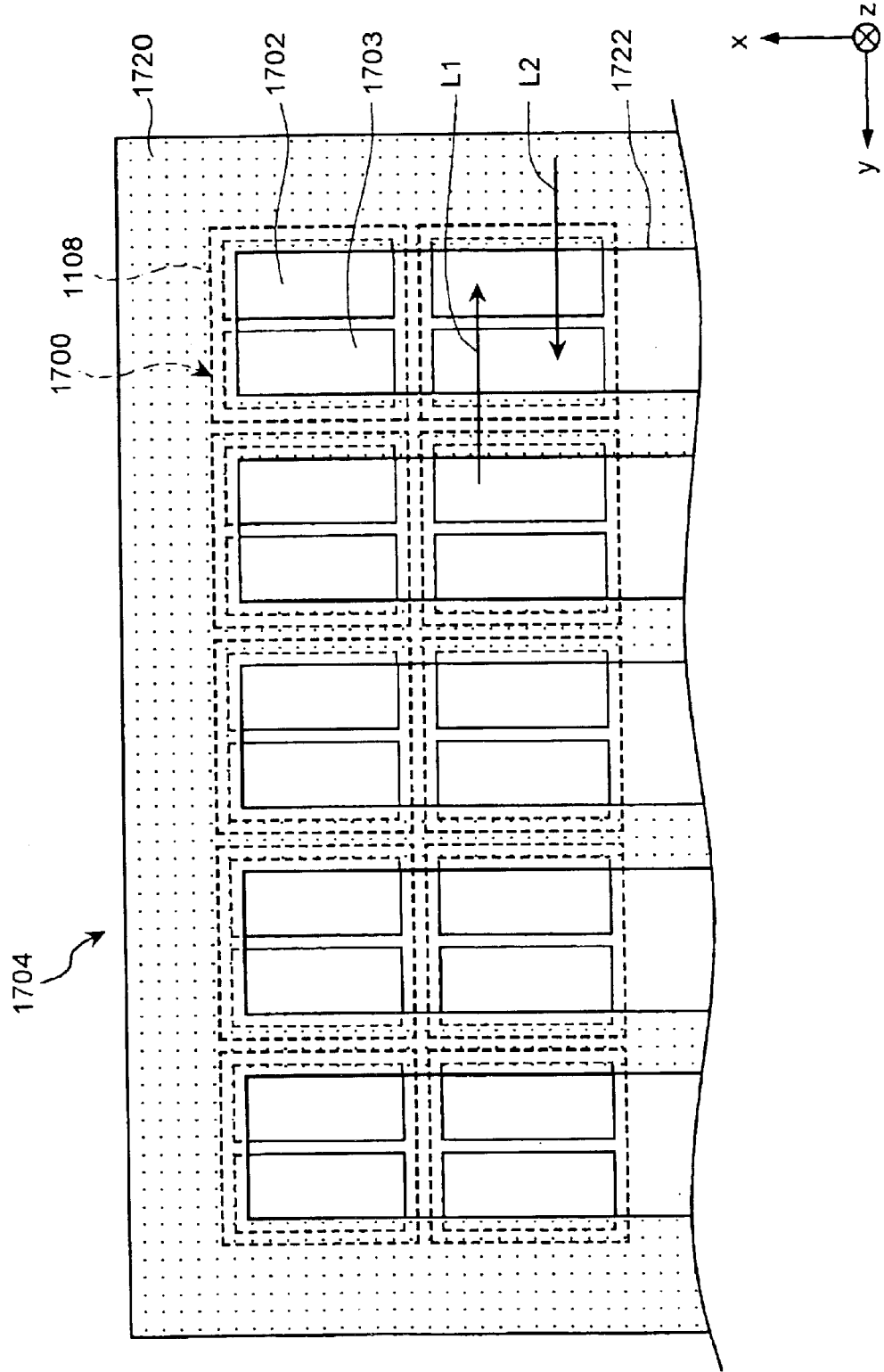
FIG. 15 is a schematic diagram of a light-shielding portion and apertures according to a sixth embodiment of the present invention.

FIG. 15 depicts an arrangement of a modulator 1704 of a projector according to a sixth embodiment of the present invention when viewed from a control-light optical system. The same portions of the projector of this embodiment are assigned with the same reference signs as those of the projector 1100 of the fifth embodiment, and explanation thereof is omitted. The projector of this embodiment is different from the projector 1100 of the fifth embodiment in that an aperture 1722 of a light-shielding portion 1720 is rectangular.

Figure 16:
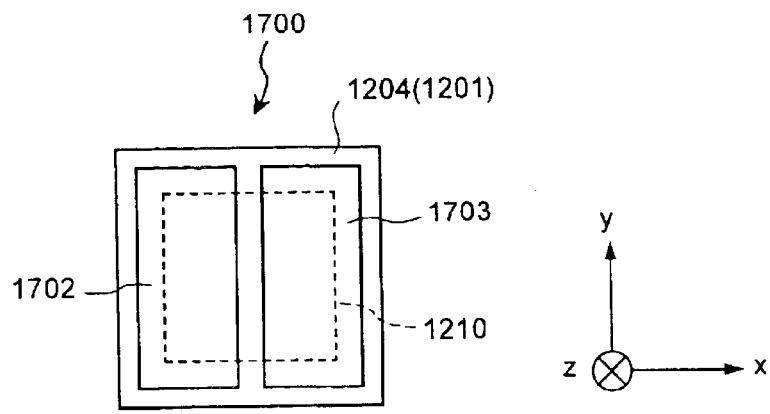
FIG. 16 is a diagram for explaining a position of a transparent electrode and a position of a driving electrode according to the sixth embodiment.

FIG. 16 depicts an optically controlled movable mirror device 1700 (hereinafter, "a movable mirror device 1700") when viewed from the control-light optical system 1130 (see FIG. 10). It is clear, as compared with the movable mirror device 1200 of the projector 1100 as shown in FIG. 12C, that a first transparent electrode 1702 and a second transparent electrode 1703 are different in shape from that of the first and the second transparent electrodes 1202 and 1203. The first transparent electrode 1702 and the second transparent electrode 1703 are arranged so that they respectively occupy areas in parallel obtained by dividing a square of the glass substrate 1201 on the x-y plane with a line connecting between central points of sides of the square that face each other. The driving electrode 1210 is arranged so as to overlap both the first transparent electrode 1702 and the second transparent electrode 1703.

Referring back to FIG. 15, a positional relationship between the movable mirror device 1700 and the aperture 1722 is explained below. The movable mirrors 1108 are arranged in the shape of the lattice in two directions substantially perpendicular to each other on the x-y plane. The aperture 1722 is a rectangle that has its longitudinal side perpendicular to a direction in which the first transparent electrode 1702 and the second transparent electrode 1703 are arranged in parallel with each other. The aperture 1722 provided in the light-shielding portion 1720 as shown in FIG. 15 has its longitudinal side in the x direction substantially perpendicular to the y direction in which the first transparent electrode 1702 and the second transparent electrode 1703 are arranged in parallel with each other. The aperture 1722 is provided corresponding to the movable mirrors 1108 arranged in the longitudinal side of the rectangle.

In the same manner as that of the aperture 1222 of the projector 1100 according to the fifth embodiment, the aperture 1722 is provided at a position such that the first control light L1 can be made to pass through the aperture 1722 and be precisely incident on the first transparent electrode 1702. The aperture 1722 is provided at the position such that the second control light L2 can be made to pass through the aperture 1722 and be precisely incident on the second transparent electrode 1703.

As shown in FIG. 15, the first control light L1 is made to pass through the aperture 1722 in a slanting direction from the +y direction with respect to the z direction, which allows the first control light L1 to be incident only on the first transparent electrode 1702. The second control light L2 is made to pass through the aperture 1722 in a slanting direction from the −y direction with respect to the z direction, which allows the second control light L2 to be incident only on the second transparent electrode 1703. Here, the position of the aperture 1722 is not limited to substantially the central position of the corresponding movable mirror device 1200. The position of the aperture 1722 is desirably changed, if necessary, depending on the travel direction of the first control light L1 and the travel direction of the second control light L2. For example, the aperture 1722 may be provided at a position different from the substantially central position of the corresponding movable mirror device 1200 (see FIG. 13).

The aperture 1722 is set to the rectangle whose longitudinal side is in a direction substantially perpendicular to the direction in which the first and the second transparent electrodes 1702 and 1703 are parallel to each other. Therefore, the first control light L1 and the second control light L2 can be made precisely incident on each movable mirror 1108 without providing the aperture in each movable mirror 1108. Thus, it is possible to easily perform precise control for the movable mirror 1108. The direction in which the first and the second control lights L1 and L2 are scanned may be a direction substantially parallel to the longitudinal side of the aperture 1722 or may be a direction substantially perpendicular thereto. In both of the cases, the movable mirror 1108 can be precisely controlled.

Figure 17:
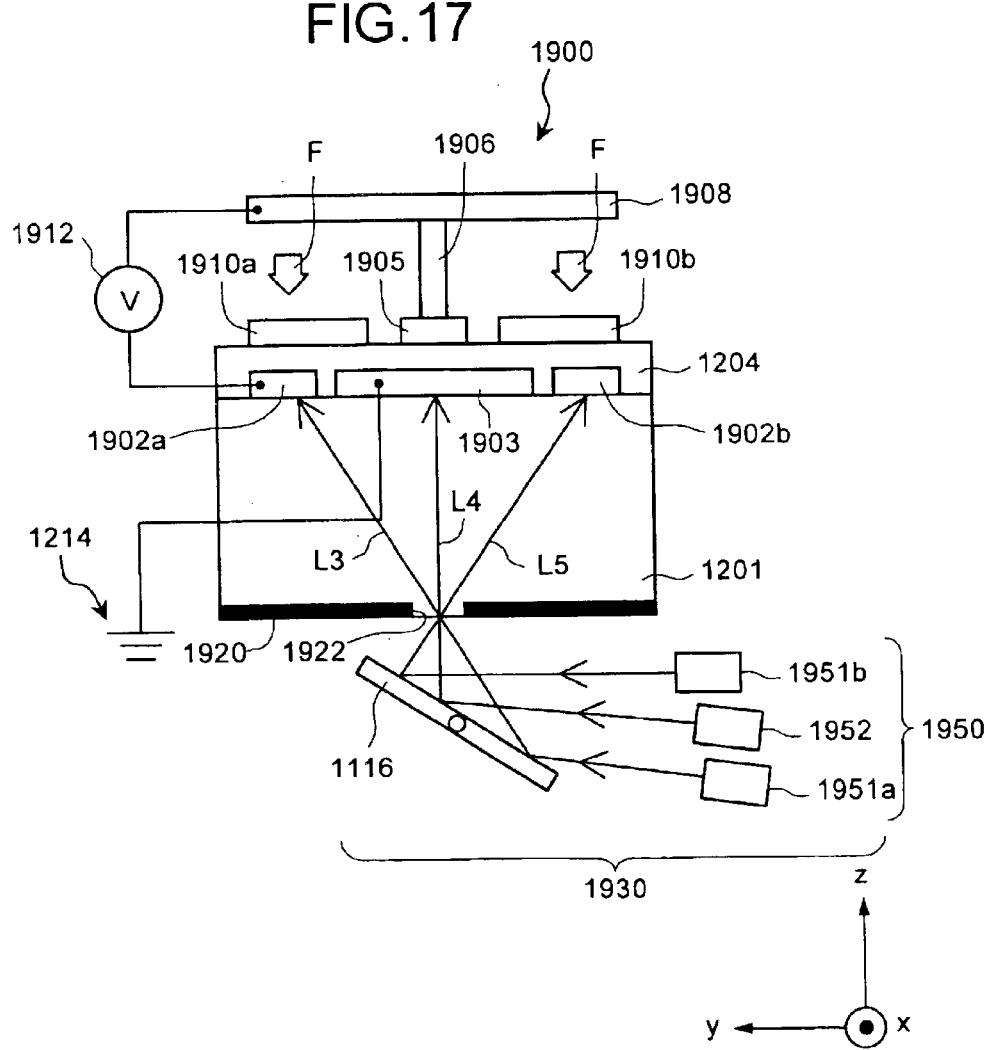
FIG. 17 is a schematic diagram of an optically controlled movable mirror device according to a seventh embodiment of the present invention.

FIG. 17 depicts the schematic configuration of an optically controlled movable mirror device 1900 (hereinafter, "a movable mirror device 1900") of a projector according to a seventh embodiment of the present invention. The same portions of the projector of this embodiment are assigned with the same reference signs as those of the projector 1100 of the fifth embodiment, and explanation thereof is omitted. The projector of this embodiment is different from the projector 1100 of the fifth embodiment in that a movable mirror 1908 can move toward both a driving electrode 1910a and a driving electrode 1910b.

A control-light optical system 1930 includes a galvano mirror 1116 and a control light source 1950. The control light source 1950 includes first control light sources 1951a, 1951b, and a second control light source 1952. The first control light sources 1951a and 1951b supply first control lights L3 and L5, and the second control light source 1952 supplies a second control light L4. A modulator is provided in each of the first control light sources 1951a and 1951b to change the intensity of the first control lights L3 and L5 according to an image signal from the controller 1114 (see FIG. 10) for supply. The first control lights L3, L5 and the second control light L4 scan the movable mirror device 1900 by the galvano mirror 1116.

First transparent electrodes 1902a, 1902b and a second transparent electrode 1903, which are optically transparent, are formed on a plane where the glass substrate 1201 and the conductivity variable portion 1204 are jointed. The first transparent electrodes 1902a, 1902b and the second transparent electrode 1903 are formed with the ITO film. The first transparent electrodes 1902a and 1902b are electrically connected so as to be at the same potential. An insulating layer 1905 is formed between the conductivity variable portion 1204 and a support 1906 using the spattering technique. The SiO$_2$ can be used for the insulating layer 1905.

The support 1906 is provided on the insulating layer 1905 and movably supports the movable mirror 1908. The driving electrodes 1910a and 1910b are formed on the conductivity variable portion 1204 at the positions on both sides of the position where the insulating layer 1905 is provided. The driving electrode 1910a is provided near one corner of the square-shaped movable mirror 1908. The driving electrode 1910b is provided near another corner of the square-shaped movable mirror 1908 that faces the one corner. The movable mirror 1908 and the driving electrodes 1910a and 1910b can be made of a conductive substance such as aluminum (Al).

A power supply 1912 applies a predetermined voltage between the first transparent electrode 1902a and the movable mirror 1908. Here, the first transparent electrode 1902a and the first transparent electrode 1902b are electrically connected to be at the same potential. Therefore, the predetermined voltage is also applied between the first transparent electrode 1902b and the movable mirror 1908. The second transparent electrode 1903 is electrically connected to the GND electrode 1214. By grounding it with the GND electrode 1214, a reference potential of the second transparent electrode 1903 is almost zero. Therefore, the reference potential of the second transparent electrode 1903 is different from that of both the first transparent electrodes 1902a and 1902b.

A light-shielding portion 1920 is formed on the glass substrate 1201 at the side that faces the control-light optical system 1930. The light-shielding portion 1920 is a film that is formed by evaporating a light-shielding material such as metal onto the glass substrate 1201. The light-shielding portion 1920 may be formed by bonding a light-shielding member to the glass substrate 1201. The light-shielding portion 1920 has an aperture 1922 that is formed at a position through which the first control lights L3 and L5 pass and the second control light L4 passes. The aperture 1922 can be provided correspondingly to the movable mirror 1908 in the same manner as that of the apertures 1222 and 1722 according to the fifth and the sixth embodiments.

A positional relationship of the first transparent electrodes 1902a, 1902b and the second transparent electrode 1903 with respect to the driving electrodes 1910a and 1910b is explained. FIG. 18A depicts the configuration of the movable mirror device 1900 when viewed from the projection lens 1105 (see FIG. 10). If the movable mirror device 1900 is viewed from the side of the projection lens 1105, only the movable mirror 1908 can be recognized. The movable mirror 1908 pivots along an axis X on a diagonal line of the square.

FIG. 18B depicts the configuration of the movable mirror device 1900 without the movable mirror 1908 in the configuration of FIG. 18A when viewed from the projection lens 1105. The driving electrodes 1910a and 1910b are provided in both corners of the square of the glass substrate 1201. The both corners are substantially symmetric with respect to the diagonal line of the square corresponding to the axis X of the movable mirror 1908. Based on the configurations of FIG. 18A and FIG. 18B, the movable mirror 1908 moves toward the driving electrode 1910a and toward the driving electrode 1910b along the axis X.

FIG. 18C depicts the configuration of the movable mirror device 1900 without the driving electrodes 1910a and 1910b in the configuration of FIG. 18B when viewed from the projection lens 1105. Areas indicated by broken lines of FIG.

18C represent the positions where the driving electrodes 1910*a* and 1910*b* are provided. As shown in FIG. 18C, the first transparent electrode 1902*a* is provided in the position corresponding to the driving electrode 1910*a*. An area of the first transparent electrode 1902*a* is smaller than the driving electrode 1910*a*, and is arranged so as to occupy the area at an corner of the square of the glass substrate 1201. The first transparent electrode 1902*b* is provided in the position corresponding to the driving electrode 1910*b*. An area of the first transparent electrode 1902*b* is smaller than the driving electrode 1910*b*, and is arranged so as to occupy the area at an corner of the square of the glass substrate 1201.

The second transparent electrode 1903 is provided in an area between the first transparent electrodes 1902*a* and 1902*b*. As shown in FIG. 18B and FIG. 18C, the driving electrode 1910*a* is arranged so as to be superimposed on both the first transparent electrode 1902*a* and the second transparent electrode 1903. Furthermore, the driving electrode 1910*b* is arranged so as to be superimposed on both the first transparent electrode 1902*b* and the second transparent electrode 1903.

Referring back to FIG. 17, the control for the movable mirror device 1900 by the first control lights L3, L5 and the second control light L4 is explained below. The first control light L3 passes through the aperture 1922 to be incident on the first transparent electrode 1902*a*. By causing the first control light L3 with the intensity according to an image signal to be incident on the first transparent electrode 1902*a*, electrical conductivity in a portion of the conductivity variable portion 1204 increases according to the amount of the first control light L3. The portion is jointed to the first transparent electrode 1902*a*.

With the increase in the conductivity of the conductivity variable portion 1204, one of the electrodes of the power supply 1912 is electrically connected to the driving electrode 1910*a* through the first transparent electrode 1902*a* and the conductivity variable portion 1204. The conductivity of the conductivity variable portion 1204 changes according to the amount of the first control light L3 having passed through the first transparent electrode 1902*a*. Therefore, a voltage according to the amount of the first control light L3 is applied to the driving electrode 1910*a*. Accordingly, the voltage according to the image signal is applied to the driving electrode 1910*a*.

The other electrode of the power supply 1912 is electrically connected to the movable mirror 1908. By causing the first control light L3 to be incident on the first transparent electrode 1902*a*, a potential difference is generated between the movable mirror 1908 and the driving electrode 1910*a*. The potential difference is generated according to the variations in the conductivity of the conductivity variable portion 1204. Generation of the potential difference between the two causes predetermined force according to the potential difference, such as electrostatic force (attracting force) F to be generated. Generation of the electrostatic force F causes the movable mirror 1908 to move in a direction in which the side of the movable mirror 1908 that faces the driving electrode 1910*a* is attracted to the driving electrode 1910*a*.

The first control light L5 causes the electrostatic force F to be generated between the movable mirror 1908 and the driving electrode 1910*b* in the same manner as that of the first control light L3. Generation of the electrostatic force F causes the movable mirror 1908 to move in a direction in which the side of the movable mirror 1908 that faces the driving electrode 1910*b* is attracted to the driving electrode 1910*b*. In such a manner as explained above, the movable mirror 1908 moves toward the driving electrode 1910*a* and toward the driving electrode 1910*b* according to image signals.

The second transparent electrode 1903 is provided to remove the charge remaining in the driving electrodes 1910*a* and 1910*b*. The second control light L4 passes through the aperture 1922 to be incident on the second transparent electrode 1903. By causing the second control light L4 to be incident on the second transparent electrode 1903, electrical conductivity in a portion of the conductivity variable portion 1204 increases according to the amount of the second control light L4. The portion is jointed to the second transparent electrode 1903.

With the increase in the conductivity of the conductivity variable portion 1204, the driving electrodes 1910*a* and 1910*b* are electrically connected to the GND electrode 1214 that is connected to the second transparent electrode 1903. The electrical connection between the driving electrodes 1910*a* and 1910*b* and the GND electrode 1214 causes the charge remaining in the driving electrodes 1910*a* and 1910*b* to move to the GND electrode 1214 through the conductivity variable portion 1204 and the second transparent electrode 1903. In such a manner, the charge in the driving electrodes 1910*a* and 1910*b* can be discharged. Thus, it is possible to surely remove the charge in the driving electrodes 1910*a* and 1910*b* and precisely apply a voltage according to an image signal to the driving electrodes 1910*a* and 1910*b*.

If the first transparent electrodes 1902*a*, 1902*b* and the second transparent electrode 1903 are provided in one of the movable mirror devices 1900, control with high precision is required to cause the first control lights L3, L5 and the second control light L4 to be incident on the respective transparent electrodes. According to the present invention, the control-light optical system 1930 allows the first control light L3 to be precisely incident on the first transparent electrode 1902*a* by making the first control light L3 incident on the aperture 1922. If the first control light L3 travels toward a position different from the first transparent electrode 1902*a*, the light-shielding portion 1920 prevents the first control light L3 from being incident on the position other than the first transparent electrode 1902*a*. Likewise, the control-light optical system 1930 allows the first control light L5 to be precisely incident on the first transparent electrode 1902*b* and the second control light L4 to be precisely incident on the second transparent electrode 1903.

The control-light optical system 1930 may scan the first control lights L3 and L5 modulated according to image signals at precision such that the first control lights L3 and L5 are made incident on the aperture 1922. Scanning can be performed with the first control lights L3, L5 and the second control light L4 illuminated, which allows the movable mirror device 1900 to be easily controlled. The level of precision is not required so high. That is, the control-light optical system 1930 is not required to cause the control lights L3, L5, and L4 to be highly precisely incident on the positions of the transparent electrodes 1902*a*, 1902*b*, and 1903 of the movable mirror device 1900, but may cause them to be incident on the position of the aperture 1922. As explained above, the level of precision in the positions, on which the control lights L3, L5, and L4 from the control-light optical system 1930 are incident, is not required so high, thus, easily controlling the movable mirror device 1900.

According to the present invention, even if three or more transparent electrodes are provided in the movable mirror device 1900, it is possible to cause a corresponding control light to be incident on each of the transparent electrodes in the same manner as that of the fifth embodiment. Thus, precise control can be easily performed without degradation of image quality as explained in the fifth embodiment.

The shape of the apertures 1222, 1722, and 1922 of the embodiments may be any shape if the control light is allowed to be precisely incident on the transparent electrode. Therefore, the shape is not limited to a circle and a rectangle, and can be changed to any shape if necessary.

Any of the following elements can be used for the illumination light source 1101 of the projector 100. The elements include LED, a semiconductor laser, other solid-state light emitting elements such as an electroluminescent (EL) element, and a lamp other than the solid-state light emitting elements. In the optically controlled device according to the present invention, analog control is performed such that amounts of continuous changes are represented using voltages modulated according to image signals. However, digital control may be performed.

For example, the voltage applied to the transparent electrode has only a binary value of on and off, and gradation may be expressed by driving subframes. Furthermore, not only when the optically controlled device is used in the projector, but also when the optically controlled device is used in an optical switch for optical communication, the present invention can be used. The present invention is particularly useful when a control light is made precisely incident on each of the optically controlled devices that are aligned at extremely narrow intervals.

FIG. 19 depicts the schematic configuration of a projector 2100 according to an eighth embodiment of the present invention. The projector 2100 includes an illumination light source 2101 with a plurality of LEDs that are solid-state light emitting elements. The illumination light source 2101 includes a R-light LED 2102R that supplies an R light as the first color light, a G-light LED 2102G that supplies a G light as the second color light, and a B-light LED 2102B that supplies a B light as the third color light. The illumination light supplied from the illumination light source 2101 passes through a field lens 2103 to be incident on a modulator 2104 of a spatial light modulator 2120.

The field lens 2103 has a function of telecentrically illuminating the modulator 2104, i.e., a function of making the illumination light as parallel as possible to a main beam and incident on the modulator 2104. The projector 2100 forms an image with lights from the illumination light source 2101 on a position of an entrance pupil 2107 of a projection lens 2105. Therefore, the modulator 2104 is Koehler-illuminated with the illumination light supplied from the illumination light source 2101.

The spatial light modulator 2120 includes the modulator 2104 and a control-light optical system 2130. The modulator 2104 includes a plurality of movable mirrors 2108 on the surface thereof that faces the projection lens 2105. The movable mirrors 2108 are movable according to image signals. The movable mirrors 2108 are arranged in the shape of the lattice in which they are substantially perpendicular to each other, in the plane of the modulator 2104. The modulator 2104 moves the movable mirror 2108 according to an image signal, and reflects the illumination light from the illumination light source 2101 toward the projection lens 2105 or toward a position other than the projection lens 2105. The modulator 2104 expresses gradation by changing the amount of light according to image signals. The light is to be reflected by each of the movable mirror 2108 and to be made incident on the entrance pupil 2107 of the projection lens 2105.

In the above manner, the modulator 2104 modulates the illumination light from the illumination light source 2101 according to an image signal from a controller 2112. The controller 2112 controls the illumination light source 2101 and the spatial light modulator 2120 according to the image signal. The projection lens 2105 projects the light modulated in the modulator 2104 to a screen 2106.

The control-light optical system 2130 includes a galvano mirror 2116 and a control light source 2110. The control-light optical system 2130 is provided on the opposite side to the projection lens 2105 with respect to the modulator 2104. The control light source 2110 supplies control light L as a laser beam. A semiconductor laser device and a surface-emitting laser device can be used for the control light source 2110. By providing a modulator in the control light source 2110, the intensity of the control light L is modulated according to an image signal from the controller 2112. The control light L is reflected toward the modulator 2104 by the galvano mirror 2116 and is incident on the modulator 2104.

The galvano mirror 2116 rotates along predetermined two axes that are substantially perpendicular to each other, and scans the control light L in two directions. Rotation of the galvano mirror 2116 is controlled according to an image signal from the controller 2112. In the above manner, the control-light optical system 2130 scans the control light L onto the modulator 2104.

Figure 20:
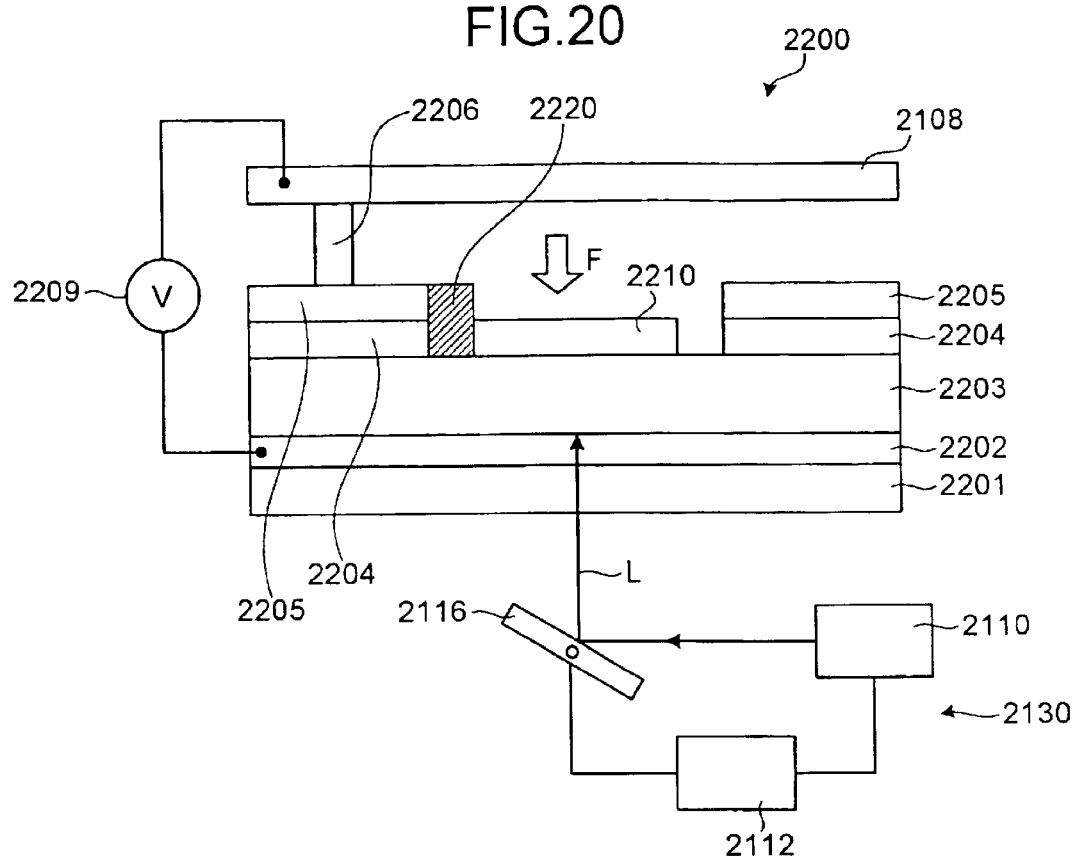
FIG. 20 is a schematic diagram of an optically controlled movable mirror device according to the eighth embodiment.

The configuration of an optically controlled movable mirror device 2200 (hereinafter, "a movable mirror device 2200") is explained below with reference to FIG. 20. The movable mirror device 2200 is configured to drive one movable mirror 2108. The movable mirror device 2200 can be formed using the MEMS technology. A transparent electrode 2202 that is optically transparent is provided on a glass substrate 2201 that is an optically transparent plate provided in parallel with the transparent electrode 2202. The transparent electrode 2202 is formed with an ITO film. A conductivity variable portion 2203 is provided on the transparent electrode 2202. The control light L having passed through the transparent electrode 2202 changes electrical conductivity of the conductivity variable portion 2203.

The conductivity variable portion 2203 can be made of a-Si or a photosensitive organic film. The a-Si is preferably hydrogenated, and is formed using the CVD method, so that the film is formed with the thickness of, for example, 10 micrometers. When the control light L is not illuminated at all, the a-Si has a minimum electrical conductivity and has a maximum resistance. When the resistance is the maximum, the conductivity variable portion 2203 has a function as almost the same as the insulating member. On the other hand, when the control light L is illuminated to the a-Si, the conductivity increases according to the amount of the control light (that is, the resistance decreases).

An area where the conductivity changes, in the conductivity variable portion 2203, corresponds to an area where the control light L is illuminated in the transparent electrode 2202. For example, such a-Si as follows is used as the conductivity variable portion 2203. The a-Si has a square of 25 $\mu$m×25 $\mu$m within a plane in parallel with the glass substrate 2201 and has a thickness of 10 micrometers. In this case, when the control light L is not made incident at all on the conductivity variable portion 2203, the resistance of the a-Si is about 100 M$\Omega$. When the control light L is incident, the resistance of the a-Si becomes about 0.01 M$\Omega$. Therefore, the resistance of the a-Si can be changed in a range from about 0.01 M$\Omega$ to about 100 M$\Omega$.

Figure 22:
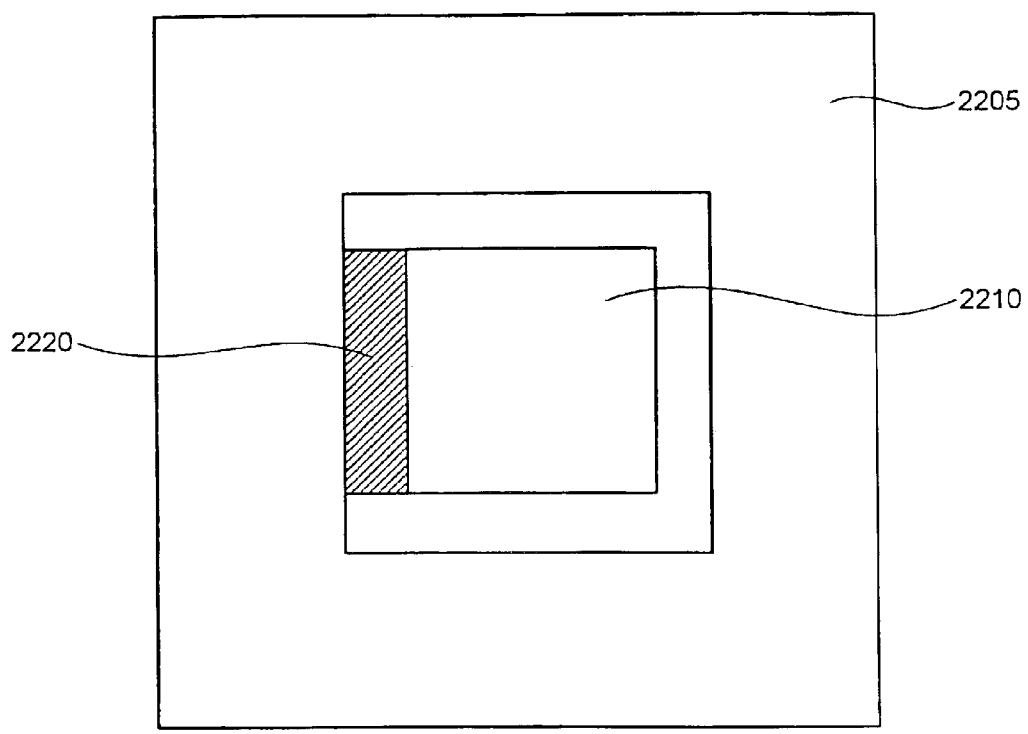
FIG. 22 is a diagram for explaining how a resistor portion is arranged.

An insulating layer 2204 is formed on the conductivity variable portion 2203 in a portion excluding for a substantially central area, using the spattering technique. For example, the $SiO_2$ can be used for the insulating layer 2204. An electrode 2205 is provided on the insulating layer 2204. A driving electrode 2210 is directly provided on the conductivity variable portion 2203. The electrode 2205 and the driving electrode 2210 can be made of a conductive substance such as aluminum (Al). When the electrode 2205 and the driving electrode 2210 are viewed from the side of the movable mirror 2108, as shown in FIG. 22, the electrode 2205 is arranged so as to surround the driving electrode 2210. The insulating layer 2204 is also arranged so as to surround the driving electrode 2210 in the same manner as the electrode 2205.

A power supply 2209 is connected at one of its electrodes to the transparent electrode 2202 and at the other electrode to the electrode 2205. Therefore, the power supply 2209 applies a predetermined voltage between the transparent electrode 2202 and the electrode 2205. The movable mirror 2108 and a support 2206 that movably supports the movable mirror 2108 are formed on the electrode 2205. The movable mirror 2108 can be made of the conductive substance such as aluminum (Al). The support 2206 is made of a conductive flexible material or a conductive elastic material (such as a metal spring). Because the support 1206 has conductivity, the movable mirror 2108 and the electrode 2205 are at the same potential through the support 2206.

A resistor portion 2220 is provided between the driving electrode 2210 and the electrode 2205. As a part of or the whole of the resistor portion 2220, a member made of a high-resistance material such as barium titanate ceramics, $SiO_2$, and ZnO can be used. The resistance of the resistor portion 2220 is any value in a range between the minimum resistance and the maximum resistance of the conductivity variable portion 2203. As shown in FIG. 22, the resistor portion 2220 is provided in a position between one side of the square of the driving electrode 2210 and the electrode 2205. The resistor portion 2220 is bonded to the driving electrode 2210 and the electrode 2205.

As explained above, the electrode 2205 has the same potential as that of the movable mirror 2108 through the support 2206. Based on this, the driving electrode 2210 and the movable mirror 2108 are electrically connected to each other through the resistor portion 2220. It is noted that the insulating layer 2204 and the resistor portion 2220 can be made of $SiO_2$. If the $SiO_2$ is used for both the insulating layer 2204 and the resistor portion 2220, they can be integrally formed, which allows reduction in the number of components.

Figure 23:
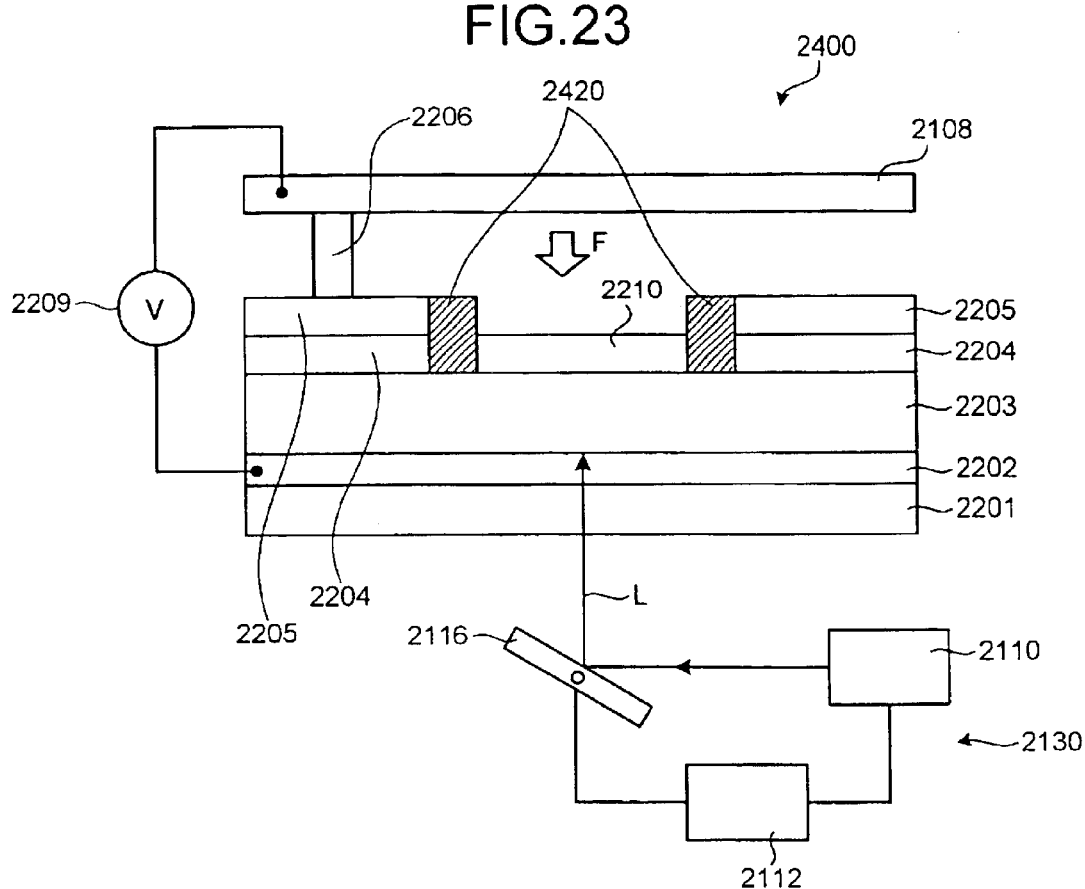
FIG. 23 is a diagram for explaining how a resistor portion is arranged.
Figure 24:
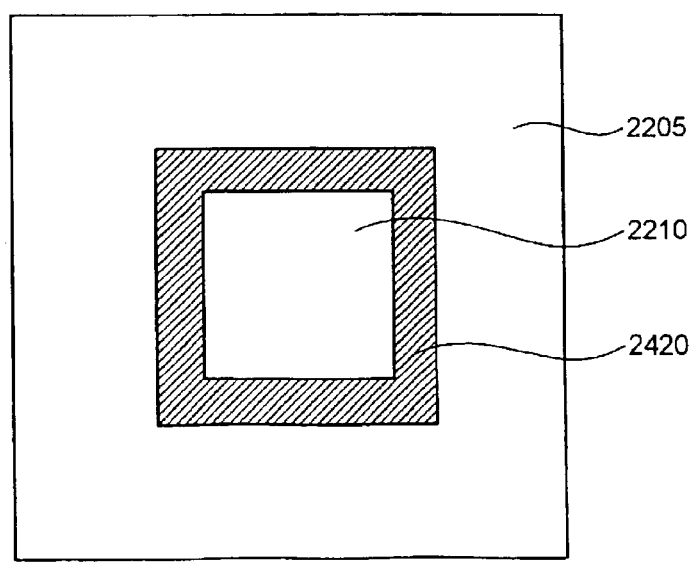
FIG. 24 is a diagram for explaining how the resistor portion is arranged.

The position of the resistor portion 2220 is not limited to the position between the one side of the square of the driving electrode 2210 and the electrode 2205 if it is a position where the resistor portion 2220 can be bonded to the driving electrode 2210 and the electrode 2205. For example, as shown in FIG. 23 and FIG. 24, a resistor portion 2420 may be arranged so as to be bonded to four sides of the square of the driving electrode 2210. In this case also, the driving electrode 2210 and the movable mirror 2108 of an optically controlled movable mirror device 2400 can be electrically connected to each other through the resistor portion 2420.

As explained above, in the resistor portion 2220, an area where the driving electrode 2210 and the electrode 2205 are in contact with the resistor portion 2220 can be adjusted by changing the position and the size of the resistor portion 2220 if necessary. Therefore, the position and the area where the resistor portion 2220 is provided are desirably changed, if necessary, according to the material of the resistor portion 2220. Suitable selection of the position and the area of the resistor portion 2220 and of the material for the resistor portion 2220 allows the resistance of the resistor portion 2220 to obtain a desired value.

Figure 21:
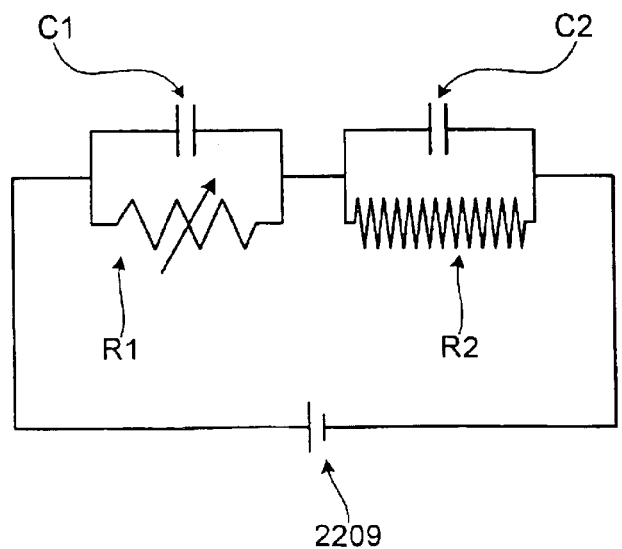
FIG. 21 is an electric circuit equivalent to the optically controlled movable mirror device.

Referring back to FIG. 20, the power supply 2209 applies a predetermined voltage between the transparent electrode 2202 and the movable mirror 2108. Therefore, the configuration of the movable mirror device 2200 is equivalent to an electric circuit in which the driving electrode 2210 and the movable mirror 2108 are electrically connected to each other. The conductivity variable portion 2203 can be replaced with a component in which a capacitor C1 and a variable resistor R1 are arranged in parallel in an electric circuit as shown in FIG. 21. The resistor portion 2220 is replaced with a component in which a capacitor C2 and a resistor R2 are arranged in parallel also in the electric circuit of FIG. 21. Therefore, the movable mirror device 2200 of FIG. 20 is equivalent to a resistance type voltage divider circuit as shown in FIG. 21.

The control for the movable mirror device 2200 by the control light L is explained below with reference to FIG. 20 and FIG. 21. The movable mirror 2108 is driven by predetermined force, for example, electrostatic force (attracting force) according to a potential difference between the driving electrode 2210 and the movable mirror 2108. As explained above, the resistor portion 2220 is provided between the driving electrode 2210 and the movable mirror 2108. Therefore, the electrostatic force F is generated by applying a voltage to the resistor portion 2220. The intensity of the electrostatic force F changes by changing the voltage to be applied to the resistor portion 2220. The position of the movable mirror 2108 can be controlled by changing the voltage to be applied to the resistor portion 2220.

It is clear, based on the resistance type voltage divider circuit as shown in FIG. 21, that the voltage from the power supply 2209 is divided into a voltage to be applied to the resistor portion 2220 and a voltage to be applied to the conductivity variable portion 2203. Therefore, by changing the resistance of the conductivity variable portion 2203, the voltage to be applied to the resistor portion 2220 can be changed. The case where the control light L from the control-light optical system 2130 is not made incident on the transparent electrode 2202 is first explained below.

When the control light L is not made incident on the transparent electrode 2202, the electrical resistance of the conductivity variable portion 2203 becomes the maximum. When the resistance of the conductivity variable portion 2203 is the maximum, a voltage to be applied to the conductivity variable portion 2203 becomes the maximum value. On the other hand, the voltage to be applied to the resistor portion 2220 becomes the minimum value through voltage division. As explained above, the support 2206 is the conductive flexible member or the conductive elastic member. When the electrostatic force F to such an extent that the support 2206 is warped is not generated or the electrostatic force F is not generated at all, the movable mirror 2108 is positioned so as to be substantially parallel to the glass substrate 2201 as shown in FIG. 20.

The case where the control light L with the intensity modulated according to an image signal is made incident on the transparent electrode 2202 is explained below. If the control light L is made incident on the transparent electrode 2202, electrical resistance at a portion of the conductivity variable portion 2203 decreases according to the amount of the control light L. The portion is bonded to the transparent electrode 2202. More specifically, an area where the resistance of the conductivity variable portion 2203 changes tends to spread over its periphery from a light illuminated position in proportion to the intensity and the illumination time of light. The modulator 2104 scans the control light L at high speed, and thereby sequentially controls adjacent movable mirrors 2108. Therefore, it is assumed that the resistance changes only in the vicinity of the area where the control light L is illuminated.

The voltage applied to the conductivity variable portion 2203 decreases with reduction in the resistance of the conductivity variable portion 2203. The voltage applied to the resistor portion 2220 increases with the decrease in the voltage applied to the conductivity variable portion 2203 because of the change in balance of the voltages in the voltage division. Since the resistance of the conductivity variable portion 2203 changes according to the amount of the control light L having passed through the transparent electrode 2202, a voltage according to the amount of the control light L is also applied to the resistor portion 2220. Since the amount of the control light L changes according to an image signal, a voltage according to the image signal is applied to the resistor portion 2220.

If the voltage to be applied to the resistor portion 2220 is such that electrostatic force F is generated and the electrostatic force causes the support 2206 to warp, the movable mirror 2108 moves toward the driving electrode 2210 by the warp of the support 2206. The movable mirror 2108 can be in any positional state according to the magnitude of the electrostatic force F. As explained above, the magnitude of the electrostatic force F changes correspondingly to the magnitude of the voltage applied to the resistor portion 2220. The voltage applied to the resistor portion 2220 can be made to change according to an image signal by the control light L.

Therefore, incidence of the control light L, of which amount is modulated according to the image signal, on the transparent electrode 2202 allows the positional state of the movable mirror 2108 to change according to the image signal. The controller 2112 controls the movable mirror devices 2200 by synchronizing the drive of the galvano mirror 2116 and the modulation of the control light L. The control light L for the respective R. light, the G light, and the B light is scanned onto each of the movable mirror devices 2200, and optical addressing is thereby performed in one frame of an image.

A contact between the movable mirror 2108 and the driving electrode 2210 causes energization or electrical charges to occur between the driving electrode 2210 and the movable mirror 2108, which leads to a state in which the movable mirror 2108 may become uncontrollable because it may remain contacting the driving electrode 2210. Therefore, it is necessary to use any flexible member for the support 2206 so that the movable mirror 2108 and the driving electrode 2210 do not come in contact with each other when the electrostatic force F becomes the maximum. Alternatively, the movable mirror 2108 may be contactable with the electrode 2205 when the tilt of the movable mirror 2108 becomes the maximum by the electrostatic force F.

Since the movable mirror 2108 and the electrode 2205 have mutually the same potential, they may not be energized or charged if being in contact with each other. Therefore, by bringing them in contact with each other, it is possible to prevent the movable mirror 2108 and the driving electrode 2210 from being in contact with each other and to avoid the uncontrollable state of the movable mirror 2108.

Furthermore, if the driving electrode 2210 and the movable mirror 2108 are electrically connected at a portion other than the portion that is energized through the resistor portion 2220, a potential difference according to an image signal is not generated precisely between the driving electrode 2210 and the movable mirror 2108. If the potential difference is not generated, it may be difficult to perform precise control for the movable mirror 2108. Therefore, the insulating layer 2204 is provided to reliably prevent electrical connection between the driving electrode 2210 and the movable mirror 2108 at any portion other than the portion through the resistor portion 2220.

Figure 31:
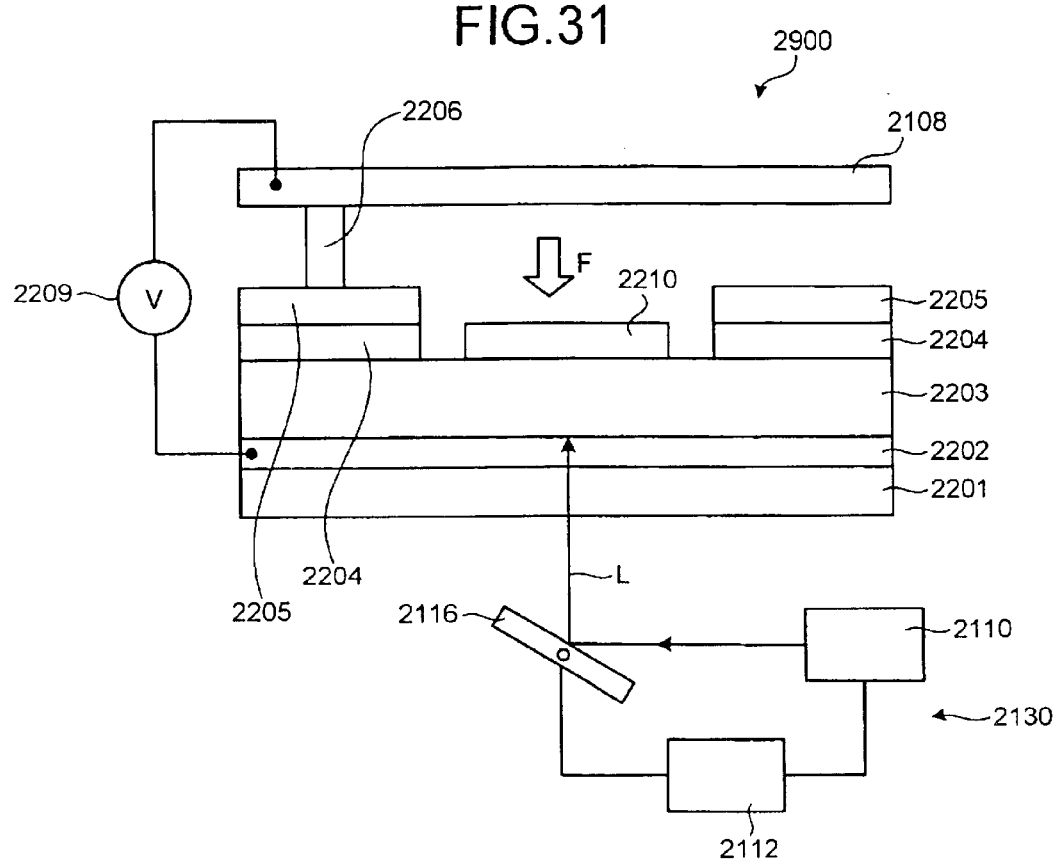
FIG. 31 is a schematic diagram of an optically controlled movable mirror device without the resistor portion.

FIG. 31 depicts the configuration of an optically controlled movable mirror device 2900 (hereinafter, "a movable mirror device 2900") as a comparison with the present invention. In the movable mirror device 2900, the same reference signs are assigned to the same portions as those in the movable mirror device 2200 of FIG. 20, and explanation thereof is omitted. As shown in FIG. 31, the resistor portion 2220 is not provided between the driving electrode 2210 and the movable mirror 2108 but the insulating layer 2204 is provided. Therefore, the driving electrode 2210 and the movable mirror 2108 are electrically isolated from each other.

Figure 32:
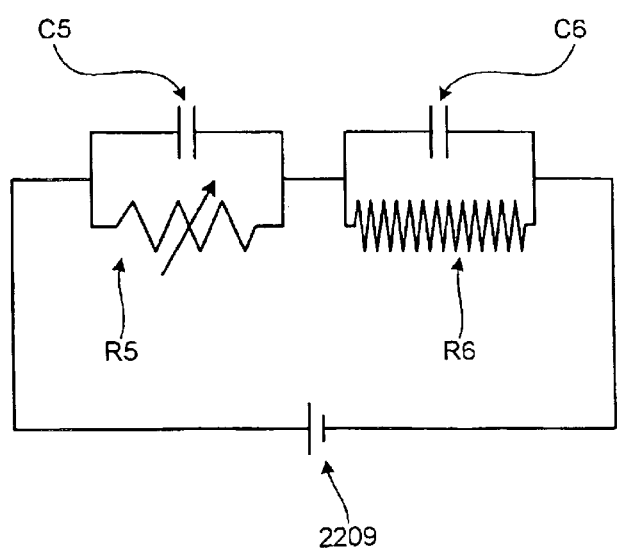
FIG. 32 is an electric circuit equivalent to the optically controlled movable mirror device without the resistor portion.

FIG. 32 depicts an electric circuit equivalent to an electrical connection in the movable mirror device 2900. The conductivity variable portion 2203 can be replaced with a component in which a capacitor C5 and a variable resistor R5 are connected in parallel in the electric circuit of FIG. 32. As explained above, the driving electrode 2210 and the movable mirror 2108 are electrically isolated. In this case, it can be regarded that the driving electrode 2210 and the movable mirror 2108 may be connected with a resistor having a substantially infinite resistance. Therefore, the connection between the driving electrode 2210 and the movable mirror 2108 can be replaced with a component in which a capacitor C6 and a resistor R6 having a substantially infinite resistance are arranged in parallel. Therefore, the configuration of the movable mirror device 2900 of FIG. 31 is equivalent to a resistance type voltage divider circuit as shown in FIG. 32.

The resistance of the conductivity variable portion 2203 is set to 0.01 MΩ when the control light L is made incident on the transparent electrode 2202, and the resistance thereof is set to 100 MΩ when the control light L is not made incident on the transparent electrode 2202. As explained above, the resistance of the resistor between the driving electrode 2210 and the movable mirror 2108 is virtually infinite. Therefore, the resistance of the resistor between the two is set to 100 GΩ for convenience in explanation.

The voltage from the power supply 2209 is divided into a voltage to be applied to the conductivity variable portion 2203 and a voltage to be applied between the driving electrode 2210 and the movable mirror 2108. When the control light L is made incident on the transparent electrode 2202, the resistance of the conductivity variable portion 2203 is 0.01 MΩ. On the other hand, the resistance between the driving electrode 2210 and the movable mirror 2108 is 100 GΩ. Assume that a voltage from the power supply 2209 to be applied between the driving electrode 2210 and the movable mirror 2108 is, for example, 100 volts. A voltage from the power supply 2209 in this case is divided at a ratio of a resistance of the conductivity variable portion 2203 to a resistance between the driving electrode 2210 and the movable mirror 2108. The voltage to be applied between the driving electrode 2210 and the movable mirror 2108 is calculated by the following calculating formula.

$$100 \text{ G}\Omega/(100 \text{ G}\Omega + 0.01 \text{ M}\Omega) \times 100 \text{ V} \approx 99.99999 \text{ V}$$

Therefore, the incidence of the control light L causes a potential difference of about 99.99999 volts to be generated between the driving electrode 2210 and the movable mirror 2108.

When the control light L is not made incident on the transparent electrode 2202, the resistance of the conductivity variable portion 2203 is 100 MΩ. If the voltage from the power supply 2209 to be applied between the transparent electrode 2202 and the movable mirror 2108 is 100 volts, a voltage to be applied between the driving electrode 2210 and the movable mirror 2108 is calculated in the same manner as that when the control light L is made incident on the transparent electrode 2202.

100 GΩ/(100 GΩ+100 MΩ)×100 V≅99.9 V

Therefore, when the control light L is. not made incident thereon, a potential difference of about 99.9 volts is generated between the driving electrode 2210 and the movable mirror 2108.

As explained above, the potential difference between the driving electrode 2210 and the movable mirror 2108 changes only in a range from about 99.9 volts to about 99.99999 volts. The variation in the potential difference between the two can be calculated by the following calculating formula.

99.99999 V−99.9 V=0.09999 V

When the voltage from the power supply 2209 to be applied is 100 volts, the variation in the potential difference between the driving electrode 2210 and the movable mirror 2108 is about 0.1 volt. In this case, only a slight value corresponding to 0.1% of the voltage from the power supply. 2209 can be set to the variation in the potential difference between the driving electrode 2210 and the movable mirror 2108.

The movable mirror device 2900 controls the electrostatic force F generated caused by the potential difference between the driving electrode 2210 and the movable mirror 2108, and drives the movable mirror 2108. If the variation in the potential difference between the driving electrode 2210 and the movable mirror 2108 is only 0.1 volt, the electrostatic force F generated when the amount of the control light L is the maximum is also a small amount. The small amount of the electrostatic force F generated cannot sometimes drive the movable mirror 2108.

If a variable range of the potential difference between the driving electrode 2210 and the movable mirror 2108 is as small as about 0.1 volt, only the incidence of the small amount of control light L causes the potential difference between the driving electrode 2210 and the movable mirror 2108 to change largely within the variable range. At this time, if the potential difference between the two changes largely in the variable range only by slightly changing the amount of the control light L, it is difficult to control the amount of the control light L so as to move the movable mirror 2108 to a desired position.

For example, there is a case where the movable mirror 2108 is made to move to a position at a substantially middle between a state where the movable mirror 2108 is in substantially parallel to the glass substrate 2201 and a state where the movable mirror 2108 is in the closest to the driving electrode 2210. If the movable mirror 2108 is in the closest to the driving electrode 2210 only by the incidence of the slight amount of control light L, it is difficult to make the movable mirror 2108 move to the substantially middle position. In the movable mirror device 2900 of FIG. 31, it may be difficult to precisely control the movable mirror 2108 according to an image signal.

The movable mirror device 2900 of FIG. 31 is configured to electrically isolate the driving electrode 2210 from the movable mirror 2108. On the other hand, as shown in FIG. 20, the movable mirror device 2200 is configured to provide the resistor portion 2220 having a predetermined resistance between the driving electrode 2210 and the movable mirror 2108. The voltage to be applied to the resistor portion 2220 indicates the voltage to be applied between the driving electrode 2210 and the movable mirror 2108. The resistance $R_c$ of the resistor portion 2220 is any value in a range between the minimum resistance $R_L$ and the maximum resistance $R_D$ of the conductivity variable portion 2203. From this the following equations (3), (4), and (5) hold true.

$$R_L \leq R_C \leq R_D \qquad (3)$$

$$R_L:R_C=m:1 \text{ (where } 0<m\leq 1) \qquad (4)$$

$$R_C:R_D=n:1 \text{ (where } 0<n\leq 1) \qquad (5)$$

It is noted that the conductivity variable portion 2203 has the minimum resistance $R_L$ when the mount of the control light L made incident on the transparent electrode 2202 is the maximum. Further, the conductivity variable portion 2203 has the maximum resistance $R_D$ when the control light L is not made incident on the transparent electrode 2202.

A voltage from the power supply 2209 in this case is divided at a ratio of a resistance of the conductivity variable portion 2203 to a resistance $R_C$ of the resistor portion 2220. Therefore, if the resistance $R_C$ of the resistor portion 2220 is a central value as a ratio between the minimum resistance $R_L$ and the maximum resistance $R_D$ of the conductivity variable portion 2203, the variation in voltage to be applied between the driving electrode 2210 and the movable mirror 2108 can be made maximum. Here, the expression that the resistance RC of the resistor portion 2220 is the central value indicates that a ratio between the minimum resistance RL and the resistance RC is equal to a ratio between the resistance RC and the maximum resistance RD.

When the resistance RC is a central value as a ratio between the minimum resistance RL and the maximum resistance RD of the conductivity variable portion 2203, m=n=k (where 0<k≦1) is substituted in equation (4) and equation (5), and the following equations (6) and (7) hold true.

$$R_L:R_C=k:1 \qquad (6)$$

$$R_C:R_D=k:1 \qquad (7)$$

Equation (2) can be derived from equation (6) and equation (7).

$$R_C=(RL \times RD)^{1/2} \qquad (2)$$

The variation in voltage to be applied between the driving electrode 2210 and the movable mirror 2108 is explained below. In this case, the resistance $R_C$ of the resistor portion 2220 satisfies the equation (2). The followings are explained when the minimum resistance $R_L$ of the conductivity variable portion 2203 is 0.01 MΩ and the maximum resistance $R_D$ thereof is 100 MΩ. By substituting $R_L$=0.01 MΩ and $R_D$=100 MΩ in the equation (2), $R_C$=1 MΩ is calculated. Assume that the voltage by the power supply 2209 to be applied between the transparent electrode 2202 and the movable mirror 2108 is 100 volts.

As explained above, the voltage from the power supply 2209 is divided at the ratio of the resistance of the conductivity variable portion 2203 to the resistance $R_C$ of the resistor portion 2220. Therefore, when the resistance of the conductivity variable portion 2203 is minimum value $R_L=0.01$ MΩ by causing the control light L to be incident on the transparent electrode 2202, the voltage to be applied to the resistor portion 2220 is calculated by the following calculating formula.

$$R_C/(RC+RL) \times 100 \text{ V} = 1 \text{ MΩ}/(1 \text{ MΩ} + 0.01 \text{ MΩ}) \times 100 \text{ V} \cong 99.01 \text{ V}$$

When the resistance of the conductivity variable portion 2203 is $R_D=100$ MΩ by causing the control light L not to be incident on the transparent electrode 2202, the voltage to be applied to the resistor portion 2220 is calculated by the same calculating formula as that when the control light L is made incident on the transparent electrode 2202.

$$R_C/(RC+RD) \times 100 \text{ V} = 1 \text{ MΩ}/(1 \text{ MΩ} + 100 \text{ MΩ}) \times 100 \text{ V} \cong 0.99 \text{ V}$$

The variation in the potential difference between the driving electrode 2210 and the movable mirror 2108 can be calculated by the following calculating formula.

$$99.01 \text{ V} - 0.99 \text{ V} = 98.02 \text{ V}$$

Therefore, when the resistance is $R_C=1$ MΩ, the variation in the potential difference between the driving electrode 2210 and the movable mirror 2108 is about 98.02 volts.

If the resistance $R_C$ of the resistor portion 2220 is specified by the equation (2), the variation in the potential difference between the driving electrode 2210 and the movable mirror 2108 is about 98.02 volts when the voltage applied by the power supply 2209 is 100 volts. Therefore, by using the resistor portion 2220 of which resistance $R_C$ is specified based on the equation (2), an amount corresponding to about 98% of the voltage applied by the power supply 2209 can be set as the variation in the potential difference between the driving electrode 2210 and the movable mirror 2108.

The variation in the potential difference between the two becomes the maximum by specifying the resistance $R_C$ of the resistor portion 2220 using the equation (2). The variation in the potential difference between the two decreases as the resistance $R_C$ of the resistor portion 2220 is apart further from a resistance $R_C$ that satisfies the equation (2).

The variation in the voltage to be applied between the driving electrode 2210 and the movable mirror 2108 is explained below. In this case, the resistance $R_C$ of the resistor portion 2220 satisfies $$R_L \leq R_C R_D \quad (3)$$

At first, in the equation (3), when the resistance $R_C$ of the resistor portion 2220 is the minimum, the following equation (8) holds true.

$$R_C = R_L \quad (8)$$

Where $R_L : R_C = 1:1$, and therefore, m=1 in the equation (4).

The variation in the voltage applied between the driving electrode 2210 and the movable mirror 2108 is explained below when the minimum resistance $R_L$ of the conductivity variable portion 2203 is 0.01 MΩ and the maximum resistance $R_D$ thereof is 100 MΩ. Since the minimum resistance $R_L$ of the conductivity variable portion 2203 is 0.01 MΩ, $R_C = R_L = 0.0$ MΩ from the equation (8). Assume that the voltage applied between the transparent electrode 2202 and the movable mirror 2108 is 100 volts by the power supply 2209. The voltage from the power supply 2209 is divided at the ratio of the resistance of the conductivity variable portion 2203 to the resistance of the resistor portion 2220.

Therefore, when the resistance of the conductivity variable portion 2203 is $R_L=0.01$ MΩ by causing the control light L to be incident on the transparent electrode 2202, the voltage to be applied to the resistor portion 2220 is calculated by the following calculating formula.

$$R_C/(RC+RL) \times 100 \text{ V} = 0.01 \text{ MΩ}/(0.01 \text{ MΩ} + 0.01 \text{ MΩ}) \times 100 \text{ V} = 50 \text{ V}$$

When the resistance of the conductivity variable portion 2203 is $R_D=100$ MΩ by causing the control light L not to be incident on the transparent electrode 2202, the voltage to be applied to the resistor portion 2220 is calculated by the same calculating formula as that when the control light L is made incident on the transparent electrode 2202.

$$R_C/(RC+RD) \times 100 \text{ V} = 0.01 \text{ MΩ}/(0.01 \text{ MΩ} + 100 \text{ MΩ}) \times 100 \text{ V} \cong 0.01 \text{ V}$$

The variation in the potential difference between the driving electrode 2210 and the movable mirror 2108 can be calculated by the following calculating formula.

$$50 \text{ V} - 0.01 \text{ V} = 49.99 \text{ V}$$

Therefore, when the resistance is $R_C=0.01$ MΩ, the variation in the potential difference between the driving electrode 2210 and the movable mirror 2108 is about 49.99 volts.

When the resistance $R_C$ of the resistor portion 2220 is the maximum in the equation (3), the following equation (9) holds true.

$$R_C = R_D \quad (9)$$

Where $R_L : R_D = 1:1$, and therefore, n=1 in the equation (5). Since the maximum resistance $R_D$ of the conductivity variable portion 2203 is 100 MΩ, $R_C = R_D = 100$ MΩ from the equation (9). The voltage from the power supply 2209 to be applied between the transparent electrode 2202 and the movable mirror 2108 is 100 volts. When the resistance of the conductivity variable portion 2203 is $R_L=0.01$ MΩ by causing the L to be incident on the transparent electrode 2202, the voltage to be applied to the resistor portion 2220 is calculated by the following calculating formula.

$$R_C/(RC+RL) \times 100 \text{ V} = 100 \text{ MΩ}/(100 \text{ MΩ} + 0.01 \text{ MΩ}) \times 100 \text{ V} \cong 99.99 \text{ V}$$

When the resistance of the conductivity variable portion 2203 is $R_D=100$ MΩ by causing the control light L not to be incident on the transparent electrode 2202, the voltage to be applied to the resistor portion 2220 is calculated by the same calculating formula as that when the control light L is made incident on the transparent electrode 2202.

$$R_C/(RC+RD) \times 100 \text{ V} = 100 \text{ MΩ}/(100 \text{ MΩ} + 100 \text{ MΩ}) \times 100 \text{ V} = 50 \text{ V}$$

The variation in the potential difference between the driving electrode 2210 and the movable mirror 2108 can be calculated by the following calculating formula.

$$99.99 \text{ V} - 50 \text{ V} = 49.99 \text{ V}$$

Therefore, when the resistance is $R_C=100$ MΩ, the variation in the potential difference between the two is about 49.99 volts.

If the resistance $R_C$ of the resistor portion 2220 is specified by the equation (3), the variation in the potential difference between the two can be set to about 49.99 volts when the voltage applied from the power supply 2209 is 100 volts. Therefore, by using the resistor portion 2220 of which resistance $R_C$ is specified based on the equation (3), an amount corresponding to about 50% of the voltage applied by the power supply 2209 can be set as the variation in the potential difference between the two.

The variation in the voltage to be applied between the driving electrode 2210 and the movable mirror 2108 is explained below. In this case, the resistance $R_C$ of the resistor portion 2220 satisfies $$4R_L \leq R_C \leq R_D/4 \quad (1)$$

At first, in the equation (1), when the resistance $R_C$ of the resistor portion 2220 is the minimum, the following equation (10) holds true.

$$R_C = 4R_L \quad (10)$$

Where $R_L:R_C=1:4$, and therefore, m=1/4 in the equation (4).

Assuming that the minimum resistance $R_L$ of the conductivity variable portion 2203 is 0.01 MΩ and the maximum resistance $R_D$ thereof is 100 MΩ, the variation in the voltage applied between the driving electrode 2210 and the movable mirror 2108 is explained below. From equation (10), $R_C 4R_L=0.04$ MΩ. Assume that the voltage applied from the power supply 2209 between the transparent electrode 2202 and the movable mirror 2108 is 100 volts. The voltage from the power supply 2209 is divided at a ratio of the resistance of the conductivity variable portion 2203 to the resistance $R_C$ of the resistor portion 2220. Therefore, when the resistance of the conductivity variable portion 2203 is $R_L=0.01$ MΩ by causing the control light L to be incident on the transparent electrode 2202, the voltage to be applied to the resistor portion 2220 is calculated by the following calculating formula.

$$R_C/(RC+RL) \times 100 \text{ V}=0.04 \text{ MΩ}/(0.04 \text{ MΩ}+0.01 \text{ MΩ}) \times 100 \text{ V}=80 \text{ V}$$

When the resistance of the conductivity variable portion 2203 is $R_D=100$ MΩ by causing the control light L not to be incident on the transparent electrode 2202, the voltage to be applied to the resistor portion 2220 is calculated by the same calculating formula as that when the control light L is made incident on the transparent electrode 2202.

$$R_C/(RC+RD) \times 100 \text{ V}=0.04 \text{ MΩ}/(0.04 \text{ MΩ}+100 \text{ MΩ}) \times 100 \text{ V} \approx 0.04 \text{ V}$$

The variation in the potential difference between the driving electrode 2210 and the movable mirror 2108 can be calculated by the following calculating formula.

$$80 \text{ V}-0.04 \text{ V}=79.96 \text{ V}$$

Therefore, when the resistance is $R_C=0.04$ MΩ, the variation in the potential difference between the two is about 79.96 volts.

When the resistance $R_C$ of the resistor portion 2220 is the maximum in the equation (1), the following equation (11) holds true.

$$R_C = R_D/4 \quad (11)$$

where $R_C:R_D=1:4$, and therefore, n=1/4 in the equation (5). From equation (11), $R_C=R_D/4=25$ MΩ. Assume that the voltage from the power supply 2209 to be applied between the transparent electrode 2202 and the movable mirror 2108 is 100 volts. When the resistance of the conductivity variable portion 2203 is $R_L=0.01$ MΩ by causing the control light L to be incident on the transparent electrode 2202, the voltage to be applied to the resistor portion 2220 is calculated by the following calculating formula.

$$R_C/(RC+RL) \times 100 \text{ V}=25 \text{ MΩ}/(25 \text{ MΩ}+0.01 \text{ MΩ}) \times 100 \text{ V} \approx 99.96 \text{ V}$$

When the resistance of the conductivity variable portion 2203 is $R_D=100$ MΩ by causing the control light L not to be incident on the transparent electrode 2202, the voltage to be applied to the resistor portion 2220 is calculated by the same calculating formula as that when the control light L is made incident on the transparent electrode 2202.

$$R_C/(RC+RD) \times 100 \text{ V}=25 \text{ MΩ}/(25 \text{ MΩ}+100 \text{ MΩ}) \times 100 \text{ V}=20 \text{ V}$$

The variation in the potential difference between the driving electrode 2210 and the movable mirror 2108 can be calculated by the following calculating formula.

$$99.96 \text{ V}-20 \text{ V}=79.96 \text{ V}$$

Therefore, when the resistance is $R_C=25$ MΩ, the variation in the potential difference between the two is about 79.96 volts.

If the resistance $R_C$ of the resistor portion 2220 is specified by the equation (1), the variation in the potential difference between the two can beset to about 80 volts when the voltage applied from the power supply 2209 is 100 volts. Therefore, by using the resistor portion 2220 of which resistance $R_C$ is specified based on the equation (1), an amount corresponding to about 80% of the voltage applied by the power supply 2209 can be set as the variation in the potential difference between the two.

The movable mirror device 2200 according to the eighth embodiment includes the resistor portion 2220 between the driving electrode 2210 and the movable mirror 2108. By providing the resistor portion 2220 between the two, the potential difference between the two changes according to a voltage applied to the resistor portion 2220. The resistance $R_C$ of the resistor portion 2220 is a predetermined value in a range between the minimum resistance $R_L$ and the maximum resistance $R_D$ of the conductivity variable portion 2203. Setting the resistance $R_C$ to any value in the range allows the potential difference between the two to change in a wider range corresponding to the change in the resistance $R_C$ of the resistor portion 2220. By using the resistor portion 2220 of which resistance $R_C$ is specified based on the equation (3), an amount corresponding to about 50% of the voltage applied by the power supply 2209 can be set as the variation in the potential difference between the driving electrode 2210 and the movable mirror 2108.

$$R_L \leq R_C \leq R_D \quad (3)$$

More preferably, by using the resistor portion 2220 of which resistance $R_C$ is specified based on the equation (1), an amount corresponding to about 80% of the voltage applied by the power supply 2209 can be set as the variation in the potential difference between the driving electrode 2210 and the movable mirror 2108.

$$4R_L \leq R_C \leq R_D/4 \quad (1)$$

Further more preferably, by using the resistor portion 2220 of which resistance $R_C$ is specified based on the equation (2), an amount corresponding to about 98% of the voltage applied by the power supply 2209 can be set as the variation in the potential difference between the driving electrode 2210 and the movable mirror 2108.

$$R_C = (RL \times RD)^{1/2} \quad (2)$$

If a variable range of a voltage applied between the driving electrode 2210 and the movable mirror 2108 is wide, a variable range of the magnitude of electrostatic force F generated between the driving electrode 2210 and the movable mirror 2108 becomes wide. The increase in the electrostatic force F allows the movable mirror 2108 to be easily driven. If the variable range of the electrostatic force F increases correspondingly to the change in the amount of the control light L, it is easy to cause the movable mirror 2108 to move to a desired position. Therefore, the amount of control light L may be controlled with precision lower than that when the resistor portion 2220 is not provided. Because the amount of control light L may be controlled with low precision, the movable mirror device 2200 can be easily controlled.

Moreover, the increase in the variable range of the electrostatic force F also allows the position of the movable mirror 2108 to be precisely controlled according to continuous changes in the amount of control light L. Thus, it is possible to precisely control the drive of the movable mirror 2108 according to an input signal and to obtain a high quality projection image. Particularly, the movable mirror device 2200 is movable to a predetermined position according to an image signal, which allows continuous variations to be displayed correspondingly to an analog signal.

Therefore, by using the movable mirror device 2200, a high quality projection image precisely corresponding to the analog signal can easily be obtained. As compared with the case where the resistor portion 2220 is not provided, the amount of control light L may be controlled with low precision, which makes it possible to reduce the cost of a power controller for the control light source 2110. Thus, the projector 2100 can be manufactured at lower cost.

A difference between the minimum resistance $R_L$ and the maximum resistance $R_D$ of the conductivity variable portion 2203 is explained below. Assume that the minimum resistance $R_L$ is 1 MΩ and the maximum resistance $R_D$ is 10 MΩ, and that a difference between the minimum resistance $R_L$ and the maximum resistance $R_D$ is 1 digit. A variable range of a voltage to be applied between the driving electrode 2210 and the movable mirror 2108 is calculated. The variable range is required for specifying the resistance $R_C$ of the resistor portion 2220 based on the equation (3).

$$R_L \leq R_C \leq R_D \quad (3)$$

The variable range of the voltage applied between the driving electrode 2210 and the movable mirror 2108 is calculated as about 40.9%. The explanation is based on an example in which the minimum resistance $R_L$ of the conductivity variable portion 2203 is 0.01 MΩ and the maximum resistance $R_D$ thereof is 100 MΩ and a difference between the minimum resistance $R_L$ and the maximum resistance $R_D$ is 4 digits. At this time, the variable range of the voltage applied between the driving electrode 2210 and the movable mirror 2108 is an amount corresponding to about 50% of the voltage applied. Therefore, even if the equation (3) is satisfied, if the difference between the minimum resistance $R_L$ and the maximum resistance $R_D$ of the conductivity variable portion 2203 is reduced to about 1 digit, the variable range of the voltage applied between the driving electrode 2210 and the movable mirror 2108 is made narrow.

If the difference between the minimum resistance $R_L$ and the maximum resistance $R_D$ of the conductivity variable portion 2203 is small, the variable range of the resistance of the conductivity variable portion 2203 is narrowed. If the variable range of the resistance is narrow, the variation in the potential difference between the driving electrode 2210 and the movable mirror 2108 is also reduced. Therefore, if the difference between the minimum resistance $R_L$ and the maximum resistance $R_D$ of the conductivity variable portion 2203 is small, it may be difficult to precisely control the movable mirror 2108 according to image signals. As a result, the minimum resistance $R_L$ and the maximum resistance $R_D$ thereof are required to be values having a difference more than a predetermined value.

Assume that the difference between the minimum resistance $R_L$ and the maximum resistance $R_D$ thereof is two digits, and that the minimum resistance $R_L$ is 1 MΩ and the maximum resistance $R_D$ is 100 MΩ. As a result of calculating a variable range of the voltage applied between the driving electrode 2210 and the movable mirror 2108, an amount corresponding to 49% is obtained. The variable range is required for specifying the resistance $R_C$ of the resistor portion 2220 based on the equation (3). Therefore, it is preferable that values of the minimum resistance $R_L$ and the maximum resistance $R_D$ thereof have a difference of 2 digits or more. Thus, it is possible to ensure a wide variable range of the voltage between the driving electrode 2210 and the movable mirror 2108 and to precisely control the drive of the movable mirror 2108.

It is noted that the lighting time and the lighting timing of LEDs for color lights are the same as those in the first embodiment and explanation thereof is omitted.

Figure 25:
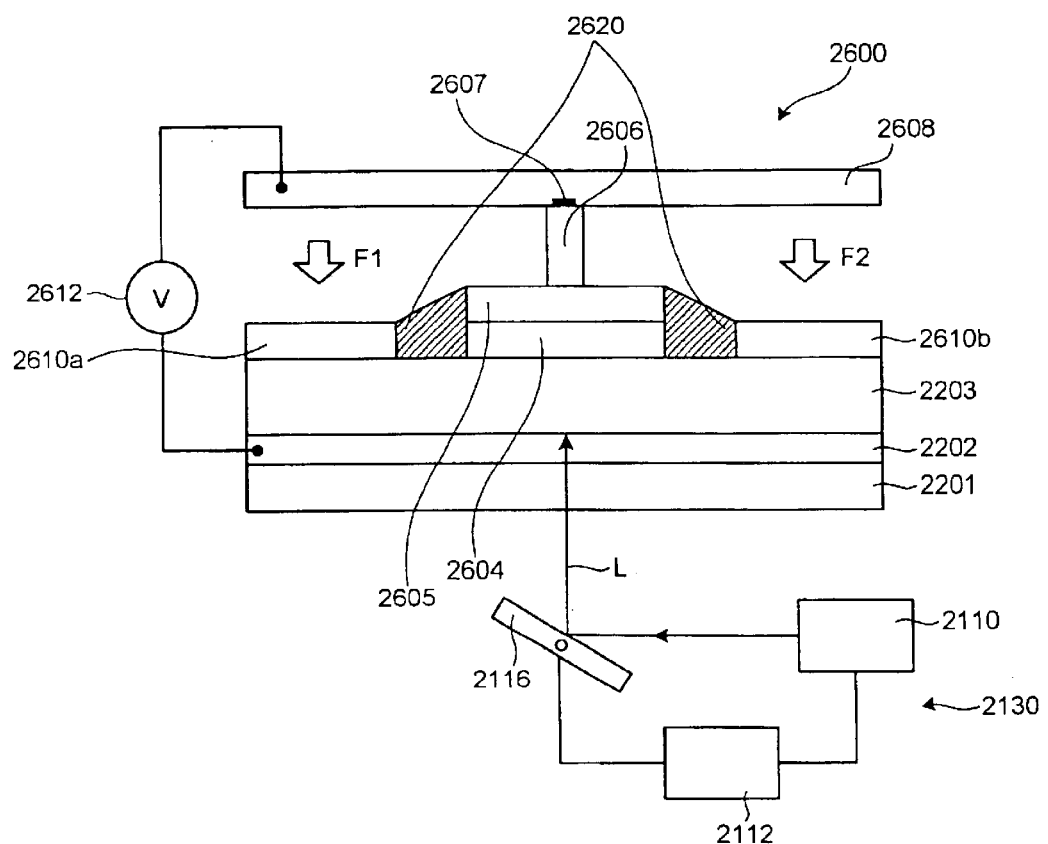
FIG. 25 is a schematic diagram of an optically controlled movable mirror device according to a ninth embodiment of the present invention.

FIG. 25 depicts the schematic configuration of an optically controlled movable mirror device 2600 (hereinafter, "a movable mirror device 2600") according to a ninth embodiment of the present invention. The movable mirror device 2600 can be used in the projector 2100 according to the eighth embodiment. The same reference signs are assigned to the portions the same as those of the movable mirror device 2200 for the projector 2100, and explanation thereof is omitted. The movable mirror device 2600 is different from the movable mirror device 2200 for the projector 2100 in a point such that a movable mirror 2608 can move in two directions, toward a driving electrode 2610a and toward a driving electrode 2610b.

An insulating layer 2604 is formed on the conductivity variable portion 2203 in a substantially central portion thereof, using the spattering technique. For example, $SiO_2$ can be used for the insulating layer 2604. An electrode 2605 is provided on the insulating layer 2604. The driving electrode 2610a and the driving electrode 2610b are provided on the conductivity variable portion 2203 in positions on both sides of the insulating layer 2604. The movable mirror 2608, the driving electrodes 2610a and 2610b, and the electrode 2605 can be made of a conductive substance such as aluminum (Al). A power supply 2612 applies a predetermined voltage between the transparent electrode 2202 and the movable mirror 2608.

Figure 26:
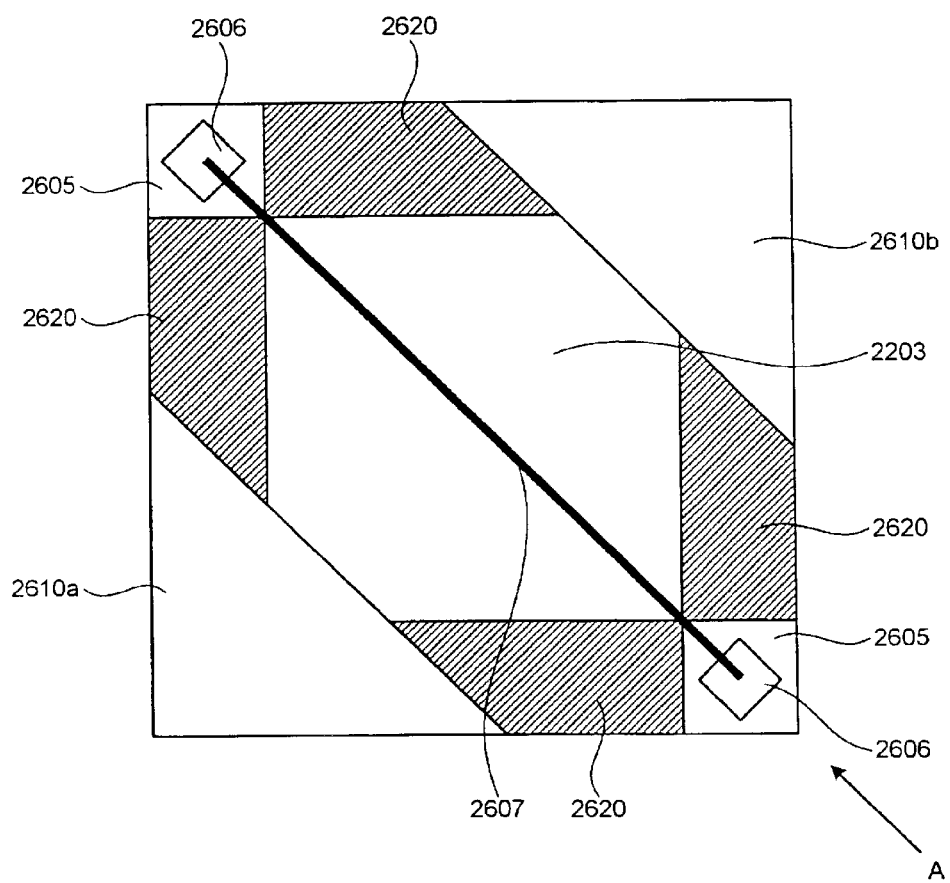
FIG. 26 is a schematic diagram of the optically controlled movable mirror device when viewed from the movable mirror.

FIG. 26 depicts the configuration of the movable mirror device 2600 when viewed from the movable mirror 2608. The configuration of FIG. 25 is viewed from the direction of arrow A in FIG. 26. In the configuration of FIG. 26, the movable mirror 2608 is removed for convenience in explanation. When the movable mirror device 2600 is viewed from the side of the movable mirror 2608, the electrode 2605 is provided in one corner of a square and is also provided in another corner of the square that faces the one corner. The square is formed with the electrodes 2605, the driving electrodes 2610a and 2610b, resistor portions 2620 (explained later). A support includes a pillar 2606 and a torsion bar (hinge) 2607. The pillar 2606 is provided on the electrode 2605.

The torsion bar 2607 is a slender, thin flexible plate having conductivity. Both ends of the torsion bar 2607 are fixed to the two pillars 2606, respectively. The pillar 2606 is a conductive pillar member. The movable mirror 2608 is jointed to the torsion bar 2607. In this manner, the movable mirror 2608 is supported by the pillars 2606 and the torsion bar 2607. Because both the pillars 2606 and the torsion bar 2607 are conductive, the movable mirror 2608 and the electrode 2605 have the same potential through the pillars 2606 and the torsion bar 2607.

The driving electrode 2610*a* is provided in a first corner of the square that is near one corner of the square movable mirror 2608 and that is different from second corners of the square where the electrodes 2605 are provided. The driving electrode 2610*b* is provided in a third corner of the square near another corner of the square movable mirror 2608 that faces the one corner. The resistor portion 2620 is provided between the driving electrode 2610*a* and the electrodes 2605 and between the driving electrode 2610*b* and the electrodes 2605. As shown in FIG. 25, the resistor portion 2620 is provided in a position so as to be in contact with the driving electrode 2610*a* and the electrode 2605 and in a position so as to be in contact with the driving electrode 2610*b* and the electrode 2605.

As explained above, the electrode 2605 has the same potential as that of the movable mirror 2608 through the pillar 2606 and the torsion bar 2607 that form the support. From this, the driving electrode 2610*a* or 2610*b* and the movable mirror 2608 are electrically connected to each other through the resistor portion 2620. In the same manner as that of the resistor portion 2220 (see FIG. 20 and FIG. 21) according to the eighth embodiment, as a part of or the whole of the resistor portion 2620, a member made of a high-resistance material such as barium titanate ceramics, $SiO_2$, and ZnO can be used. The resistance of the resistor portion 2620 is any value in a range between the minimum resistance and the maximum resistance of the conductivity variable portion 2203 in the same manner as that of the resistor portion 2220 (see FIG. 20 and FIG. 21).

The control for the movable mirror device 2600 by the control light L is explained below. Referring back to FIG. 25, the movable mirror 2608 moves in a direction in which it is attracted to the driving electrode 2610*a* by electrostatic force (attracting force) F1 according to a potential difference between the driving electrode 2610*a* and the movable mirror 2608. Furthermore, the movable mirror 2608 moves in a direction in which it is attracted to the driving electrode 2610*b* by electrostatic force (attracting force) F2 according to a potential difference between the driving electrode 2610*b* and the movable mirror 2608.

Figure 27:
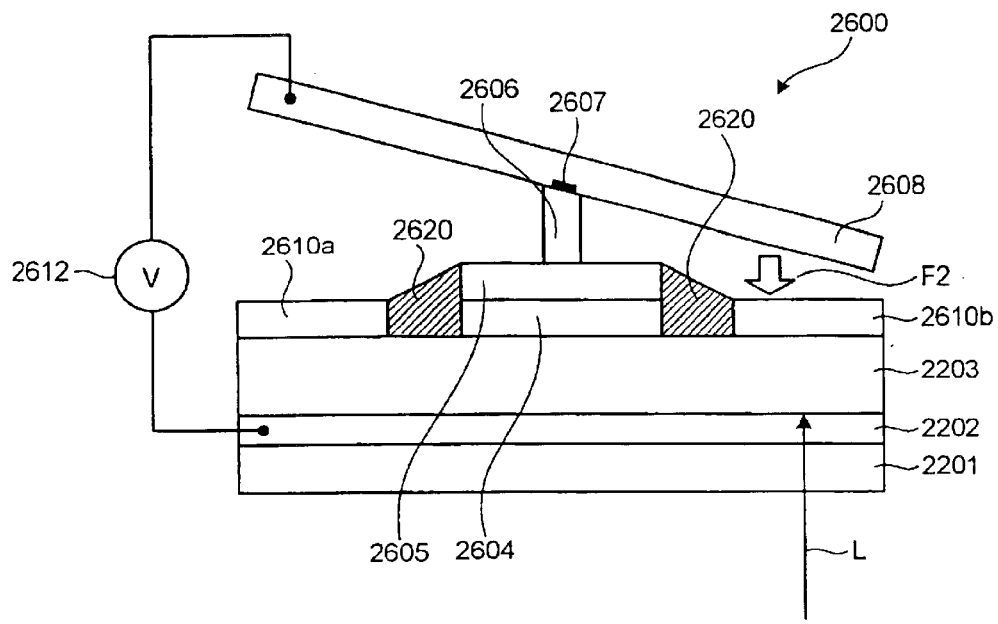
FIG. 27 is a diagram for explaining how the optically controlled movable mirror device is driven.

FIG. 27 depicts how the movable mirror 2608 is attracted to the driving electrode 2610*b* by the electrostatic force F2. The control light L from the control-light optical system 2130 (see FIG. 25) is made incident on a position of the transparent electrode 2202 corresponding to the driving electrode 2610*b*. If the control light L with the intensity according to an image signal is made incident on the transparent electrode 2202, an electrical resistance in a portion of the conductivity variable portion 2203 decreases according to the amount of the control light L. The portion is jointed to the transparent electrode 2202.

With the decrease in the resistance of the conductivity variable portion 2203, one of the electrodes of the power supply 2612 is electrically connected to the driving electrode 2610*b* through the transparent electrode 2202 and the conductivity variable portion 2203. Because the conductivity of the conductivity variable portion 2203 changes according to the amount of the control light L having passed through the transparent electrode 2202, a voltage according to the amount of the control light L is applied to the driving electrode 2610*b*. Therefore, the voltage according to the image signal is applied to the driving electrode 2610*b*.

Figure 28:
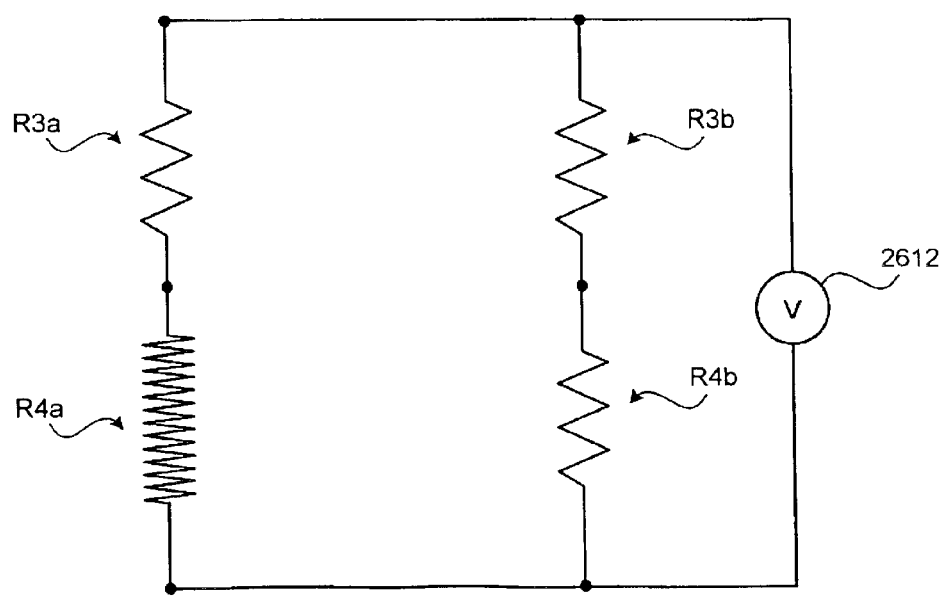
FIG. 28 is an electric circuit equivalent to the optically controlled movable mirror device.

As explained above, the driving electrode 2610*b* and the movable mirror 2608 are electrically connected to each other through the resistor portion 2620. The power supply 2612 applies a predetermined voltage between the transparent electrode 2202 and the movable mirror 2608. Based on this, by causing the control light L to be incident on the position of the transparent electrode 2202 corresponding to the driving electrode 2610*b*, the configuration of the movable mirror device 2600 is equivalent to an electric circuit in which the driving electrode 2210 and the movable mirror 2108 are electrically connected to each other. The conductivity variable portion 2203 in the electric circuit is replaced with a resistor R4*b*, in an electric circuit as shown in FIG. 28, having the resistance according to the amount of the control light $L_r$. The resistor portion 2620 is replaced with a resistor R3*b* also in the electric circuit of FIG. 28.

In the same manner as that of the driving electrode 2610*b*, by causing the control light L to be incident on a position of the transparent electrode 2202 corresponding to the driving electrode 2610*a*, the movable mirror device 2600 is equivalent to an electric circuit in which the driving electrode 2610*a* and the movable mirror 2608 are electrically connected to each other. The conductivity variable portion 2203 in the electric circuit is replaced with a resistor R4*a* having the maximum resistance in the electric circuit as shown in FIG. 28. The resistor portion 2620 is replaced with a resistor R3*a* in the electric circuit of FIG. 28. Therefore, the movable mirror device 2600 is equivalent to the electric circuit, as shown in FIG. 28, in which a first portion with the resistor R3*a* and the resistor R4*a* serially connected and a second portion with the resistor R3*b* and the resistor R4*b* serially connected are connected in parallel.

By causing the control light L to be incident on the position of the transparent electrode 2202 corresponding to the driving electrode 2610*b*, a voltage is applied to the resistor portion 2620 between the driving electrode 2610*b* and the electrode 2605. Application of the voltage to the resistor portion 2620 between the driving electrode 2610*b* and the electrode 2605. causes a potential difference to be generated between the driving electrode 2610*b* and the movable mirror 2608, and the electrostatic force F2 is thereby generated.

On the other hand, the control light L is not made incident on the position of the transparent electrode 2202 corresponding to the driving electrode 2610*a*. Because the control light L is not made incident, a resistance of the position of the conductivity variable portion 2203 corresponding to the driving electrode 2610*a* is the maximum value. In this case, this resistance can be regarded as being substantially infinite.

When the resistance of the conductivity variable portion 2203 is substantially infinite, a voltage is not applied to the resistor portion 2620 between the driving electrode 2610*a* and the electrode 2605, which causes a potential difference between the driving electrode 2610*a* and the movable mirror 2608 not to be generated. Therefore, the electrostatic force F1 is not generated between the driving electrode 2610*a* and the movable mirror 2608. As explained above, only the electrostatic force F2 acts on the movable mirror 2608. When the electrostatic force F2 makes the torsion bar 2607 (see FIG. 26) warp, the movable mirror 2608 moves in the direction in which it is attracted to the driving electrode 2610*b*. The movable mirror 2608 moves according to the image signal in the above manner.

In the same manner as that of the driving electrode 2610b, if the control light L is made incident on the position of the transparent electrode 2202 corresponding to the driving electrode 2610a, the electrostatic force F1 is generated. Generation of the electrostatic force F1 causes the movable mirror 2608 to move in the direction in which it is attracted to the driving electrode 2610a. By scanning the control light L, modulated according to an image signal, onto each of the movable mirror devices 2600 in the above manner, optical addressing can be performed.

Figure 29:
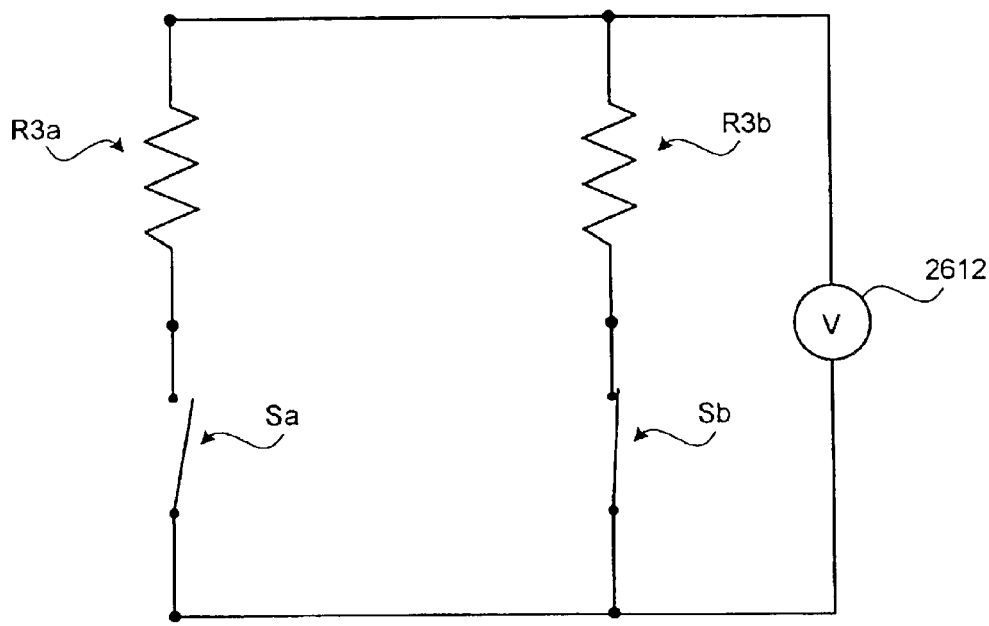
FIG. 29 is another electric circuit equivalent to the optically controlled movable mirror device.

When the control light L is not made incident onto the position, the resistance of the conductivity variable portion 2203 is regarded as a substantially infinite resistance. From this, the conductivity variable portion 2203 functions as a switch such that it is energized when the control light L is made incident thereon and it is disconnected when the control light L is not made incident thereon. In the electric circuit of FIG. 28, the resistors corresponding to the conductivity variable portion 2203 can be replaced with switches Sa and Sb in an electric circuit as shown in FIG. 29. Therefore, the configuration of the movable mirror device 2600 of FIG. 27 is also equivalent to the electric circuit of FIG. 29.

In the electric circuit of FIG. 29, the switch Sb on the side where the control light L is incident is on, while the switch Sa on the side where the control light L is not incident is off. By switching an incident position of the control light L between a position corresponding to the driving electrode 2610a and a position corresponding to the driving electrode 2610b, the movable mirror 2608 can be controlled in the same manner as switching between the two switches Sa and Sb. The switching between the two switches Sa and Sb allows the movable mirror 2608 to move toward the driving electrode 2610a and toward the driving electrode 2610b.

The movable mirror device 2600 according to the ninth embodiment is equivalent to the electric circuit, as shown in FIG. 28, in which the first portion with the resistor R3a and the resistor R4a serially connected and the second portion with the resistor R3b and the resistor R4b serially connected are connected in parallel. Of the first and the second portions, one of them conducts and the other one opens. From this, the movable mirror device 2600 is equivalent to the resistance type voltage divider circuit such that the two switches are alternately switched so as to electrically conduct correspondingly to either one of the driving electrode 2610a and the driving electrode 2610b.

By setting a resistance of the resistor portion 2620 to any value in a range from the minimum resistance and the maximum resistance of the conductivity variable portion 2203, the movable mirror device 2600 allows a potential difference between the driving electrode 2610a or 2610b and the movable mirror 2608 to be changed in a wider range, in the same manner as that of the first embodiment. If a variable range of a voltage to be applied between the driving electrode 2610a or 2610b and the movable mirror 2608 is wide, a variable range of magnitude of the electrostatic force F1 and F2 generated between them increases.

If the electrostatic force F1 and F2 are allowed to increase, the movable mirror 2608 can be easily driven. If the variable range of the electrostatic force F increases according to the change in the amount of the control light L, it is easier to move the movable mirror 2608 to a desired position. Therefore, the amount of the control light L may be controlled with precision lower than that in the configuration without the resistor portion 2620, which makes it possible to easily control the movable mirror device 2600.

Moreover, with the increase in the variable range of the electrostatic force F, the position of the movable mirror 2608 can be precisely controlled according to continuous changes in the amount of the control light L. Therefore, it is possible to precisely control the drive of the movable mirror 2608 according to input signals and to obtain a high quality projection image. In the resistor portion 2620, a range of its resistance can be specified in the same manner as that explained in the first embodiment. Therefore, it is possible to increase the variable range of the potential difference between the driving electrode 2610a or 2610b and the movable mirror 2608 in the same manner as that of the first embodiment.

Figure 30:
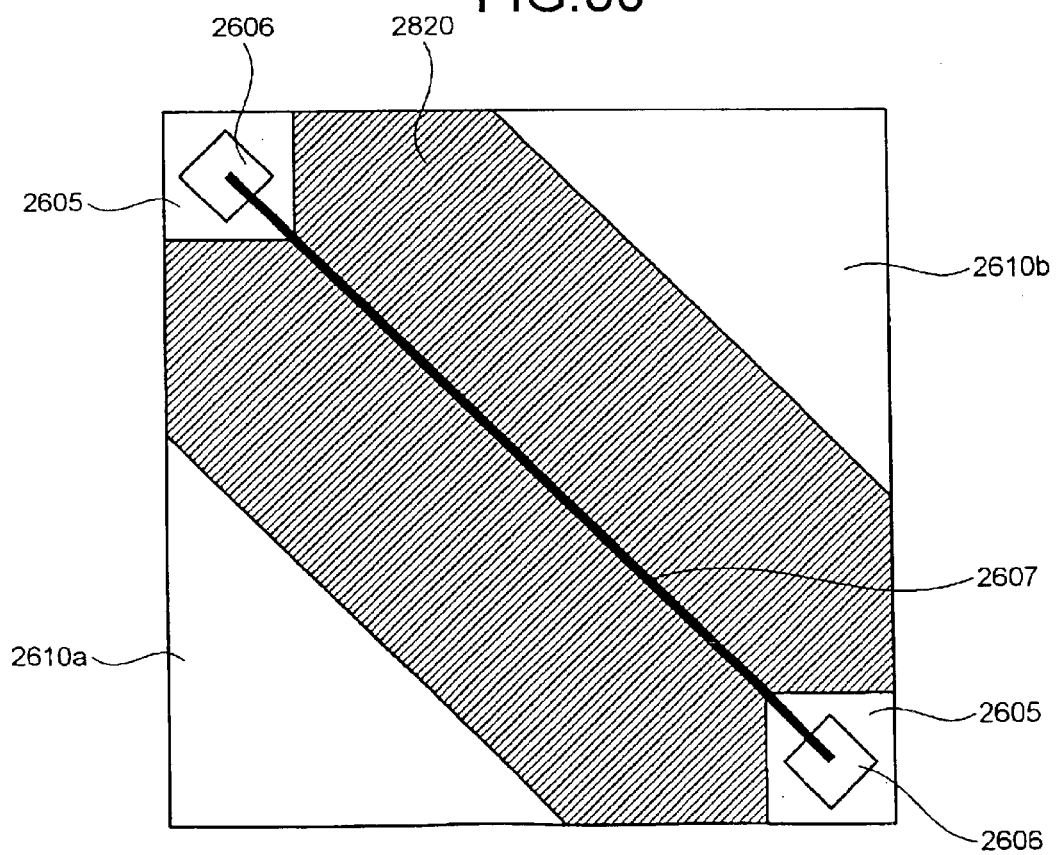
FIG. 30 is a diagram for explaining how a resistor portion is arranged.

As shown in FIG. 26, the position of the resistor portion 2620 is provided between the driving electrode 2610a and the electrode 2605 and between the driving electrode. 2610b and the electrode 2605. However, it is not limited to the positions along an outer periphery of the conductivity variable portion 2203. For example, as shown in FIG. 30, a resistor portion 2820 may be provided so as to cover all the portions on the conductivity variable portion 2203 other than the positions where the driving electrode 2610a, the driving electrode 2610b, and the electrode 2605 are provided. As explained above, the movable mirror device 2600 can be regarded as a device in which two switches are alternately switched so as to electrically conduct correspondingly to either one of the driving electrodes 2610a and 2610b.

The movable mirror device 2600 always electrically conducts correspondingly to either one of the driving electrodes 2610a and 2610b. Therefore, even if the resistor portion 2820 is provided between the two, the driving electrodes 2610a and 2610b are prevented from electrical connection through the resistor portion 2820. As shown in FIG. 30, even if the resistor portion 2820 is provided so as to cover over the portion other than the positions where the driving electrodes 2610a and 2610b and the electrode 2605 are provided, it is possible to control the movable mirror device 2600. Furthermore, in the same manner as that explained in the first embodiment, changes of the position and the size of the resistor portion 2820 allows the resistance thereof to be set to a desired value.

Any of the following elements can be used for the illumination light source 2101 (see FIG. 19) of the projector 2100. The elements include LED, a semiconductor laser, other solid-state light emitting elements such as an EL element, and a lamp other than the solid-state light emitting elements. The optically controlled device according to the present invention is especially effective in the case where the analog control is performed. As explained above, the analog control is performed such that continuous variations are displayed using voltages modulated according to image signals. Moreover, the optically controlled device according to the present invention may be used in any device that performs digital control in addition to the analog control. For example, a voltage applied to the transparent electrode 2202 is set to only a binary value of on and off, and gradation can be expressed by driving subframes.

Furthermore, the present invention is also applicable not only to the case where optically controlled devices are arranged in an array and are used in the projector 2100, but also to an optically controlled device used for, for example, an optical switch for optical communication. Particularly, in the optically controlled device according to the present invention, even if the amount of control light is hard to be controlled with high precision, a movable unit can easily be controlled. Therefore, the optically controlled device according to the present invention is useful in a case where an optically controlled device needs to be driven outside. Furthermore, the optically controlled device according to the present invention is useful also in a case where analog control that causes the movable unit to continuously drive is required.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A method of controlling an optically controlled device that includes a transparent electrode that is optically transparent, a conductivity variable portion that is provided on the transparent electrode, where electrical conductivity changes according to an amount of control light passing through the transparent electrode, a driving electrode provided on the conductivity variable portion, a movable unit that is movable to a predetermined position, and a support portion that movably supports the movable unit, comprising:

inputting the control light of a constant intensity into the transparent electrode;

applying a voltage modulated according to an input signal between the transparent electrode and the movable unit; and moving the movable unit to the predetermined position by generating a force corresponding to the voltage between the driving electrode and the movable unit based on a change of electrical conductivity of the conductivity variable portion caused by the inputting of the control light into the transparent electrode.

2. The method according to claim 1, wherein the movable unit has a reference potential lower than that of the driving electrode so that the force corresponding to the voltage modulated is generated between the driving electrode and the movable unit.

3. The method according to claim 1, wherein the movable unit ha s a reference potential higher than that of the driving electrode so that the force corresponding to the voltage modulated is generated between the driving electrode and the movable unit.

4. The method according to claim 1 further comprising resetting the driving electrode and the movable unit to substantially same potential during a time when the control light is being input into the transparent electrode.

5. The method according to claim 4, wherein the support portion is made of a flexible material, and when a force corresponding to the voltage modulated is not generated between the driving electrode and the movable unit, a time for resetting the driving electrode and the movable unit to the substantially same potential is shorter than a response time during which the movable unit is movable by an action of the support portion having flexibility.

6. The method according to claim 4, wherein a timing at which the driving electrode and the movable unit reach the substantially same potential is earlier than a timing at which the voltage modulated is applied.

7. A method of controlling an optically controlled device that includes a transparent electrode that is optically transparent, a conductivity variable portion that is provided on the transparent electrode, where electrical conductivity changes according to an amount of control light passing through the transparent electrode, a driving electrode provided on the conductivity variable portion, a movable unit that is movable to a predetermined position, and a support portion that movably supports the movable unit, comprising:

inputting the control light of an intensity modulated according to an input signal into the transparent electrode;

applying a constant voltage between the transparent electrode and the movable unit;

moving the movable unit to the predetermined position by generating a force corresponding to the intensity of the control light between the driving electrode and the movable unit based on a change of electrical conductivity of the conductivity variable portion according to the intensity of the control light caused by the inputting of the control light into the transparent electrode; and resetting the driving electrode and the movable unit to substantially same potential during a time when the control light is being input into the transparent electrode.

8. The method according to claim 7, wherein the support portion is made of a flexible material, and when a force according to the constant voltage is not generated between the driving electrode and the movable unit, a time for resetting the driving electrode and the movable unit to the substantially same potential is shorter than a response time during which the movable unit is movable by an action of the support portion having flexibility.

9. The method according to claim 7, wherein a timing at which the driving electrode and the movable unit reach the substantially same potential is earlier than a timing at which the control light of the intensity modulated is illuminated.

10. An optically controlled device comprising:

a control-light optical system that supplies a control light;

a transparent electrode that is optically transparent;

a conductivity variable portion that is provided on the transparent electrode, where electrical conductivity changes according to an amount of control light passing through the transparent electrode;

a driving electrode provided on the conductivity variable portion;

a movable unit that is movable to a predetermined position;

a support portion that movably supports the movable unit; and a power supply that supplies either of a voltage modulated according to an input signal and a constant voltage to the transparent electrode, wherein the optically controlled device is controlled by a method including inputting the control light of a constant intensity into the transparent electrode;

applying a voltage modulated according to an input signal between the transparent electrode and the movable unit; and moving the movable unit to the predetermined position by generating a force corresponding to the voltage between the driving electrode and the movable unit based on a change of electrical conductivity of the conductivity variable portion caused by the inputting of the control light into the transparent electrode.

11. An optically controlled device comprising:

a control-light optical system that supplies a control light;

a transparent electrode that is optically transparent;

a conductivity variable portion that is provided on the transparent electrode, where electrical conductivity changes according to an amount of control light passing through the transparent electrode;

a driving electrode provided on the conductivity variable portion;

a movable unit that is movable to a predetermined position;

a support portion that movably supports the movable unit; and a power supply that supplies either of a voltage modulated according to an input signal and a constant voltage to the transparent electrode, wherein the optically controlled device is controlled by a method including inputting the control light of an intensity modulated according to an input signal into the transparent electrode;

applying a constant voltage between the transparent electrode and the movable unit;

moving the movable unit to the predetermined position by generating a force corresponding to the intensity of the control light between the driving electrode and the movable unit based on a change of electrical conductivity of the conductivity variable portion according to the intensity of the control light caused by the inputting of the control light in to the transparent electrode; and resetting the driving electrode and the movable unit to substantially same potential during a time when the control light is being input into the transparent electrode.

12. A spatial light modulator comprising a plurality of optically controlled movable mirror devices having a movable mirror that is movable to a predetermined position, wherein each of the optically-controlled movable mirror devices includes a control-light optical system that supplies a control light;

a transparent electrode that is optically transparent;

a conductivity variable portion that is provided on the transparent electrode, where electrical conductivity changes according to an amount of control light passing through the transparent electrode;

a driving electrode provided on the conductivity variable portion;

a movable unit that is movable to the predetermined position;

a support portion that movably supports the movable unit; and a power supply that supplies either of a voltage modulated according to an input signal and a constant voltage to the transparent electrode, the optically-controlled movable mirror device is controlled by a method including inputting the control light of a constant intensity into the transparent electrode;

applying a voltage modulated according to an input signal between the transparent electrode and the movable unit; and moving the movable unit to the predetermined position by generating a force corresponding to the voltage between the driving electrode and the movable unit based on a change of electrical conductivity of the conductivity variable portion caused by the inputting of the control light into the transparent electrode, and the movable portion is the movable mirror.

13. A spatial light modulator comprising a plurality of optically-controlled movable mirror devices having a movable mirror that is movable to a predetermined position, wherein each of the optically-controlled movable mirror devices includes a control-light optical system that supplies a control light;

a transparent electrode that is optically transparent;

a conductivity variable portion that is provided on the transparent electrode, where electrical conductivity changes according to an amount of control light passing through the transparent electrode;

a driving electrode provided on the conductivity variable portion;

a movable unit that is movable to the predetermined position;

a support portion that movably supports the movable unit; and a power supply that supplies either of a voltage modulated according to an input signal and a constant voltage to the transparent electrode, the optically-controlled movable mirror device is controlled by a method including inputting the control light of an intensity modulated according to an input signal into the transparent electrode;

applying a constant voltage between the transparent electrode and the movable unit;

moving the movable unit to the predetermined position by generating a force corresponding to the intensity of the control light between the driving electrode and the movable unit based on a change of electrical conductivity of the conductivity variable portion according to the intensity of the control light caused by the inputting of the control light into the transparent electrode; and resetting the driving electrode and the movable unit to substantially same potential during a time when the control light is being input into the transparent electrode, and the movable portion is the movable mirror.

14. A projector comprising:

an illumination light source that supplies an illumination light;

a spatial light modulator that modulates the illumination light according to an image signal to output a modulated light; and a projection lens that projects the modulated light, wherein the spatial light modulator includes a plurality of optically-controlled movable mirror devices having a movable mirror that is movable to a predetermined position, each of the optically-controlled movable mirror devices including a control-light optical system that supplies a control light;

a transparent electrode that is optically transparent;

a conductivity variable portion that is provided on the transparent electrode, where electrical conductivity changes according to an amount of control light passing through the transparent electrode;

a driving electrode provided on the conductivity variable portion;

a movable unit that is movable to the predetermined position;

a support portion that movably supports the movable unit; and a power supply that supplies either of a voltage modulated according to an input signal and a constant voltage to the transparent electrode, the optically-controlled movable mirror device is controlled by a method including
inputting the control light of a constant intensity into the transparent electrode;
applying a voltage modulated according to an input signal between the transparent electrode and the movable unit; and
moving the movable unit to the predetermined position by generating a force corresponding to the voltage between the driving electrode and the movable unit based on a change of electrical conductivity of the conductivity variable portion caused by the inputting of the control light into the transparent electrode, and
the movable portion is the movable mirror.

15. A projector comprising:
an illumination light source that supplies an illumination light;
a spatial light modulator that modulates the illumination light according to an image signal to output a modulated light; and
a projection lens that projects the modulated light, wherein
the spatial light modulator includes a plurality of optically-controlled movable mirror devices having a movable mirror that is movable to a predetermined position, each of the optically-controlled movable mirror devices including
a control-light optical system that supplies a control light;
a transparent electrode that is optically transparent;
a conductivity variable portion that is provided on the transparent electrode, where electrical conductivity changes according to an amount of control light passing through the transparent electrode;
a driving electrode provided on the conductivity variable portion;
a movable unit that is movable to the predetermined position;
a support portion that movably supports the movable unit; and
a power supply that supplies either of a voltage modulated according to an input signal and a constant voltage to the transparent electrode,
the optically-controlled movable mirror device is controlled by a method including
inputting the control light of an intensity modulated according to an input signal into the transparent electrode;
applying a constant voltage between the transparent electrode and the movable unit;
moving the movable unit to the predetermined position by generating a force corresponding to the intensity of the control light between the driving electrode and the movable unit based on a change of electrical conductivity of the conductivity variable portion according to the intensity of the control light caused by the inputting of the control light into the transparent electrode; and
resetting the driving electrode and the movable unit to substantially same potential during a time when the control light is being input into the transparent electrode, and
the movable portion is the movable mirror.

16. An optically controlled device comprising:
a control-light optical system that supplies a control light;
a transparent electrode that is optically transparent;
a conductivity variable portion that is provided on the transparent electrode, where electrical conductivity changes according to an amount of control light passing through the transparent electrode;
a driving electrode provided on the conductivity variable portion;
a movable unit that is movable to the predetermined position;
a support portion that movably supports the movable unit;
a power supply that supplies either of a voltage modulated according to an input signal and a constant voltage between the transparent electrode and the movable unit; and
a light-shielding unit that is provided between the transparent electrode and the control-light optical system, the light-shielding unit including an aperture, wherein
the aperture is arranged such that the control light from the control-light optical system passes through the aperture to be input into the transparent electrode,
the control light passing through the aperture is input only into the transparent electrode to generate a predetermined force between the driving electrode and the movable unit, and
the movable unit is moved by the predetermined force.

17. The optically controlled device according to claim 16, wherein
the transparent electrode includes at least a first transparent electrode and a second transparent electrode,
the power supply applies a predetermined voltage between the first transparent electrode and the movable unit,
the second transparent electrode is provided so that a reference potential of the second transparent electrode is different from that of the first transparent electrode,
the control light includes a first control light and a second control light,
the aperture is arranged such that the first control light and the second control light pass through the aperture, the first control light is input only into the first transparent electrode, and the second control light is input only into the second transparent electrode,
the first control light passing through the aperture is input into the first transparent electrode to generate the predetermined force between the driving electrode and the movable unit, and
the second control light passing through the aperture is input into the second transparent electrode such that the driving electrode has the reference potential.

18. A spatial light modulator comprising a plurality of optically-controlled movable mirror devices having a movable mirror that is movable to a predetermined position, wherein
each of the optically-controlled movable mirror devices includes
a control-light optical system that supplies a control light;
a transparent electrode that is optically transparent;
a conductivity variable portion that is provided on the transparent electrode, where electrical conductivity changes according to an amount of control light passing through the transparent electrode;
a driving electrode provided on the conductivity variable portion;
a movable unit that is movable to the predetermined position;

a support portion that movably supports the movable unit;

a power supply that supplies either of a voltage modulated according to an input signal and a constant voltage to the transparent electrode; and a light-shielding unit that is provided between the transparent electrode and the control-light optical system, the light-shielding unit including an aperture, the aperture is arranged such that the control light from the control-light optical system passes through the aperture to be input into the transparent electrode, the control light passing through the aperture is input only into the transparent electrode to generate a predetermined force between the driving electrode and the movable unit, and the movable unit is moved by the predetermined force.

19. The spatial light modulator according to claim 18, wherein the aperture is provided on a position corresponding to the movable mirror.

20. The spatial light modulator according to claim 18, wherein the transparent electrode includes at least a first transparent electrode and a second transparent electrode, a plurality of the movable mirrors is arranged in a lattice-shaped manner in two directions substantially perpendicular to each other on a predetermined plane, and the aperture has a rectangular shape having a longitudinal side in a direction substantially perpendicular to a direction in which the first transparent electrode and the second transparent electrode are arranged in parallel.

21. A projector comprising:

an illumination light source that supplies an illumination light;

a spatial light modulator that modulates the illumination light according to an image signal to output a modulated light; and a projection lens that projects the modulated light, wherein the spatial light modulator includes a plurality of optically-controlled movable mirror devices having a movable mirror that is movable to a predetermined position, each of the optically-controlled movable mirror devices including a control-light optical system that supplies a control light;

a transparent electrode that is optically transparent;

a conductivity variable portion that is provided on the transparent electrode, where electrical conductivity changes according to an amount of control light passing through the transparent electrode;

a driving electrode provided on the conductivity variable portion;

a movable unit that is movable to the predetermined position;

a support portion that movably supports the movable unit;

a power supply that supplies either of a voltage modulated according to an input signal and a constant voltage to the transparent electrode; and a light-shielding unit that is provided between the transparent electrode and the control-light optical system, the light-shielding unit including an aperture, the aperture is arranged such that the control light from the control-light optical system passes through the aperture to be input into the transparent electrode, the control light passing through the aperture is input only into the transparent electrode to generate a predetermined force between the driving electrode and the movable unit, and the movable unit is moved by the predetermined force.

22. An optically controlled device comprising:

a control-light optical system that supplies a control light;

a transparent electrode that is optically transparent;

a conductivity variable portion that is provided on the transparent electrode, where electrical conductivity changes according to an amount of control light passing through the transparent electrode;

a driving electrode provided on the conductivity variable portion;

a movable unit that is movable to the predetermined position;

a support portion that movably supports the movable unit;

a power supply that supplies either of a voltage modulated according to an input signal and a constant voltage between the transparent electrode and the movable unit; and a resistor portion that is provided between the driving electrode and the movable unit, the resistor portion having a predetermined resistance, wherein the predetermined resistance is any value in a range between a minimum resistance and a maximum resistance of the conductivity variable portion, the control light is input into the transparent electrode to generate a predetermined force between the driving electrode and the movable unit, the predetermined force corresponding to the resistance of the conductivity variable portion, and the movable unit is moved by the predetermined force.

23. The optically controlled device according to claim 22, wherein following condition is satisfied $$4R_L \leq R_C \leq R_D/4$$

where $R_L$ is the minimum resistance of the conductivity variable portion, $R_D$ is the maximum resistance of the conductivity variable portion, and $R_C$ is the resistance of the resistor portion.

24. The optically controlled device according to claim 22, wherein following equation is satisfied $$R_C = (R_L \times R_D)^{1/2}$$

where $R_L$ is the minimum resistance of the conductivity variable portion, $R_D$ is the maximum resistance of the conductivity variable portion, and $R_C$ is the resistance of the resistor portion.

25. A spatial light modulator comprising a plurality of optically-controlled movable mirror devices having a movable mirror that is movable to a predetermined position, wherein each of the optically-controlled movable mirror devices includes a control-light optical system that supplies a control light;

a transparent electrode that is optically transparent;

a conductivity variable portion that is provided on the transparent electrode, where electrical conductivity changes according to an amount of control light passing through the transparent electrode;

a driving electrode provided on the conductivity variable portion;

a movable unit that is movable to the predetermined position;

a support portion that movably supports the movable unit;

a power supply that supplies either of a voltage modulated according to an input signal and a constant voltage to the transparent electrode; and a resistor portion that is provided between the driving electrode and the movable unit, the resistor portion having a predetermined resistance, the predetermined resistance is any value in a range between a minimum resistance and a maximum resistance of the conductivity variable portion, the control light is input into the transparent electrode to generate a predetermined force between the driving electrode and the movable unit, the predetermined force corresponding to the resistance of the conductivity variable portion, and the movable unit is moved by the predetermined force.

26. A projector comprising:

an illumination light source that supplies an illumination light;

a spatial light modulator that modulates the illumination light according to an image signal to output a modulated light; and a projection lens that projects the modulated light, wherein the spatial light modulator includes a plurality of optically-controlled movable mirror devices having a movable mirror that is movable to a predetermined position, each of the optically-controlled movable mirror devices including a control-light optical system that supplies a control light;

a transparent electrode that is optically transparent;

a conductivity variable portion that is provided on the transparent electrode, where electrical conductivity changes according to an amount of control light passing through the transparent electrode;

a driving electrode provided on the conductivity variable portion;

a movable unit that is movable to the predetermined position;

a support portion that movably supports the movable unit;

a power supply that supplies either of a voltage modulated according to an in put signal and a constant voltage to the transparent electrode; and a resistor portion that is provided between the driving electrode and the movable unit, the resistor portion having a predetermined resistance, the predetermined resistance is any value in a range between a minimum resistance and a maximum resistance of the conductivity variable portion, the control light is input into the transparent electrode to generate a predetermined force between the driving electrode and the movable unit, the predetermined force corresponding to the resistance of the conductivity variable portion, and the movable unit is moved by the predetermined force.

* * * * *